(12) United States Patent
Holloway

(10) Patent No.: US 10,297,999 B2
(45) Date of Patent: May 21, 2019

(54) ELECTRICAL DISTRIBUTION SYSTEM

(71) Applicant: Robert Holloway, Shreveport, LA (US)

(72) Inventor: Robert Holloway, Shreveport, LA (US)

( * ) Notice: Subject to any disclaimer, the term of this patent is extended or adjusted under 35 U.S.C. 154(b) by 9 days.

(21) Appl. No.: 15/898,662

(22) Filed: Feb. 19, 2018

(65) Prior Publication Data

US 2018/0175600 A1    Jun. 21, 2018

Related U.S. Application Data

(62) Division of application No. 15/286,021, filed on Oct. 5, 2016, now Pat. No. 9,899,819.

(51) Int. Cl.
| | |
|---|---|
| *H01H 23/02* | (2006.01) |
| *H01R 13/73* | (2006.01) |
| *H01R 25/00* | (2006.01) |
| *H02B 1/04* | (2006.01) |
| *H02B 1/48* | (2006.01) |
| *H02G 3/10* | (2006.01) |
| *H02G 3/14* | (2006.01) |
| *H02G 3/18* | (2006.01) |
| *H01R 9/24* | (2006.01) |
| *H01R 9/26* | (2006.01) |
| *H02G 3/00* | (2006.01) |
| *H02G 3/08* | (2006.01) |

(52) U.S. Cl.
CPC .............. *H02G 3/18* (2013.01); *H01H 23/02* (2013.01); *H01R 9/2408* (2013.01); *H01R 9/2675* (2013.01); *H01R 13/73* (2013.01); *H01R 25/006* (2013.01); *H02B 1/04* (2013.01); *H02B 1/48* (2013.01); *H02G 3/00* (2013.01); *H02G 3/086* (2013.01); *H02G 3/10* (2013.01); *H02G 3/14* (2013.01)

(58) Field of Classification Search
CPC ... H02B 1/04; H02B 1/48; H02G 3/00; H02G 3/08; H02G 3/10; H02G 3/14; H02G 3/16; H02G 3/086; H01H 23/02; H01R 9/2675; H01R 9/2408; H01R 13/73; H01R 25/00; H01R 25/006; H01R 25/162; H01R 25/165; Y10S 248/906; Y10S 439/925
USPC ........ 174/50, 58, 60, 541; 220/3.5; 248/906; 439/535, 105, 652, 925, 654, 650
See application file for complete search history.

(56) References Cited

U.S. PATENT DOCUMENTS

| | | | |
|---|---|---|---|
| 5,453,725 A * | 9/1995 | You .................. | H01H 73/26 200/61.19 |
| 6,045,374 A | 4/2000 | Candeloro | |
| 6,156,971 A | 12/2000 | May | |
| 7,034,222 B1 | 4/2006 | York | |
| 2009/0107693 A1 | 4/2009 | Meyer | |
| 2009/0239403 A1 | 9/2009 | Byrne | |
| 2011/0021050 A1 | 1/2011 | Byrne | |
| 2011/0182012 A1 | 7/2011 | Hilton et al. | |

(Continued)

*Primary Examiner* — Timothy J Thompson
*Assistant Examiner* — Guillermo J Egoavil
(74) *Attorney, Agent, or Firm* — Davis & Bujold, P.L.L.C.; Charles Holoubek

(57) ABSTRACT

Electrical distribution systems and methods comprising a first cable-to-box connector which accepts electrical wires, a first electrical box having a first and a second coupler to connect to the cable-to-box connector; intra-box circuits built in one or more of a plurality of walls of the first electrical box and connecting the first and the second coupler; and a concavity defined by the plurality of walls of the first electrical box that receives a first electrical insert.

14 Claims, 45 Drawing Sheets

(56) References Cited

U.S. PATENT DOCUMENTS

2014/0133130 A1  5/2014 Ebeling
2015/0136437 A1  5/2015 Hitchman
2017/0077690 A1  3/2017 Moss

* cited by examiner

ELECTRICAL DISTRIBUTION SYSTEM

FIELD OF THE INVENTION

The claimed invention is related to methods and devices for wiring systems and more particularly to electrical wiring systems for residential and commercial applications that can help speed up current construction methods and provide much more versatility in the installation and application.

BACKGROUND OF THE INVENTION

During construction, electrical conductors are connected to a power source via circuit breakers, then through the building to various locations, such as switches and outlets. Per National Electric Code (NEC), the end points or junction points are typically done within a listed electrical box or device. In current electrical systems, conductors are spliced within a listed box in order to complete electrical circuits. An example of this would be a circuit conductor which provides current to a switch, and an outgoing conductor from the switch to the load. Using current construction methods, an electrician can spend a good portion of time in making the wire connections contained within an electrical box. Wires must be individually stripped and joined, typically using wire nuts. The work involved in splicing and connecting conductors within boxes which supply or contain switches and outlets/receptacles is a time consuming part of electrical installation. For the foregoing reasons, there is a pressing, but seemingly irresolvable need for a flexible, quick, and reliable electrical distribution system.

SUMMARY OF THE INVENTION

Wherefore, it is an object of the present invention to overcome the above mentioned shortcomings and drawbacks associated with the current technology. The present invention is directed to methods and apparatuses for distributing electricity.

As a complete wiring system, the presently claimed invention will reduce the overall installation to an estimated one-third less time to complete the electrical wiring.

At least in part because the presently claimed invention potentially requires less box device wiring in the makeup stage of wiring, time savings may be accomplished. Conventional wiring is typically broken down into three parts, or phases. These include: a) rough in phase; b) make up phase; and c) trim out phase. The rough in phase occurs at the beginning of the constructions work where home-run circuits are pulled from the main circuit breaker panel to their respective points in the electrical distributions of switches, receptacles, and fixtures within the building or sub-building framework. This includes attaching electrical boxes to the building frame and installing the corresponding circuit. Next is the box/device make up phase. This is where wire splices to devices occur. Time savings are accomplished using the presently claimed method, as there are no pig tailing/splices and devices to connect separately. Once the home run or sub circuit is attached to the disclosed electrical box, the remaining item is to snap the electrical insert, such as a light switch or an outlet, into the box and then put on the appropriate cover plate after texture or painting. Using the presently claimed invention takes very little time and effort, as each element of the disclosed system is preferably slotted or keyed or otherwise formed to make for a fast, simple, and preferably error proof electrical hook-up. Once the electrical insert is properly connected to the electrical box, the surface of the electrical insert will preferably set flush with the edge of the electrical box. Therefore, the disclosed process can take mere seconds compared to several minutes with the standard conventional wiring method. Trim out is the process of making final adjustments to each wiring device or electrical insert to insure that the cover plate fits neatly on each electrical box. For instance if a traditional outlet is not centered properly into a box, the cover plate will appear crooked as well. With the disclosed electrical distribution system, centering of each electrical insert occurs automatically once the electrical insert is snapped into place. No screws are needed to tighten the electrical device in place, though screws may be provided as an alternative or additional fastener. Guided anchors may be used to friction hold the electrical insert devices substantially exactly in place, so that cover plates are truly centered each and every time. This also saves time by not having to straighten up electrical inserts to straighten up cover plates. Standard cover plates are preferably used with disclosed electrical distribution system One of the many distinctions of the present invention is the circuit interrupters. According to one embodiment, the circuit interrupters in an electrical box change switching configuration of a, for example light switch, from regular on/off to three way or four way by opening or closing of one or more circuit interrupters in the electrical box. According to one embodiment of the presently claimed invention, an electrical box has two interrupters in place directly on both sides of each connection point or coupler where the current enters and exits the box. The circuit interrupter is preferably required to be pressed or pulled out to allow turning, in order to move it to the "on" or "off" position, or otherwise biased so that arbitrary movement of the circuit interrupter is prevented.

One aspect of the disclosed electrical distribution system is to provide a quick connect system in which the electrician can install and service electrical wiring in a more timely manner. The disclosed electrical distribution system is designed to be a complete system to conduct electricity from the circuit breaker to the end electrical application. Unlike conventional electrical wiring, the disclosed electrical distribution system may include a rectangular electrical box and an octagon electrical box along with additional disclosed devices for the completion of the circuit. The outlets and light switch electrical inserts slide and preferably releasably lock into or are otherwise fastened to the electrical box and connect to the circuit through insert electrical connections, preferably including conductive blades. The intra-box circuits of electrical conductors, which complete the circuits, are built into the electrical box. Preferably having conductive rails for two hot legs gives the electrical box the ability to be used in both 110 and 220 applications. This is advantageous in that using a three-strand cable; one electrical box can be used more readily to supply two different circuits to one room or to break off a circuit in one area to direct it to another area.

Just some of the numerous advantages of some embodiments of the disclosed electrical distribution system over conventional electrical hardware include the following. First, a complete electrical system is installed more quickly by the electrical contractor. The electrical distribution system could substantially eliminate the electrical box makeup step, which can be considered to be 50% of the trim out process. Second, the electrical plan layout is easier to comprehend, as all of the electrical boxes may be pre-marked for all wire hookups, e.g., hots, switch legs, travelers, neutrals & grounds. Third, quick and secure (NEC approved) wiring connections are provided, with multiple port usage at each box for multiple receptacles and switches within a circuit.

Another aspect of the electrical distribution system is the ease of installation and the ability to check circuits during the construction process instead of having to wait until the end. It can be an expensive and time consuming endeavor to connect each conventional switch and outlet during a construction process only to be removed for the construction to continue and be installed again at the end. The disclosed electrical distribution system gives the electrician the ability to quickly install, test, correct, and remove all end points during the construction process. This insures a better installation of all cables and end points during the construction process thereby removing the need to go back and tear out electrical installations in order to remedy problems. This capability also allows for easier first time inspection approval.

The disclosed electrical distribution system is designed to gain optimum use and benefit of timely electrical construction on either residential or commercial applications, potentially saving up to an estimated 50% off of normal conventional electrical wiring jobs. This can cut both time and manpower requirements in electrical contracting.

The wire used for residential or commercial installations will be the product best suited for the particular application. The residential boxes will accommodate, for example, Romex and MC cabling, which include copper conductors. One version of a hookup process is as follows: the Romex or MC homeruns are run to the electrical box(es) for easy hook up. 2"-4" of insulation or metal flex, is striped back, ⅜" of insulation is peeled off of each lead, and the lead is inserted into a pre color coded cable-to-box connector. The cable-to-box connector allows for the safe and efficient connection of cables to the boxes.

Beginning at the Main Circuit Breaker panel, and progressing on into the building, the following illustration is an embodiment of a wiring process from rough-in to the finish trim out utilizing the disclosed electrical distribution system. The illustration helps demonstrate time savings compared to conventional wiring methods, but is just one example of just one embodiment.

Beginning at the Main Circuit Breaker panel, all the respective home runs will be connected to each of their respective electrical boxes. Following the blue print plan set, each electrical box will be attached to the building framework at a given "Plan Location". Next the "Home Runs" and "Continuing" attachments are made to each electrical box by inserting the Romex or cable leads into a cable to box connector and into the respective couplers on the sides, top, bottom, and/or back of the electrical boxes. For instance a 20 amp home run Romex circuit may run from the Main Breaker Panel to the electrical box, and could be identified and wired for the correct electrical insert, which in this illustration may be an outlet. The power leads from the 12/2 AWG Romex may be attached to the cable-to-box connector which in turn may be connected to the side of the electrical box at the coupler with corresponding prongs and is either friction retained or fastened with connector screws. Next, the continuing circuits supplying additional outlets are wired in the same manner as the first, and is an extension off the 1st, 2nd, 3rd, "n" th outlet electrical boxes thus completing this particular 20 amp circuit.

Next, for example, a 15 amp home run circuit from the Main Breaker Panel, may be run using 14 AWG Romex. This could attach to the applicable couplers on the electrical box for a 3-way switch. The disclosed electrical distribution system interface between the electrical box and a 3-way and 4-way switching configurations can best be described as follows. A 3-way switch device may have two upper folding conductive blades and two lower fixed conductive blades, which engage the upper and lower conductive rails of the electrical box. The two upper conductive blades preferably serve as the two common connections and the two lower blades as the travelers. Wiring configuration for these devices would follow current typical methods for wiring a 3-way switch. The 4-way switch wiring can be the same as the 3-way switch, with the exception that the "switch leg" would be routed to the electrical box lighting fixture from the 4-way switch box location. The ground would preferably be connected at each electrical box, which is a current NEC requirement.

After all the electrical boxes and applicable wiring runs/cable/cable-to-box connections are made, the electrical boxes can be appropriately protected with tape, or a snap in cover installed, so that other construction such as dry walling and or painting can be accomplished. Preferably, after the construction is completed, and close to the finishing point, the electrical insert devices can be added to their respective locations and standard cover plates can be added once the painting/paneling is completed. The disclosed electrical distribution system wiring could thus saves upwards of 50% of time spent when compared to conventional electrical wiring applications. Another advantageous application of an embodiment of the electrical distribution system, is the ease of prefabrication of runs, with pre-cut cable lengths and cable-to-box connectors already in place on the cables, between electrical connections such as switches and outlets. This may be especially advantageous in construction projects that are "cookie cutter" such as hotels, restaurants, etc.

The presently claimed invention relates to electrical distribution systems and methods comprising a first cable-to-box connector which accepts electrical wires, a first electrical box having a first and a second coupler to connect to the cable-to-box connector; intra-box circuits built in one or more of a plurality of walls of the first electrical box and connecting the first and the second coupler; and a concavity defined by the plurality of walls of the first electrical box that receives a first electrical insert.

According to a further embodiment, the first electrical insert is one of a fixture, an outlet, and a switch. According to a further embodiment, the first cable-to-box connector has an engaging face that engages with one of the first and the second couplers. According to a further embodiment, the engaging face has an engaging geometry that prevents improper engagement of the first cable-to-box connector into either the first or the second coupler. According to a further embodiment, a cross section of the engaging face is not bilaterally symmetric along both a first and a second orthogonal axis in a cross section plane. According to a further embodiment, the intra-box circuits include a neutral circuit, a ground circuit, and one of a first hot circuit and the first hot circuit and a second hot circuit. According to a further embodiment, the intra-box circuits are substantially encased in the plurality of walls of the electrical box, with access to the intra box circuits provided for electrical connection to the first cable-to-box connector and the first electrical insert. According to a further embodiment, the first electrical insert is shaped to substantially fully fill the concavity of the first electrical box. According to a further embodiment, the presently claimed invention further relates to conductive blades on one of a first outer wall of the first electrical insert and the first and a second outer wall of the first electrical insert; mating conductive rails along an inner surface of respective plurality walls of the first electric box; the conductive blades and the conductive rails creating one of a first insert electrical connection and the first and a second insert electrical connection. According to a further embodiment, the intra-box circuits include a first hot line, a second hot line, a neutral line, and a ground line. According to a further embodiment, the presently claimed invention further comprises a circuit interrupter disposed on each of the first hot line and the second hot line. According to a further embodiment, a plurality of circuit interrupters is disposed on each of the first hot line and the second hot line. According to a further embodiment, a circuit interrupter is disposed on the first hot line between each coupler, and a circuit interrupter is disposed on the second hot line between each coupler. According to a further embodiment, a third coupler and a further coupler are provided on the first electrical box. According to a further embodiment, the circuit interrupter includes a conductive pin, a conductive seat, and a non-conductive seat, and the circuit interrupter is moved so that the conductive pin is moved from the conductive seat to the non-conductive seat to open a circuit. According to a further embodiment, a first cable is connected to the first cable-to-box connector transferring current into the first electrical box through the first coupler, the current passes through the first electrical insert and out of the second coupler to a second cable-to-box connector connected to a second cable. According to a further embodiment, a third cable-to-box connector is connected to the second cable, the third cable-to-box connector is connected to a first coupler on a second electrical box, a second electrical insert is connected to the second electrical box, and the second electrical insert receives current from first cable via the second cable. According to a further embodiment, a fourth cable-to-box connector is connected to a third coupler on the first electrical box, a third cable is connected to the fourth cable-to-box connector and receiving current from the first electrical box, a fifth cable-to-box connector is connected to the third cable and a first coupler on a third electrical box, a third electrical insert is connected to the third electrical box, and the third electrical insert receives current from the first cable via the third cable. According to a further embodiment, the first electrical insert is a switch that selectively controls current flowing to the second electrical insert along a first hot line, and the third electrical insert receives constant current along a second hot line.

The presently claimed invention also relates to electrical distribution systems and methods comprising a first and a second cable-to-box connector, each accepting first hot, second hot, neutral, and ground electrical wires from a first cable; a third and a fourth cable-to-box connector, each accepting first hot, second hot, neutral, and ground electrical wires from a second cable; a first electrical box having a first and a second coupler to connect to the cable-to-box connector; a second electrical box having a first coupler to connect to the cable-to-box connector; intra-box circuits built in a plurality of walls of the first electrical box and the second electrical box, the intra-box circuit of the first electrical box connecting the first and the second coupler; a first concavity defined by the plurality of walls of the first electrical box receives a first electrical insert, a second concavity defined by the plurality of walls of the second electrical box receives a second electrical insert, the first electrical box receives current from the first cable via the second cable-to-box connector engaging with the first coupler of the first electrical box, and passes the current to the first electrical insert; and the second electrical insert receives current from the first electrical box via the second coupler of the first electrical box being coupled to the third cable-to-box connector, connected to the second cable, connected to the third cable to box connector.

Though various advantages and advantageous features have been described, the present invention does not require all of the advantageous features or all of the advantages to be included into every embodiment. Various objects, features, aspects, and advantages of the present invention will become more apparent from the following detailed description of preferred embodiments of the invention, along with the accompanying drawings in which like numerals represent like components. The present invention may address one or more of the problems and deficiencies of the current technology discussed above. However, it is contemplated that the invention may prove useful in addressing other problems and deficiencies in a number of technical areas. Therefore the claimed invention should not necessarily be construed as limited to addressing any of the particular problems or deficiencies discussed herein.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which:

FIGS. 13A and 13B are exploded views of the cable to-box-connector of FIG. 11 with a partial cut out view of the head in FIG. 13A to show the ground line passing through;

DETAILED DESCRIPTION OF THE PREFERRED EMBODIMENTS

Figure 1:
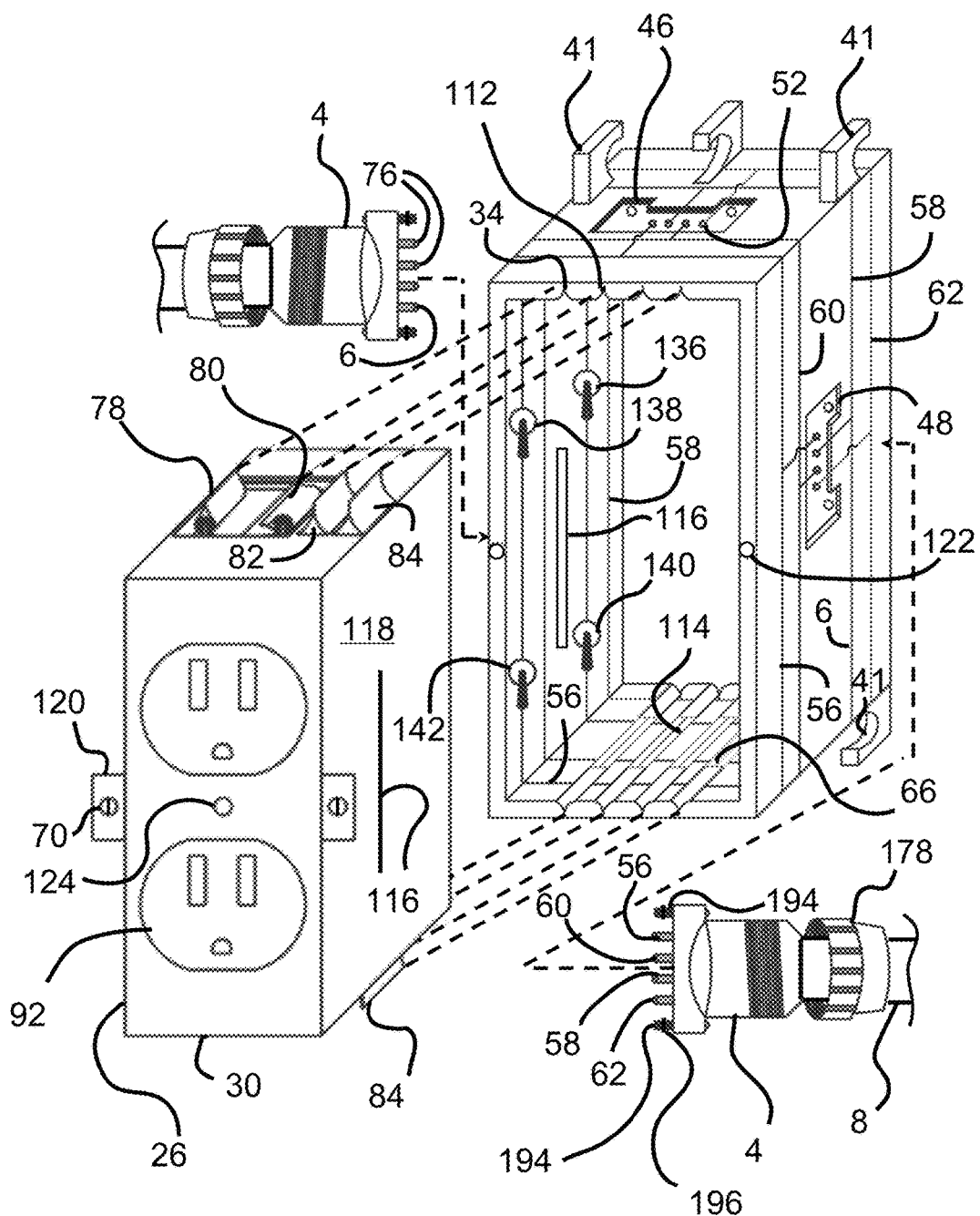
FIG. 1 is an exploded perspective partially see through view of a first embodiment of an electrical distribution system according to the present invention.

The present invention will be understood by reference to the following detailed description, which should be read in conjunction with the appended drawings. It is to be appreciated that the following detailed description of various embodiments is by way of example only and is not meant to limit, in any way, the scope of the present invention. In the summary above, in the following detailed description, in the claims below, and in the accompanying drawings, reference is made to particular features (including method steps) of the present invention. It is to be understood that the disclosure of the invention in this specification includes all possible combinations of such particular features, not just those explicitly described. For example, where a particular feature is disclosed in the context of a particular aspect or embodiment of the invention or a particular claim, that feature can also be used, to the extent possible, in combination with and/or in the context of other particular aspects and embodiments of the invention, and in the invention generally. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose lower limit is the first number and whose upper limit is the second number. For example, 25 to 100 mm means a range whose lower limit is 25 mm, and whose upper limit is 100 mm. The embodiments set forth the below represent the necessary information to enable those skilled in the art to practice the invention and illustrate the best mode of practicing the invention. In addition, the invention does not require that all the advantageous features and all the advantages need to be incorporated into every embodiment of the invention.

Turning now to FIG. 1, a brief description concerning the various components of the present invention will now be briefly discussed. As can be seen in this embodiment, the electrical distribution system 2 includes a cable-to-box connector 4 which accepts electrical wires 6 of a cable 8 and has a connecting or engaging face 10, preferably with an engaging geometry that prevents improper insertion, for example, having a cross section of which is not bilaterally symmetric along both a first and a second orthogonal axis 12, 14 in a cross section plane, an electrical box 16 having a port or coupler 18 to connect to the cable-to-box connector 4, intra-box circuits 20 built in one or more of a plurality of walls 22 of the electrical box 16 and connecting a plurality of couplers 18, a concavity 24 defined by the plurality of walls 22 of the electrical box 16 that receives an electrical insert 26, the electrical insert 26 being, for example, one of an electrical fixture 28, an outlet 30, and a switch 32, and an insert electrical connection 34 to electrically connect the electrical insert 26 to the intra-box circuits 20. Fixture, fixture electrical insert, light, and light electrical insert 28 may be used interchangeably in this disclosure.

ELECTRICAL BOX: The electrical box 16 is preferably rectangular 36 or octagonal 38 in shape and preferably has substantially standard dimensions for a gangbox, such as preferably substantially between 4 and 5 inches deep, between 2 and 4 inches wide and between 2 and 4 inches high inches for a rectangular electrical box 34 and preferably substantially between 1.5 and 3 inches deep, and between 3 and 4 inches wide and between 3 and 4 inches high inches for an octagonal electrical box 38. A rectangular electrical box 36 is also commonly referred to as a wall box and an octagonal electrical box 38 is commonly referred to as a ceiling box, though the rectangular and octagonal electrical boxes 36, 38 may each be used in walls, ceilings, and floors. The walls 22 and back 40 of the electrical box 16 define a concavity 24 for receiving and retaining an electrical insert 26, such as a light switch electrical insert 32, an outlet/receptor electrical insert 30, a light or other fixture electrical insert 28, or other electrical device. One or more box-to-stud fastener holds 41 may be provided on the exterior of the electrical box 16 to aid in fastening the electrical box to a stud or other building structure.

The walls 22 and back 40 of the electrical box 16 are preferably constructed of a non-electrically conductive material, such as PVC, preferably through injection molding. Electrically conductive wires 6 are located preferably within the walls 22 and in some embodiments the back 40 of the electrical box 16, and are electrically insulated from the interior and exterior of the box, forming intra-box circuits 20 of the electrical box 16. Preferably most or all of the intra-box circuits 20 are sealed within the non-electrically conductive material during the injection molding process. Preferably all wires 6 within the electrical boxes 16 and the electrical inserts 26 would be would be highly conductive metals, such as silver, copper, aluminum, zinc, and brass so as to preferably have a high level of conductivity throughout the circuitry of the electrical distribution system 2.

Figure 2:
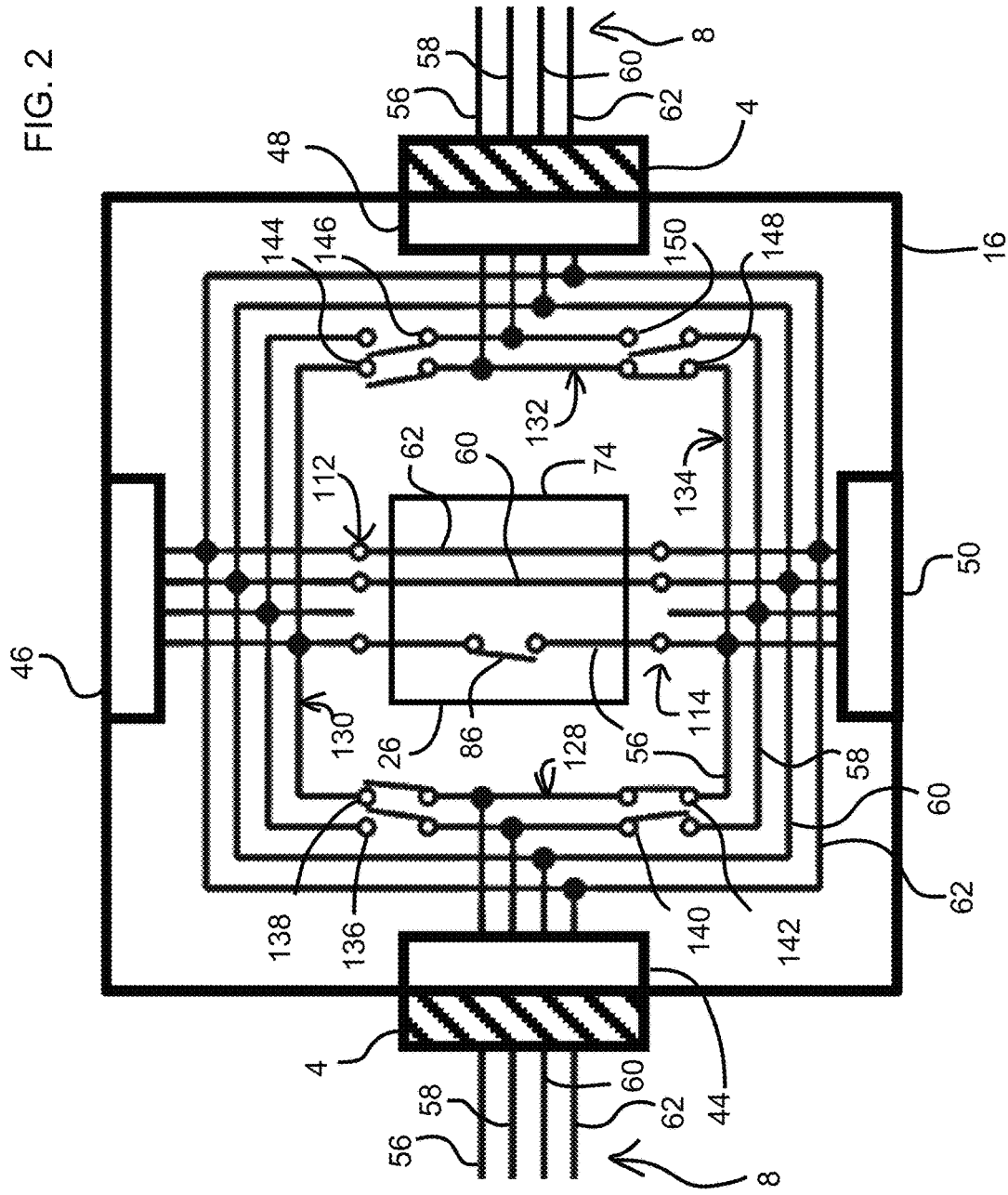
FIG. 2 is a schematic view of an electrical box with a single switch electrical insert and two cable-to-box connectors connected at opposing couplers.
Figure 3:
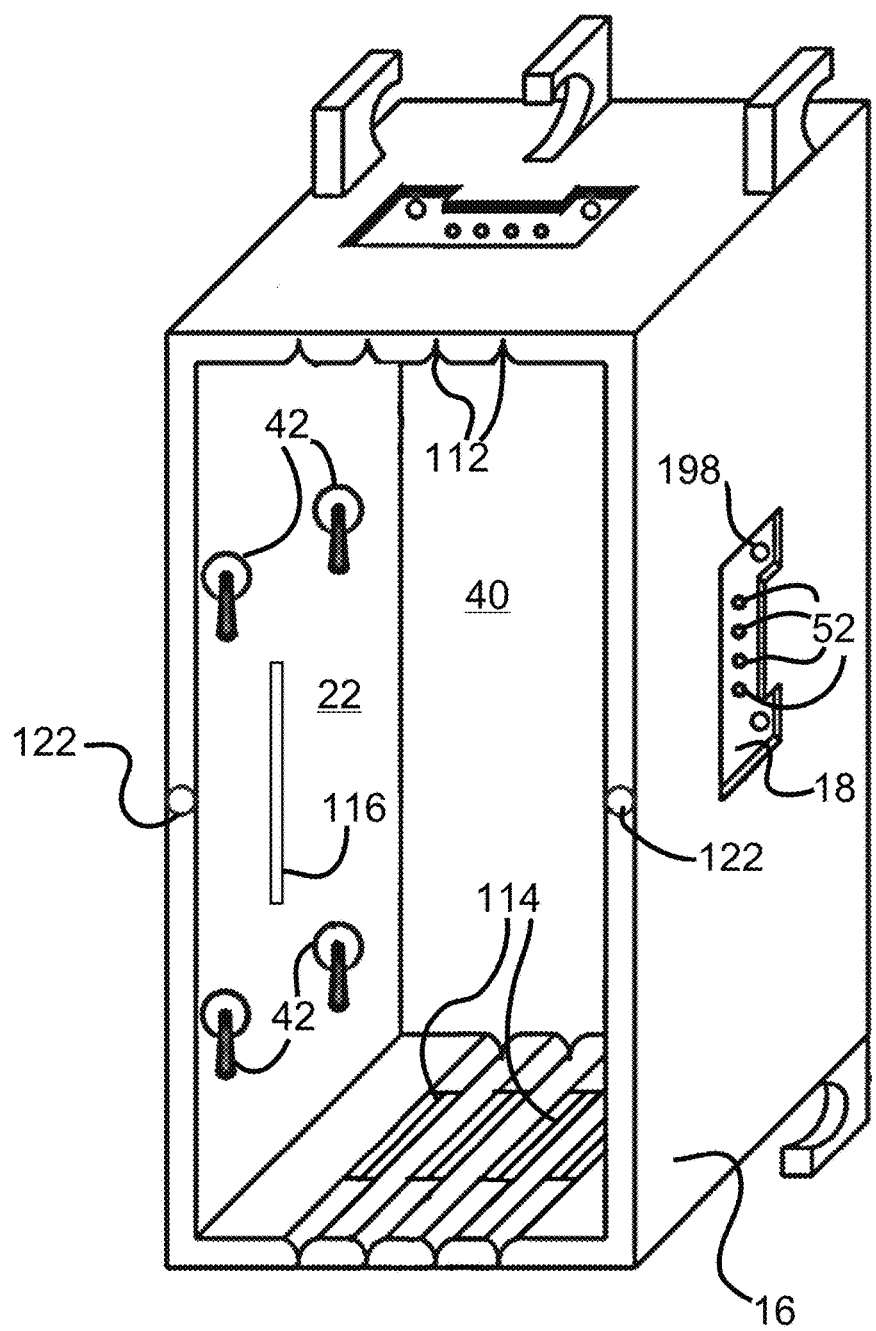
FIG. 3 is a perspective view of the rectangular electrical box of FIG. 1.

The intra-box circuits 20 can selectively carry current throughout the electrical box 16 to each of the couplers 18 and to the insert electrical connections 34 for electrically connecting to the electrical inserts 26, based on the positions of the circuit interrupters 42 described in more detail below. The couplers 18 are preferably located on each of the four side walls 22 of the rectangular electrical box 36 and on four of the eight side walls 22 of the octagonal electrical boxes 38. A first coupler 44, second coupler 46, third coupler 48, and fourth coupler 50 are depicted in FIG. 2, respectively on the left, top, right and bottom walls 22 as arranged in the drawing of FIG. 2. According to further embodiments, an additional or alternative location for one or more couplers 18 would be on the back 40 of the electrical box 16. Further, additional or alternative couplers 18 could be placed on the side walls 22 of the rectangular or octagonal electrical boxes 36, 38. The couplers 18 have conductive sockets 52 where the electrical wire 6 of a cable 8 are connected to the electrical box 16 itself via the cable-to-box connectors 4. The electrical box 16 may preferably be connected to a standard 2 wire or 3 wire cable 8 with a ground 62. Included in the electrical box intra-box circuits 20 are the following wires 6, a first and a second hot line 56, 58, a neutral line 60, and a ground line 62. This allows for the electrical box 16 to be used in the application of either 220V or 110V wiring. With the intra-box circuits 20 being built into the electrical box 16 itself, the electrical box 16 can act as a distribution point where a given circuit entering the electrical box 16 through a given coupler 18 can be directed to various applications through the electrical box 16 via the other couplers 18 on the electrical box 16. An electrical insert 26, such as an outlet/receptacle 30 or a switch 32 for example, may be electrically connected to the electrical box 16 through an insert electrical connection 34, such as a conductive blade 64 system which slides into conductive rails 66 of the electrical box 16 to allow for the conduction of electricity from the electrical box 16 to the electrical insert 26. A series of circuit interrupters 42, discussed further below, are built into the walls 22 and/or back 40 of the electrical box 16, and may selectively open or close the intra-box circuits 20 when and where needed in order to control the activation and therefore the direction of the circuit. The circuit interrupters 42 are preferably accessible from the concavity 24 or inner walls 22 of the electrical box 16 to allow for easy access and manipulation after the electrical box 16 is in place. In further embodiments, the electrical box 16 may be provided with a single hot line 56 to reduce costs and chances of faulty wiring installation.

Figure 4:
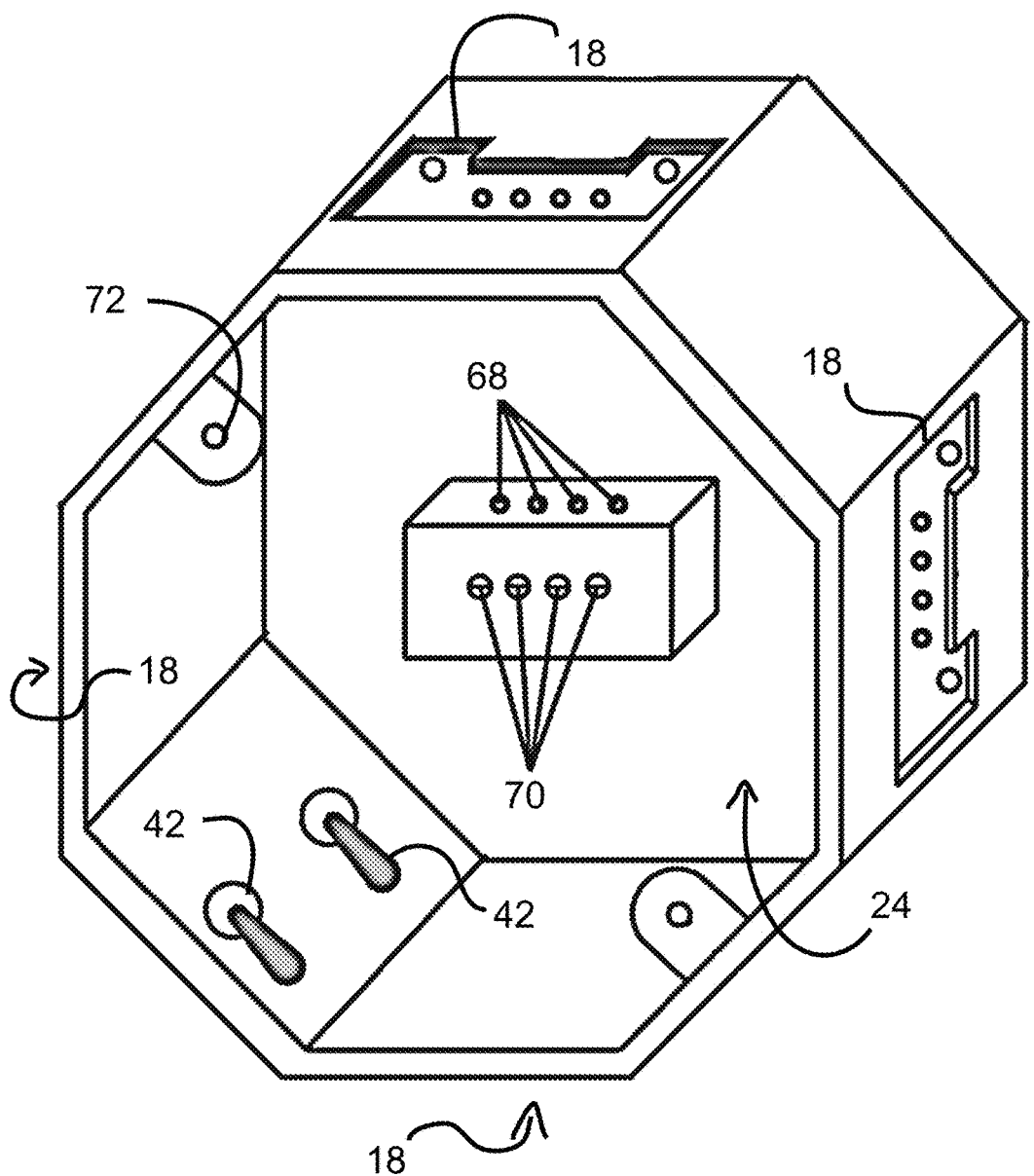
FIG. 4 is a perspective view of an octagonal electrical box.
Figure 10:
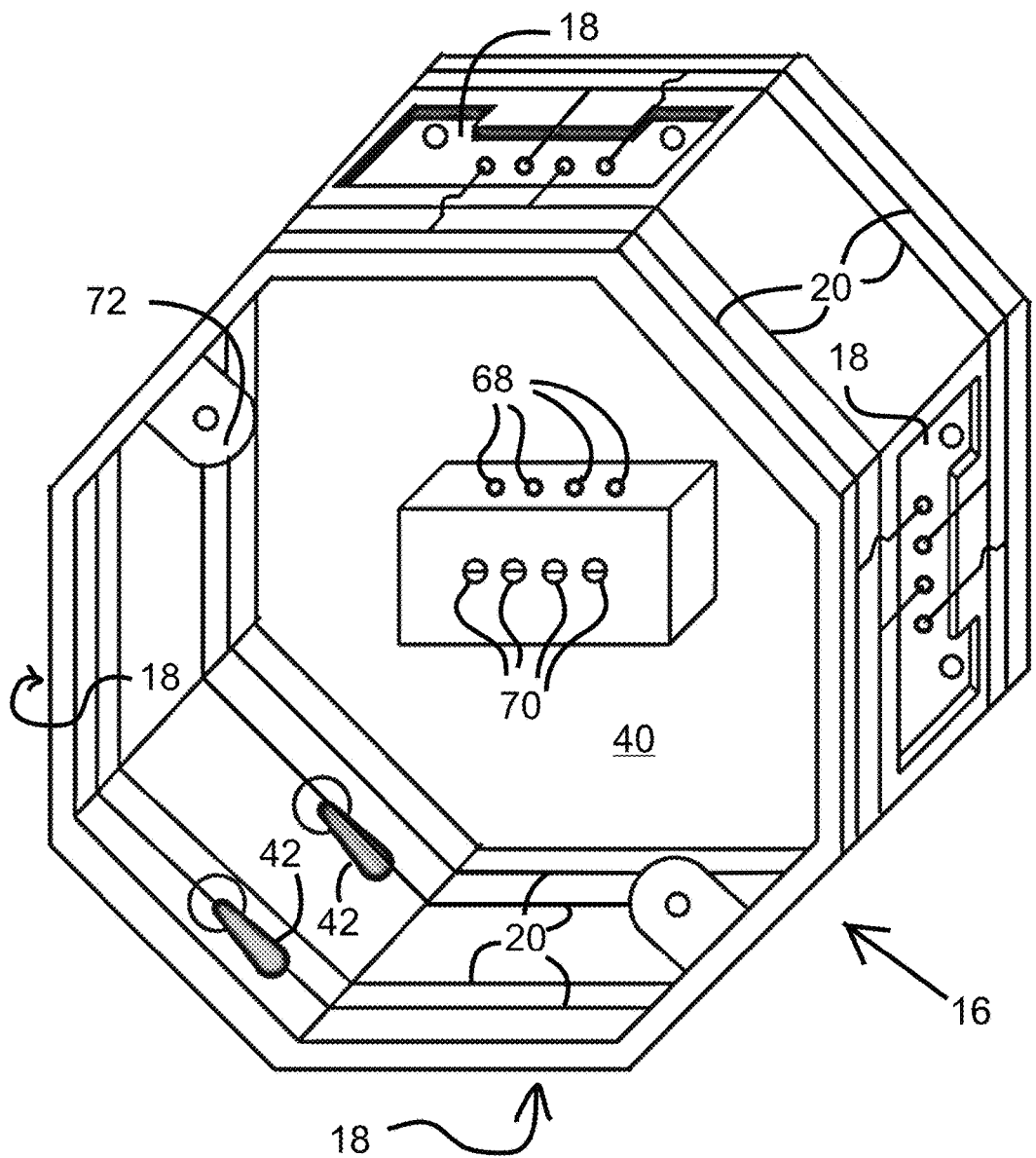
FIG. 10 is a partially see through perspective view of the electrical box of FIG. 4, showing the intra-box circuits.
Figure 11:
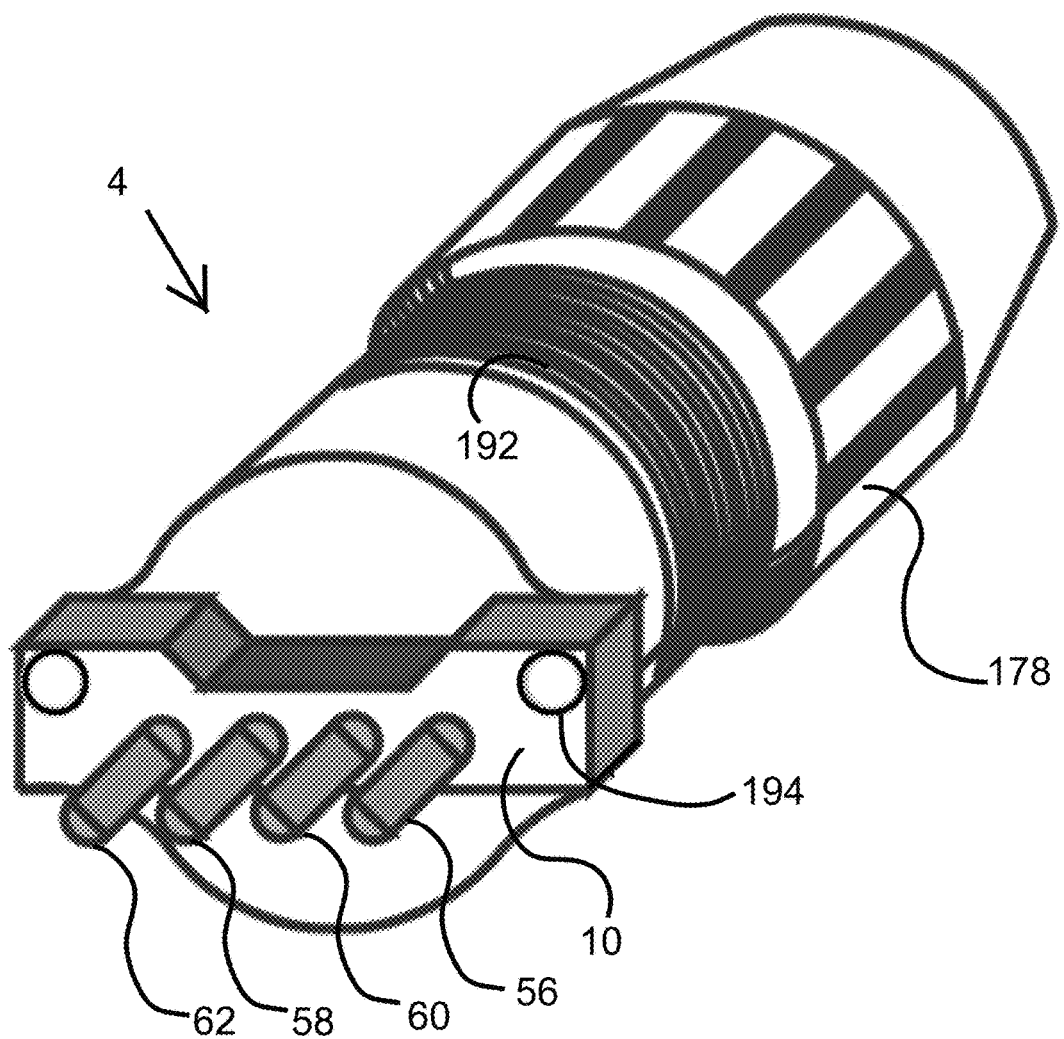
FIG. 11 is a perspective view of one of the cable-to-box connectors of FIG. 1.
Figure 12:
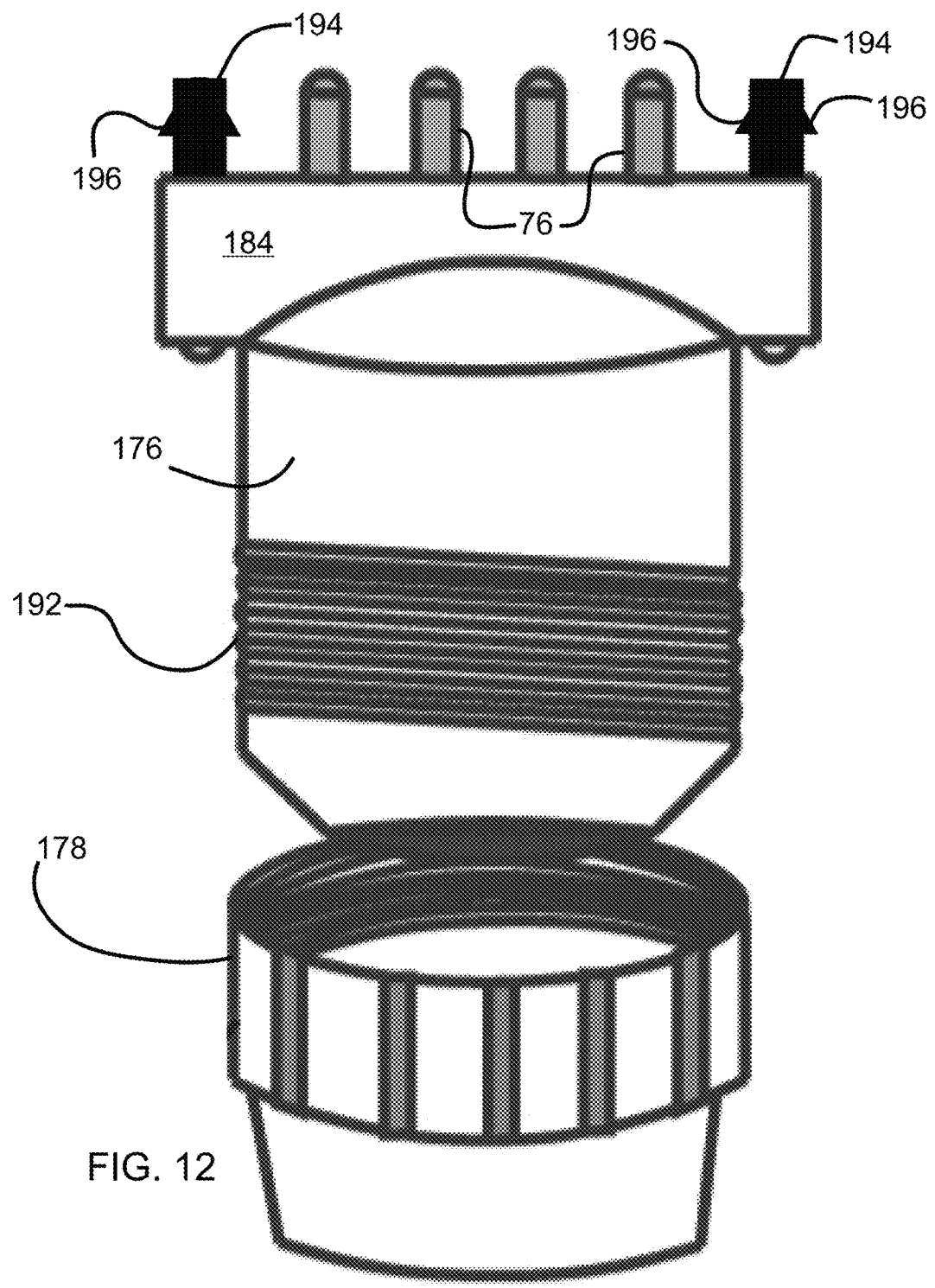
FIG. 12 is a plan view of the cable to box connector of FIG. 11, with a second anchor embodiment, and with the cable extending from the connector body not shown for clarity.
Figures 13A, 13B:
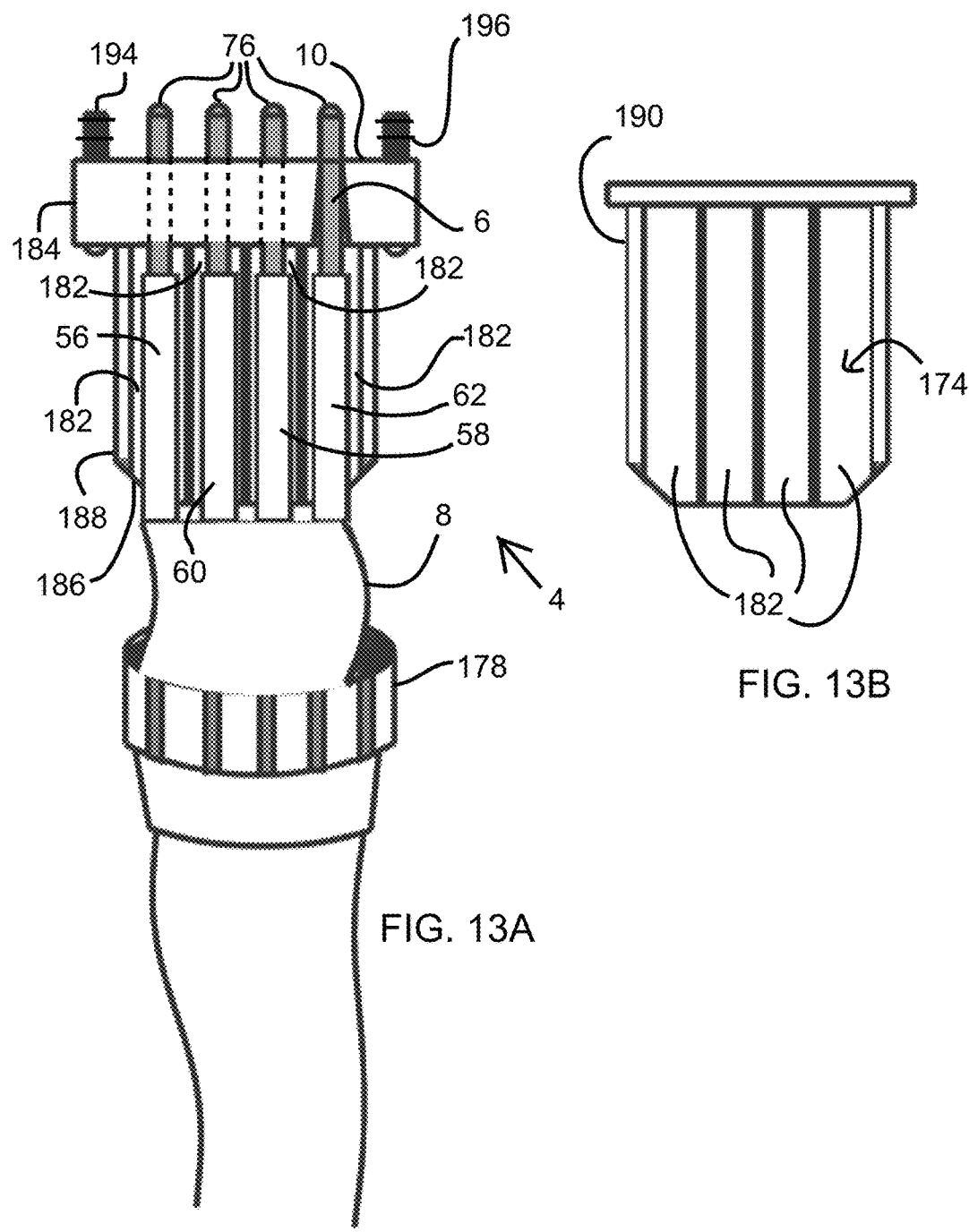

Two common shapes for the electrical box are a rectangular 36, shown in, for example, FIGS. 1, 3, and 7-9, and an octagonal 38, shown in FIGS. 4 and 10, though other shapes, such as circular and square are conceived as part of the disclosed invention.

The octagonal electrical box 38 is a substantially octagon shaped electrical box 16 of standard size made up of a preferably non-conductive composite material, which works on the same principles of the rectangular electrical box 36. Built into the octagon electrical box 38 are intra-box circuits 20 of conductive wires 6 that selectively carry the circuit throughout the electrical box 16 and connect to each of the couplers 18. In the octagonal electrical box 38, four couplers 44, 46, 48, 50 are preferably located, one on the exterior of each of four alternating side walls 22 of the octagonal electrical box 38, with circuit interrupters 42 preferably on the alternating interior side walls 22 which do not have couplers 18. The octagonal electrical box 38 can connect to standard 2-wire or 3-wire cable 8 with a ground 62, and preferably includes in the intra-box circuitry 20 a first and a second hot line 56, 58, a neutral line 60, and a ground line 62. This allows the octagonal electrical box 38 to be used in the application of 220V and 110V wiring. As with the electrical box 16 above, with the intra-box circuitry 20 being built into the electrical box 16 itself, the octagon electrical box 38 can act as a distribution point. Utilizing the circuit interrupters 42, current can be directed to various applications through the four couplers 44, 46, 48, 50. Standard lighting systems or other appliances may be connected to the octagon electrical box 38 through an insert electrical connection 34 in the form of fixture wire connectors 68 into which the fixture wires 6 can be inserted. The fixture wires 6 would then be secured to the fixture wire connectors 68 with set screws 70 or other mechanical fasteners. Connection to other electrical boxes 16 is preferably made via couplers 18, preferably using the cable-to-box connector 4 described below. In further embodiments, the various wires 6 in the cable 8 may be attached to the couplers 18 of the electrical box 16 without using a cable-to-box connector 4. A plurality of circuit interrupters 42 is built into the octagonal electrical box 38, to selectively open/break the circuit when and where needed in order to control the activation and therefore the direction of the circuit. The circuit interrupters 42 are located on the inside walls 22 of the octagonal electrical box 38 to allow for each access once the octagonal electrical box 38 is in place. Preferably two or more fixture fastening points 72 are disposed on a periphery of the octagonal electrical box to fasten the fixture 28 to the octagonal electrical box 38, preferably with screws or other mechanical fasteners.

Figure 5:
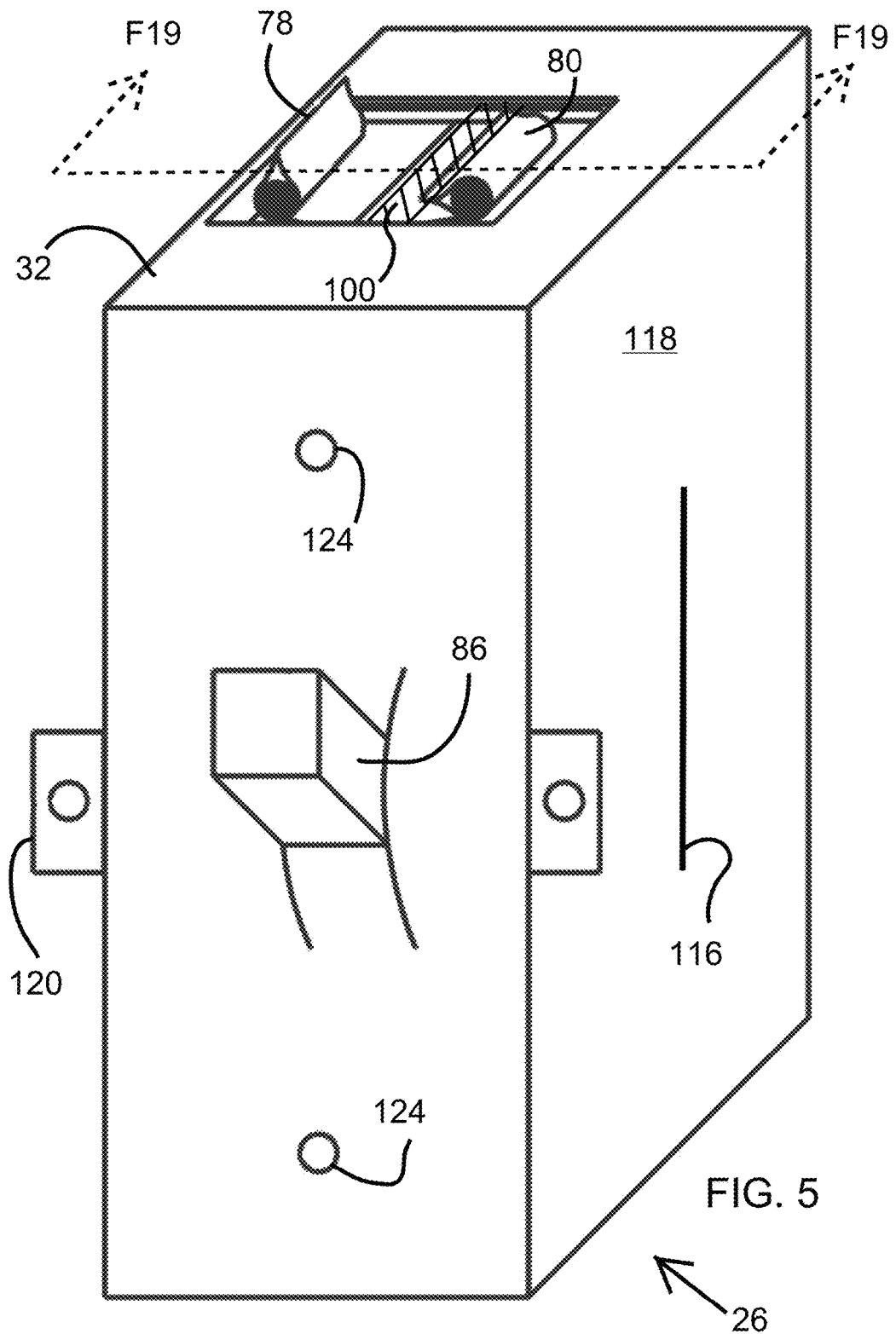
FIG. 5 is a perspective view of a single switch electrical insert.
Figure 6:
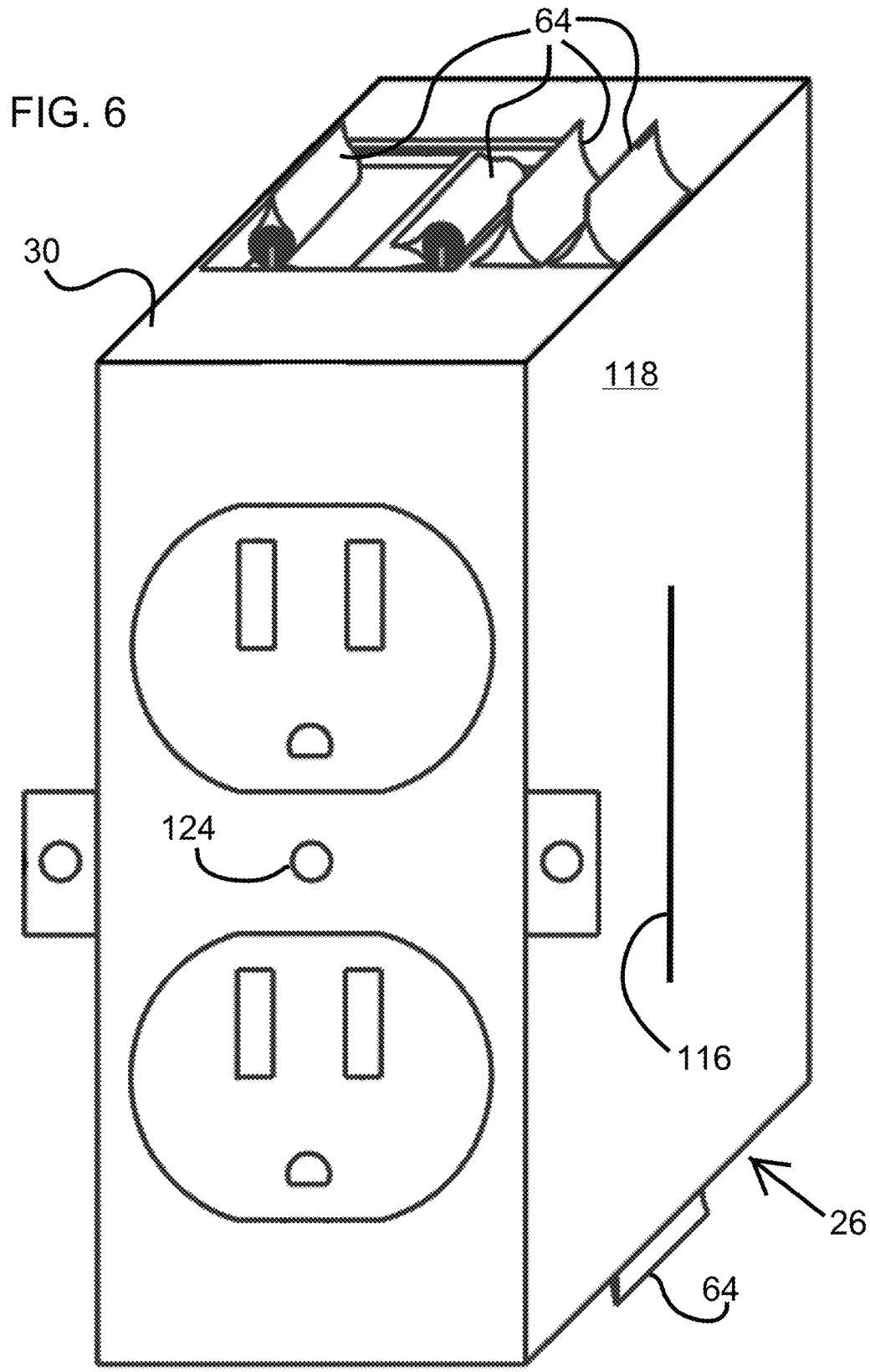
FIG. 6 is a perspective view of the outlet electrical insert of FIG. 1.
Figure 7:
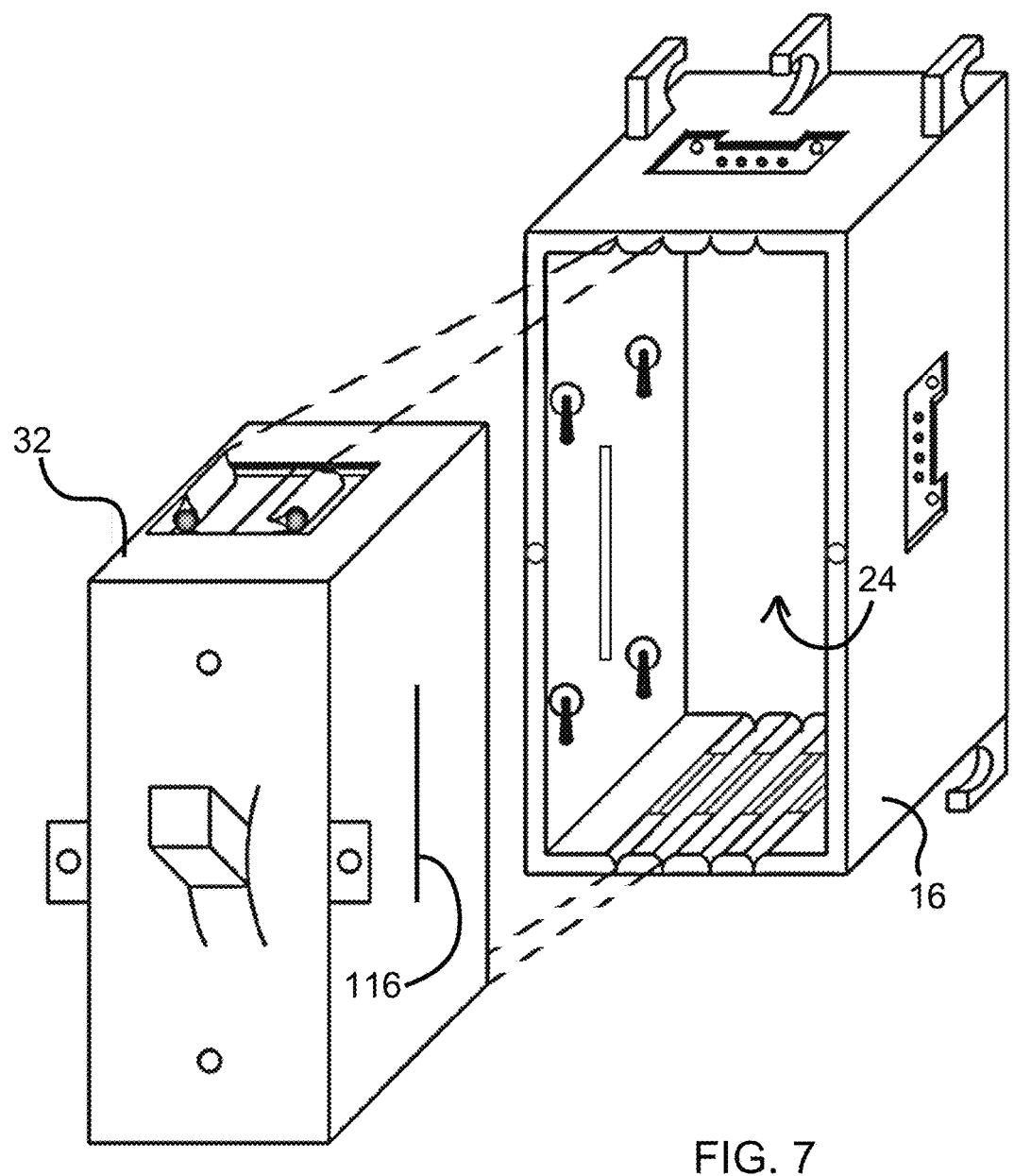
FIG. 7 is an exploded perspective view of the single switch electrical insert of FIG. 5 inserted into the electrical box of FIG. 1.

ELECTRICAL INSERTS: Turning to FIGS. 1, 5-8, and 24-31, electrical inserts 26, such as switches or light switch electrical inserts 32, outlet/receptacle electrical inserts 30, and fixture electrical inserts 28, may be designed to be inserted into the concavity 24 of the electrical box 16, and retained securely therein. Non-circuitry portions of the electrical inserts 26 are preferably formed of non-electrically conductive material and are injection molded or otherwise fabricated, for example, in two or more parts, so as to be able to install all circuitry within the electrical insert 26 as or before sealing the electrical insert 26 for end use. The single switch electrical insert 74, as shown in FIG. 1, for example, is specially designed to work with the electrical box 16 of the disclosed electrical distribution system 2. Instead of standard connections using exposed wires 6 and screws 70, the single switch electrical insert 74 preferably uses insert electrical connections 34 such as conductive blades 64 on the electrical insert 26 that slide into conductive rails 66 or channels in the electrical box 16 to create an electrical connection 34 between the electrical insert 26 and the intra-box circuitry 20. It is understood that wires 6 and screws 70 may also or alternatively be used to create the insert electrical connection 34, such as in FIG. 4, and/or other forms of insert electrical connections 34 may be used, such as conductive prongs 76 inserting into conductive sockets 52, similar to the cable-to-box connector 4 connecting to the couplers 18, for example. In the embodiments shown in FIGS. 1, 5, and 7, the single switch electrical insert 74 has a first and a second preferably folding hot blade 78, 80 on the exterior of the upper and lower walls of the single switch electrical insert 74. A stationary neutral and ground blades 82, 84 may also be included that can be run directly to the end fixture 28 or outlet 30, for example. Alternatively, one or both of the neutral and the ground blades 82, 84 may be omitted in the single switch electrical insert 74, based a particular the design of the intra-box circuits 20, and especially if the neutral and the ground lines 60, 62 run uninterrupted around the electrical box 16 connecting all of the couplers 18. For embodiments with folding blades 64, the blades 64 may be moved from an upward engaged position, as shown in the first hot blade 78 in FIG. 1, to a retracted disengaged position, as shown in the second hot blade 80 in FIG. 1. With the ability to selectively move the blades 64 between the engaged and disengaged positions, either, both, or neither of the hot blades 78, 80 may be used at a given time based on the circumstance. With a single switch electrical insert 74 as shown, preferably both the first and the second hot lines 56, 58 in the in the electrical insert 26 are selectively switched by the first switch 86. In this way, for example, two different fixtures 28, one on the first hot line 56 and one on the second hot line 58, may both be controlled using the single first switch 86. Additionally, as seen in FIGS. 38-41, double switch electrical inserts 88 may be used to individually selectively control the flow of each of the first and the second hot lines 56, 58 using the first and a second switch 86, 90 respectively.

Figure 8:
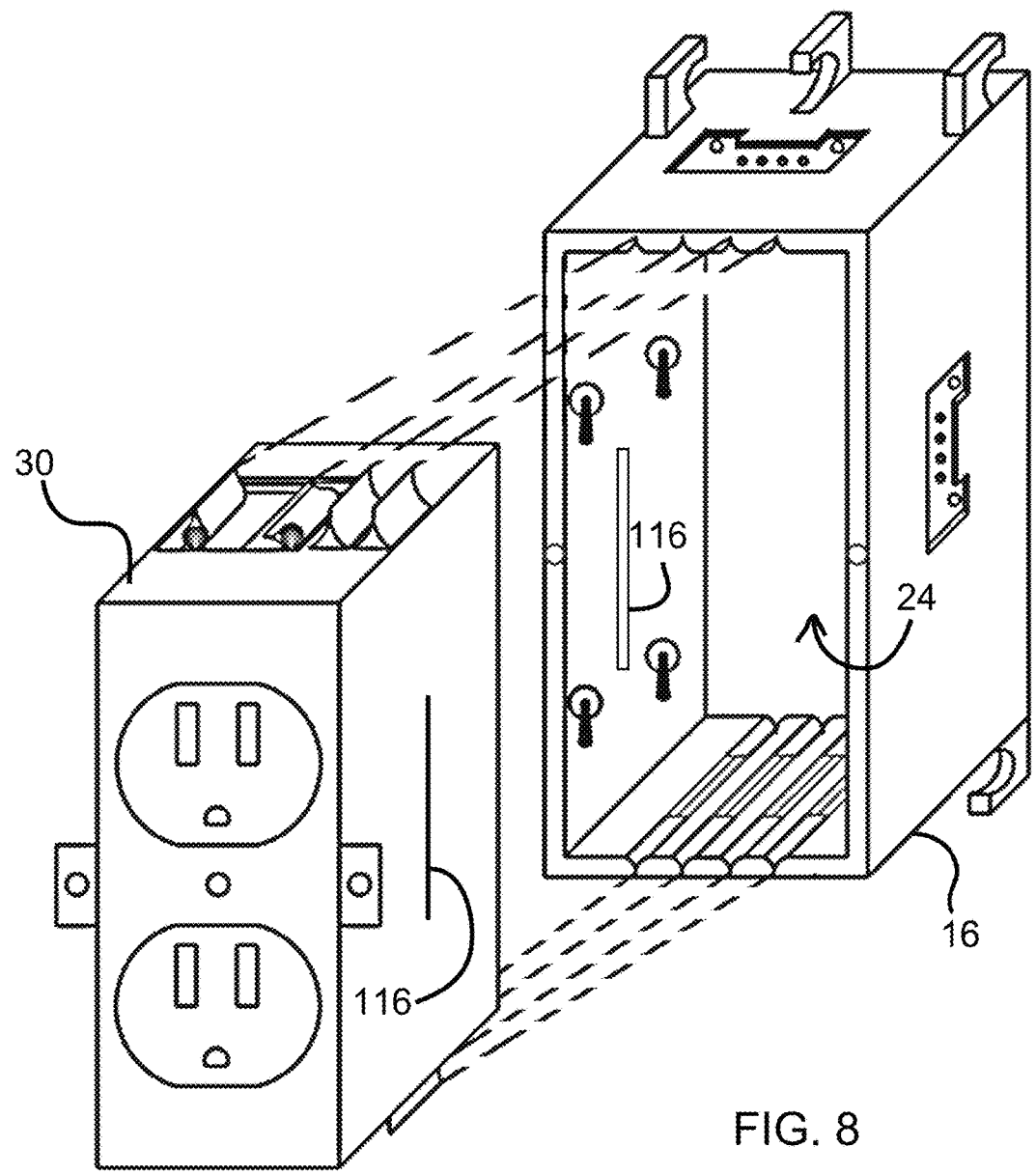
FIG. 8 is an exploded perspective view of the outlet electrical insert and the electrical box of FIG. 1.
Figure 9:
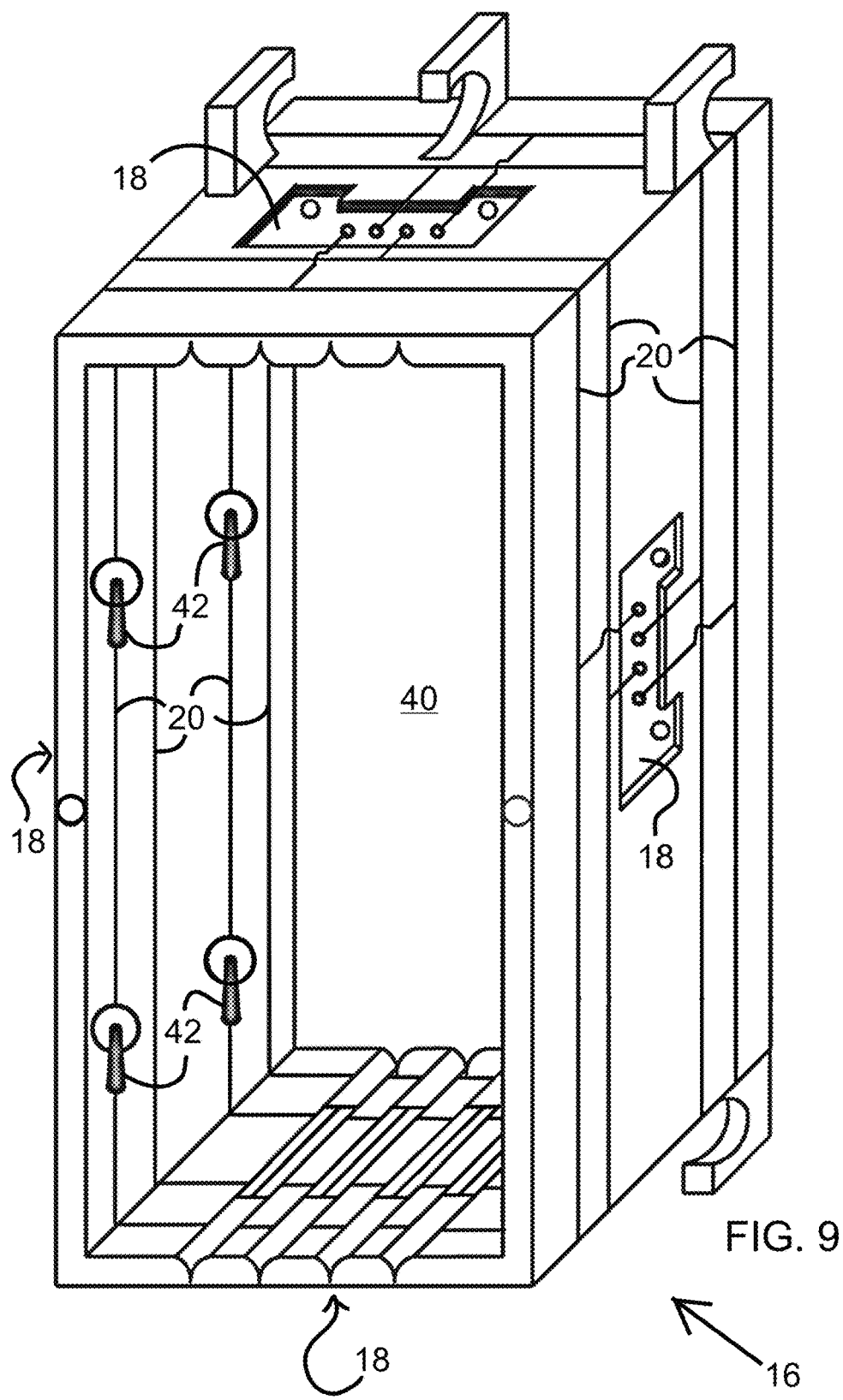
FIG. 9 is a partially see through perspective view of the electrical box of FIG. 1, showing the intra-box circuits.
Figure 24:
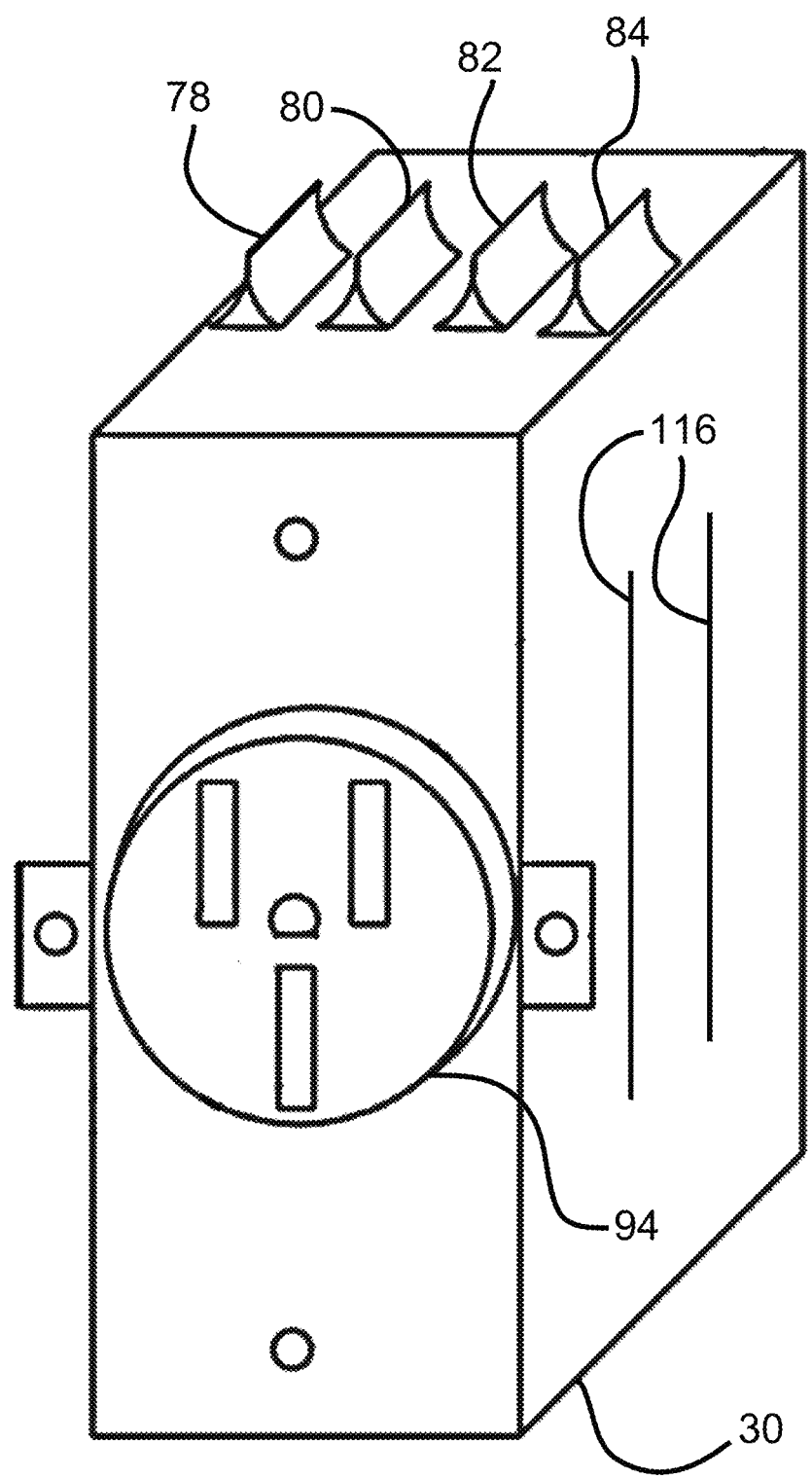
FIG. 24 is a perspective view of a 220 volt outlet electrical insert.
Figure 25:
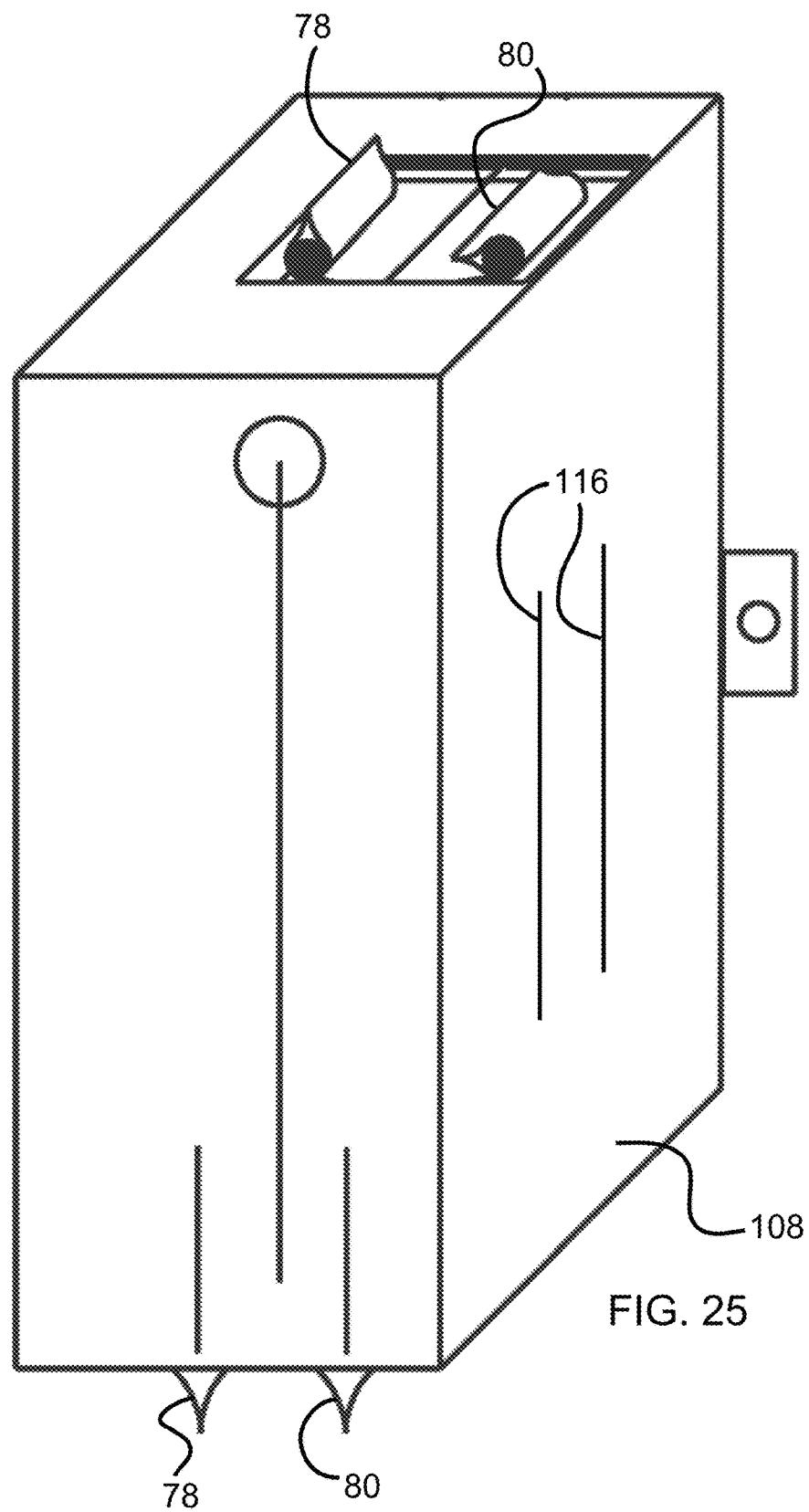
FIGS. 25 and 26 are respective partial see through back and front perspective views of a 3-way switch electrical insert.
Figure 26:
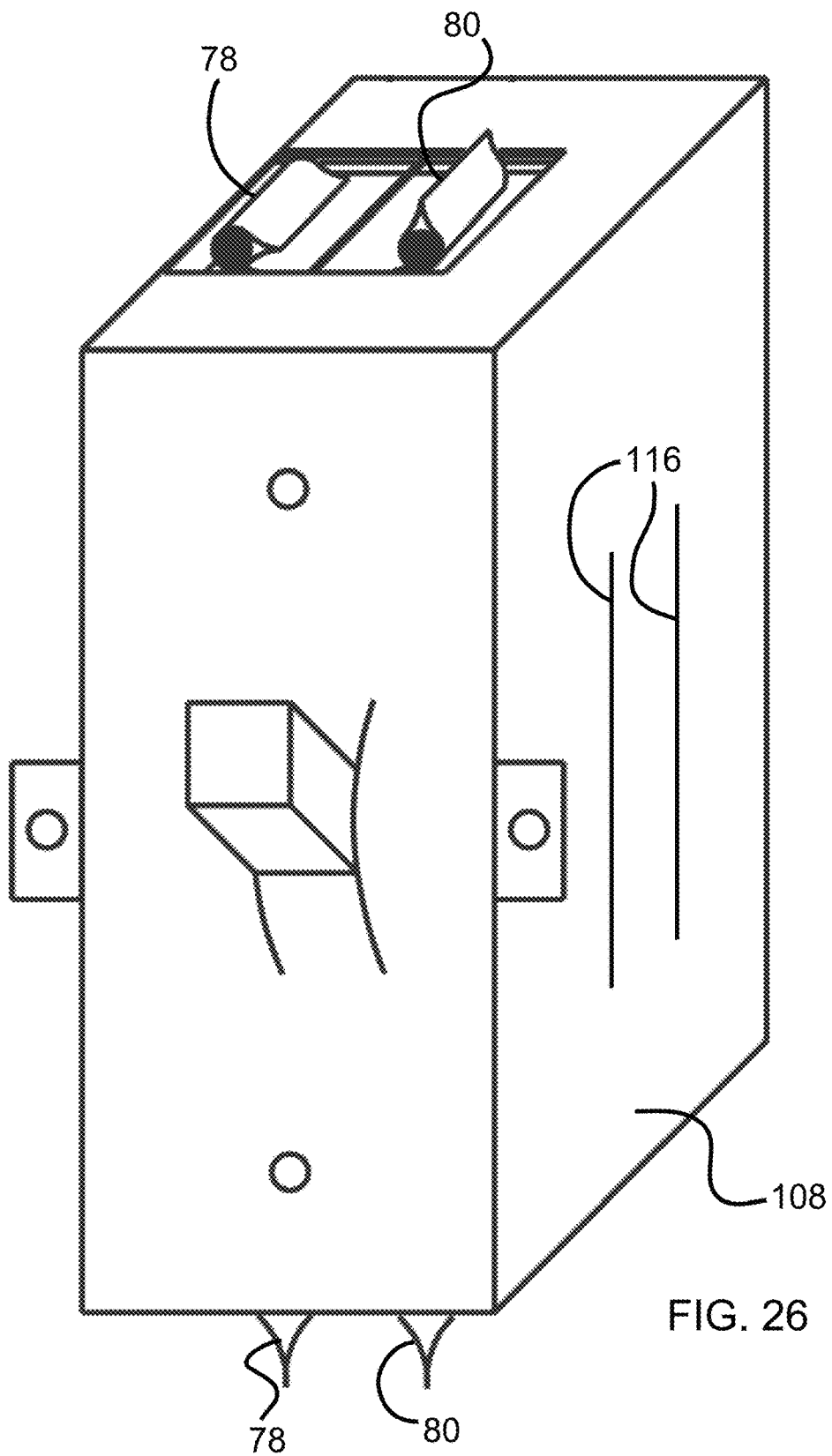
Figure 27:
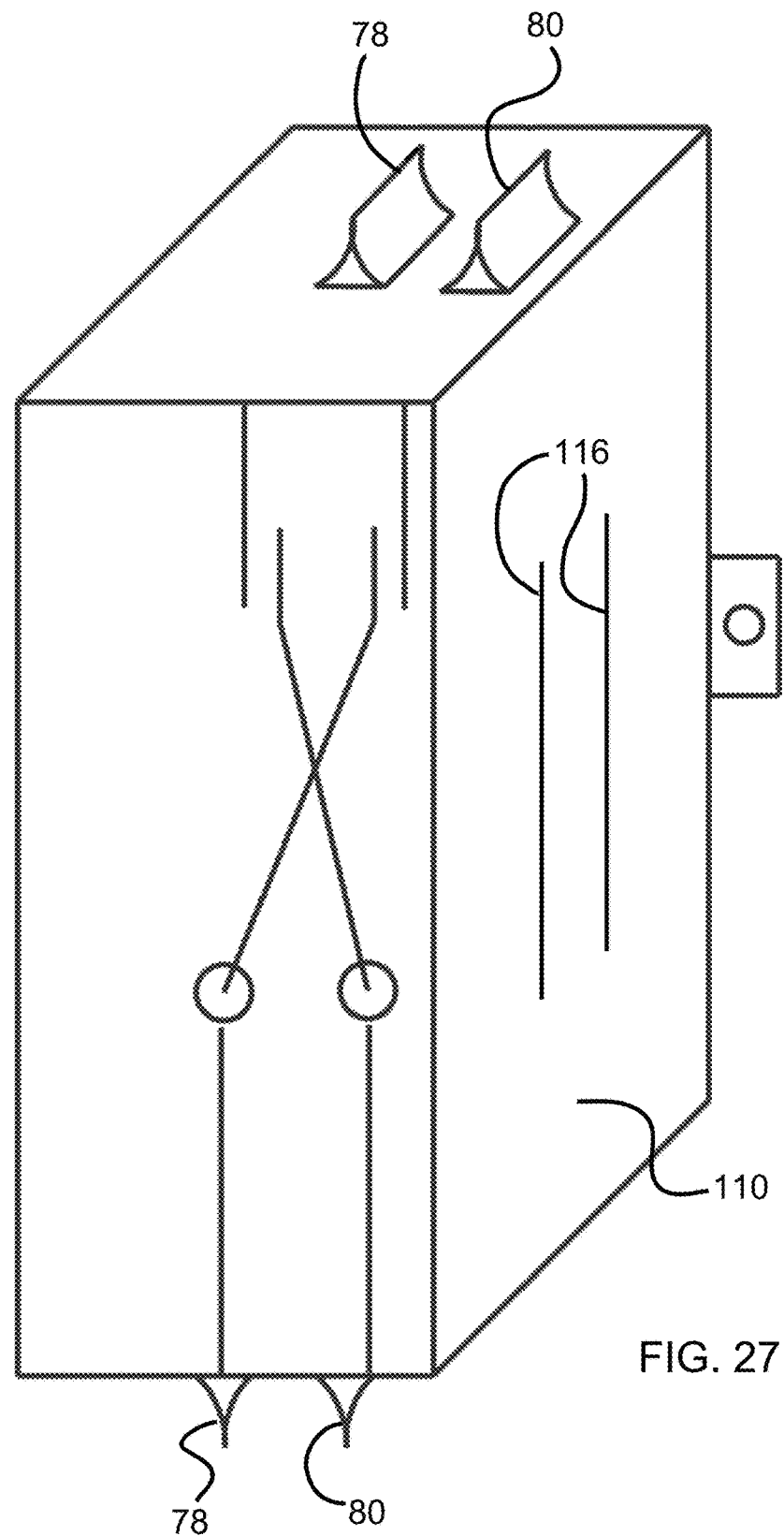
FIGS. 27 and 28 are respective partial see through back and front perspective views of a 4-way switch electrical insert.
Figure 28:
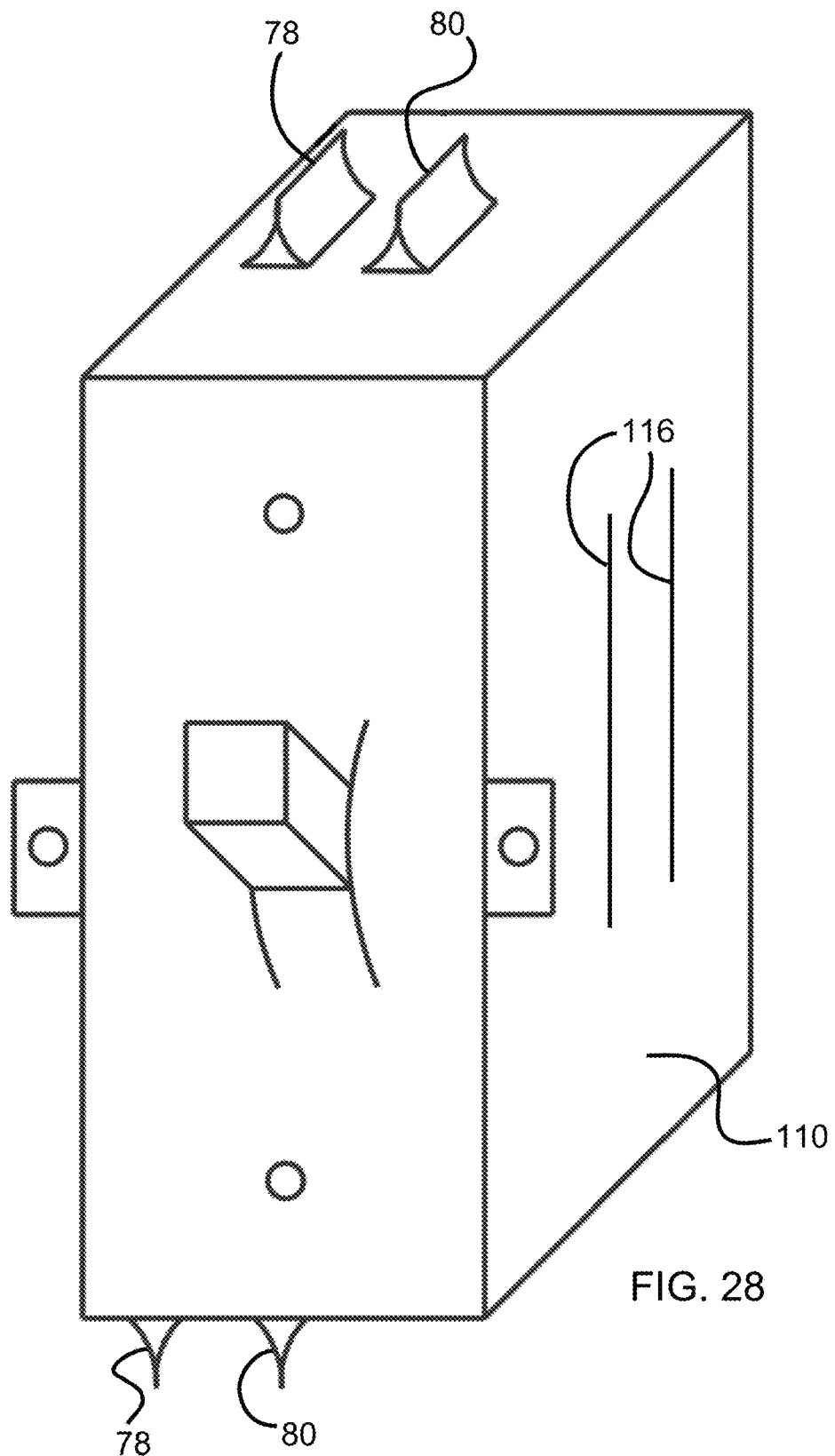

INSERT ELECTRICAL CONNECTIONS: As shown in FIGS. 1, 8 and 24, for example, an outlet electrical insert 30, which includes a preferably a standard size outlet 92 or receptacle, is designed, like the switch electrical inserts 32, to fit within and to electrically connect to the electrical boxes 16. The outlet electrical insert 30 has insert electrical connections 34 similar to the switch electrical inserts 32, such as conductive blades 64, to create an electrical connection between the electrical insert 26 and the intra-box circuitry 20. It is understood that wires 6 and screws 70 may also be used to create the insert electrical connection 34, and other forms of insert electrical connections 34 such as conductive prongs 76 inserting into conductive sockets 52, for example. In the embodiments shown, the outlet electrical insert 30 has a first and a second preferably folding hot blade 78, 80 on the exterior of the upper and lower walls of the single switch electrical insert 74. Preferably stationary neutral and ground blades 82, 84 are included. For embodiments with folding blades 64, the blades 64 may be moved from an upward engaged position, as shown in the first hot blade in FIG. 1, to a retracted disengaged position, as shown in the second hot blade in FIG. 1. With the ability to selectively move the blades between the engaged and disengaged positions, either, both, or neither of the hot blades 78, 80 may be used at a given time based on the circumstances. The hot line 56, 58 in the electrical box 16 that is electrically connected to a powered hot line 56, 58 would help determine which hot blade 78, 80 to move to the engaged position, and therefore be active. In situations where both hot lines 56, 58 are powered, the hot blade 78, 80 raised would be determined by which of the two powered hot lines 56, 58 the outlet electrical insert 30 was to be powered by. As with the switch electrical insert 32, the circuit interrupters 42 in the mating electrical box 16 may be used to appropriately direct the current to the outlet electrical insert 30.

The folding blades 64 allow the selectively choosing between which of the first and the second hot lines 56, 58 to use when only one hot line 56, 58 is desired, for example, when using a 2-strand wire. To select one of the two hot lines 56, 58 to electrically connect to, the hot blade 78, 80 corresponding to the selected hot line 56, 58 would be raised into an engaged position, and the hot blade 78, 80 corresponding to the unselected hot line 56, 58 would be lowered into the disengaged position. To electrically connect to both the first and the second hot lines 56, 58, for example when using a double switch electric insert 88 to control two different hot lines 56, 58, or when using a 220 outlet electrical insert 94 (see FIG. 24), both hot blades 78, 80 would be raised in an engaged position. Alternatively, one or both of the hot blades 78, 80 could be in a fixed engaged position, as for example, with a 220 outlet electrical insert 94.

Figure 19:
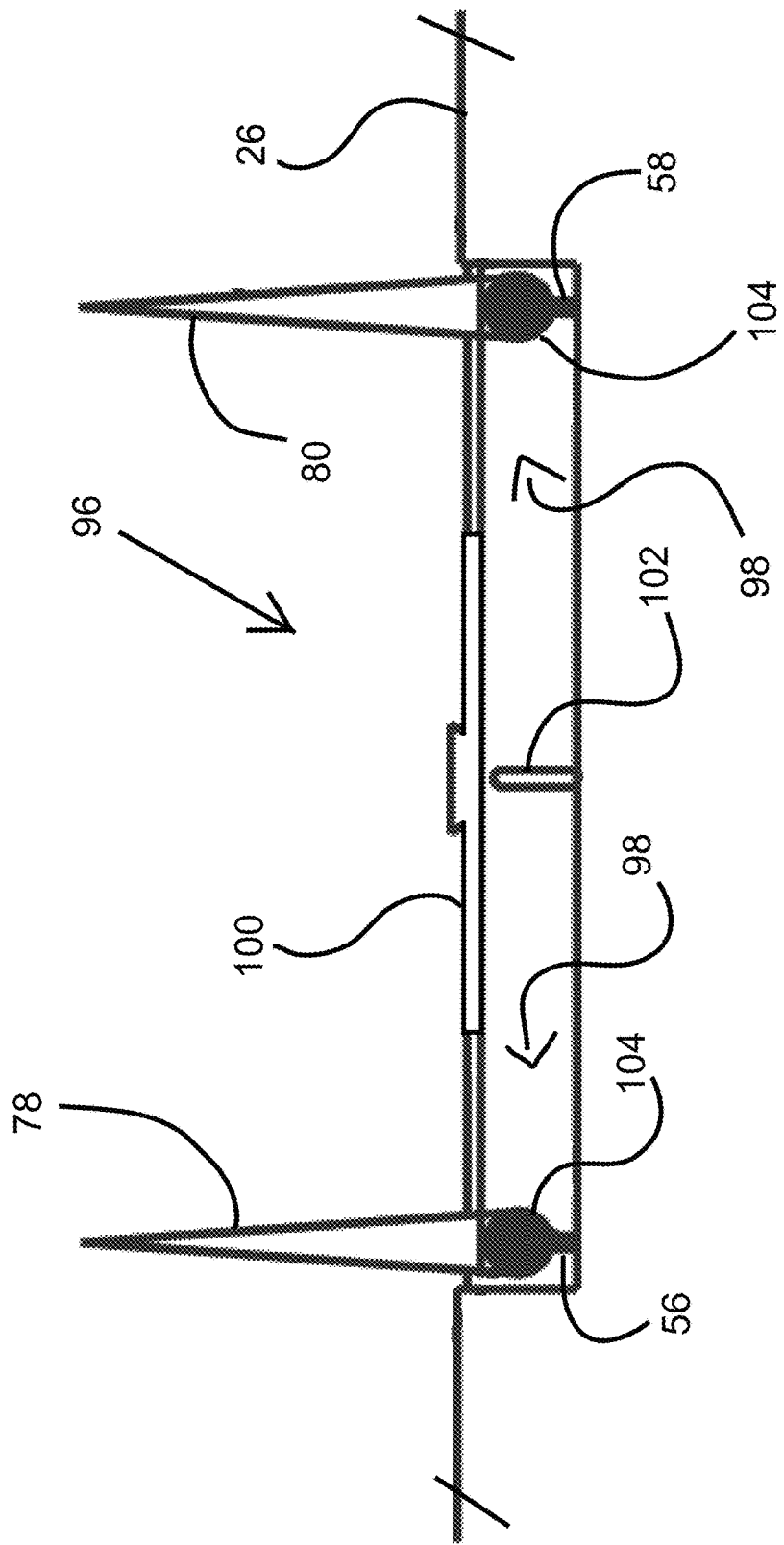
FIG. 19 is a partial sectional view of a folding blade selector of the electrical box of FIG. 11 along the sectional line F19, but with the two folding conductive blades each in an engaged upright position.
Figure 20:
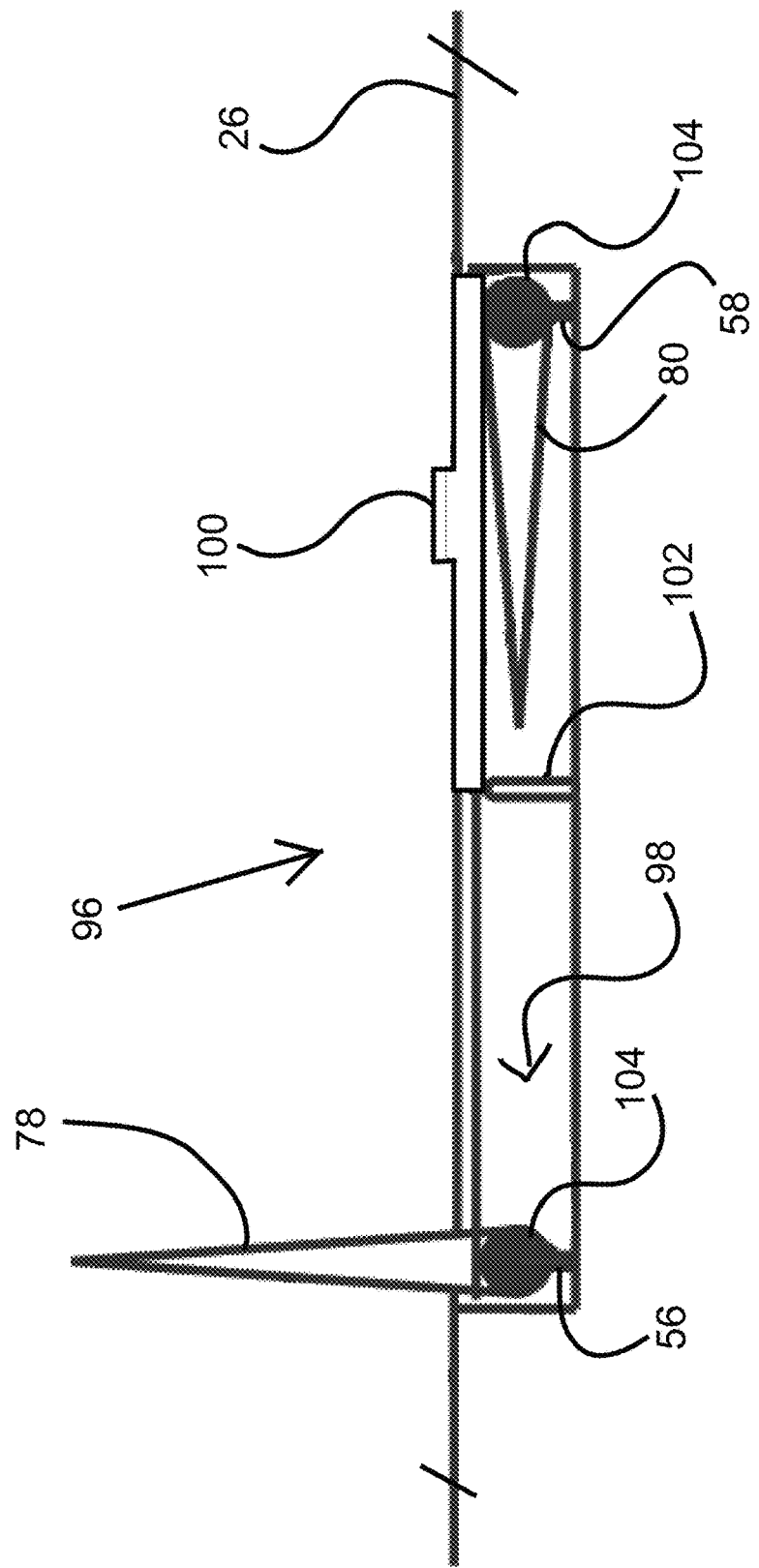
FIG. 20 is a sectional view of the folding blade selector of FIG. 19, but with one conductive blade in an upright engaged position and the other conductive blade in a lowered disengaged position, as is shown as in FIG. 11.

As shown in FIGS. 19 and 20, to aid in selectively choosing a given hot line 56, 58 of the intra-box circuit 20 to electrically connect to, and to aid in retaining a folding blade 64 in a disengaged position, a folding blade selector 96 may be provided with the folding hot blades 78, 80 of the electrical inserts 26. The folding hot blades 78, 80 would be located in a blade selector recess 98 provided in the outer upper and/or lower wall of the electrical insert 26. Over the top of the blade selector recess 98 would preferably be a nonconductive sliding cover 100 that slides back and forth to allow access either hot blade 78, 80 (sliding cover 100 shown partially see through in FIG. 5). The sliding cover 100 could release one hot blade 78, 80 while covering the other 78, 80, or could allow both of the hot blades 78, 80 to be in an upright engaged position. The sliding cover 100 would help prevent arcing from a hot blade 78, 80 in a recessed position and its corresponding unselected hot line 56, 58. A nonconductive blade barrier 102 between the two hot blades 78, 80 helps prevent arcing between the two hot blades 78, 80. A blade spring 104 is preferably attached to each folding blade 64 so as to cause the folding blade 64 to bias into an upright engaged position when the sliding cover 100 is slid past the folding blade 64. The blade spring 104 also keeps tension on the folding blade 64 when it is in the upright position. Ratchets, detents, and/or other means may be used to selectively maintain the conductive blades 64 in a selected position.

An advantage of the folding blade 64 according to the embodiment shown is especially evident when working with light switches 32. Since the neutral line 62 preferably goes straight from the power source 106 to the light fixture 28, for example, it does not need to pass through the switch electrical insert 32. There are preferably two folding conductive hot blades 78, 80 on the outside of the top wall of the switch electrical insert 32, which provides the option of which hot line 56, 58 circuit the switch 86 controls. The outside of the bottom wall may also have folding hot blades 78, 80 or stationary hot blades 78, 80. Additionally, with 3-way switch electrical inserts 108, discussed below, folding blades 64 would be used preferably only on the side of the common terminals so that the circuit which is controlled by the switch 86 could be selected. The traveler terminals could be fixed blades 64.

The disclosed electrical distribution system also facilitates the use of 3-way and 4-way switch electrical inserts 108, 110. Shown in FIGS. 25 and 26, the folding blades 64 on the electrical insert 32 may be utilized with the 3-way switch 108, also known as a single pole double throw switch, allowing the choice of either common leg to be used use when using 3-strand cable. Shown in FIGS. 27 and 28, both the first and the second hot lines 56, 58 would preferably be used in a 4-way switch electrical insert 110 on both the first and the second insert electrical connections 112, 114. The 4-way switch electrical insert 110 would preferably have two fixed hot line blades 78, 80 which would be used as the travelers.

RETAINERS: As show in, for example, FIG. 1, the electrical insert 26 preferably has a retainer 116 along one or more outside walls 118 that interacts with the inside wall 22 of the concavity 24. In inside wall 22 of the concavity 24 may be flush, have a mating retainer 116, or have another surface feature to interact with the electrical insert 34 retainer 116. The electrical insert 34 retainer 113 may be one or more ridges convexed outward from the electrical insert 34, and may interact with a bevel, groove, or depression retainer 116 in the inner wall 22 of the concavity 24 and/or with an additional ridge retainer 116 on the inner wall 22 of the concavity 24 to snap-in frictionally retain the electrical insert 34 into the electrical box 16. FIGS. 24-28 show multiple ridge retainers 116 disposed on the side walls 118 of the electrical inserts 34. The electrical insert 34 retainer 116 could alternatively, or additionally be a bevel, groove, or depression retainer 116 that interacts with a ridge retainer 116 convexed on the inner wall 22 of the concavity 24. The electrical insert 34 retainers 116, if present, may be on only one side wall 118 of the electrical inserts 34, but are preferably disposed on two opposing side walls 118, and may be on three or four side walls 118 of the electrical inserts 34, and preferably mating with retainers 118 disposed on the inner wall 22 of the concavity 24 of the electrical box 16. Additionally or alternatively, one or more screws 70 or other fasteners may be attached through a fastener flange 120 of the electrical insert 34 and into corresponding and aligned electrical insert-to-box fastener holes 122 on the electrical box 16, to releasably retain the electrical insert 34 into the electrical box 16. A standard cover plate (not shown) may be used to cover the electrical insert 34, preferably attaching the cover plate to the electrical insert 34 to via a faster screwed into a faceplate fastener hole 124. Preferably standard screws 70 may be used for such fastening.

CIRCUIT INTERRUPTERS. Turning next to FIGS. 1, 2, and 21-23 for example, a circuit interrupter 42 is shown. The circuit interrupter 42, preferably a circular shaped piece which fits into a molded opening 126 in the electrical box 16, allows for the control of activation and direction of the intra-box circuits 20. There is preferably a circuit interrupter 42 on each hot line 56, 58 on each side of each coupler 18 in the electrical box 16, allowing for the control of electrical flow on each hot line 56, 58 on each side of each coupler 18. As shown in FIG. 2, the first hot line 56 in the first coupler 44 connects to the first hotline 56 in a first intra-box circuit branch 128, which is directly connected to a second and a fourth circuit interrupters 138, 142. The first hot line 56 in the second coupler 46 connects to the first hotline 56 in a second intra-box circuit branch 130, which is directly connected to the second and a fifth circuit interrupters 138, 144. The first hot line 56 in the third coupler 48 connects to the first hotline 56 in a third intra-box circuit branch 132, which is directly connected to the fifth and a seventh circuit interrupters 144, 148. The first hot line 56 in the fourth coupler 50 connects to the first hotline 56 in a fourth intra-box circuit branch 134, which is directly connected to the fourth and the seventh circuit interrupters 142, 148. The second hot line 58 in the first coupler 44 connects to the second hotline 58 in the first intra-box circuit branch 128, which is directly connected to a first and a third circuit interrupters 136, 140. The second hot line 58 in the second coupler 46 connects to the second hotline 58 in the second intra-box circuit branch 130, which is directly connected to the first and a sixth circuit interrupters 138, 146. The second hot line 58 in the third coupler 48 connects to the second hotline 58 in the third intra-box circuit branch 132, which is directly connected to the sixth and an eighth circuit interrupters 146, 150. The second hot line 58 in the fourth coupler 50 connects to the second hotline 58 in the fourth intra-box circuit branch 134, which is directly connected to the third and the eighth circuit interrupters 140, 150. For additional flexibility in circuitry logic, circuit interrupters 42 may be placed additionally or alternatively on either or both of the neutral and the ground lines of the intra-box circuits 20.

Figure 21:
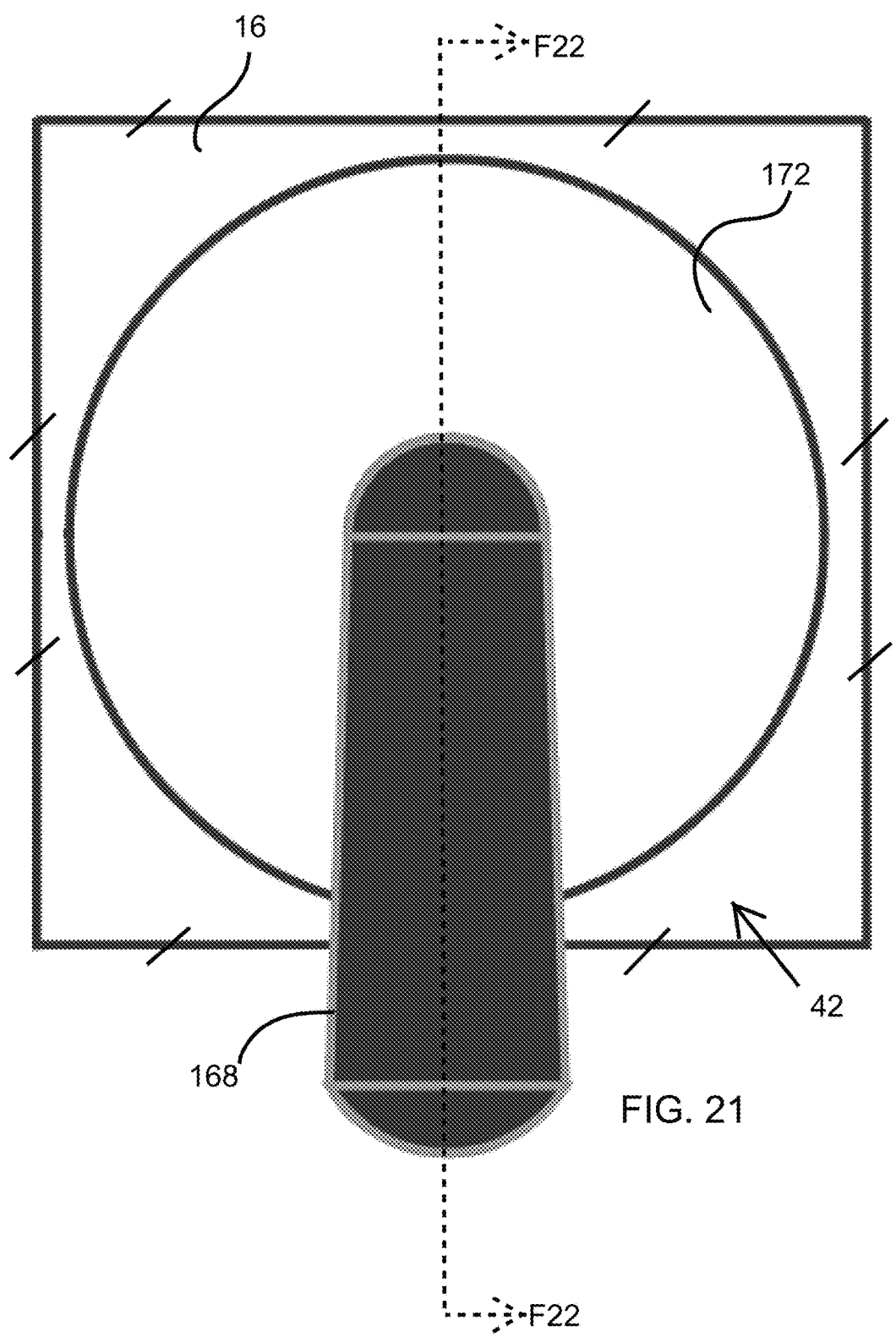
FIG. 21 is a front plan view of one of the circuit interrupters of FIG. 1.
Figure 22:
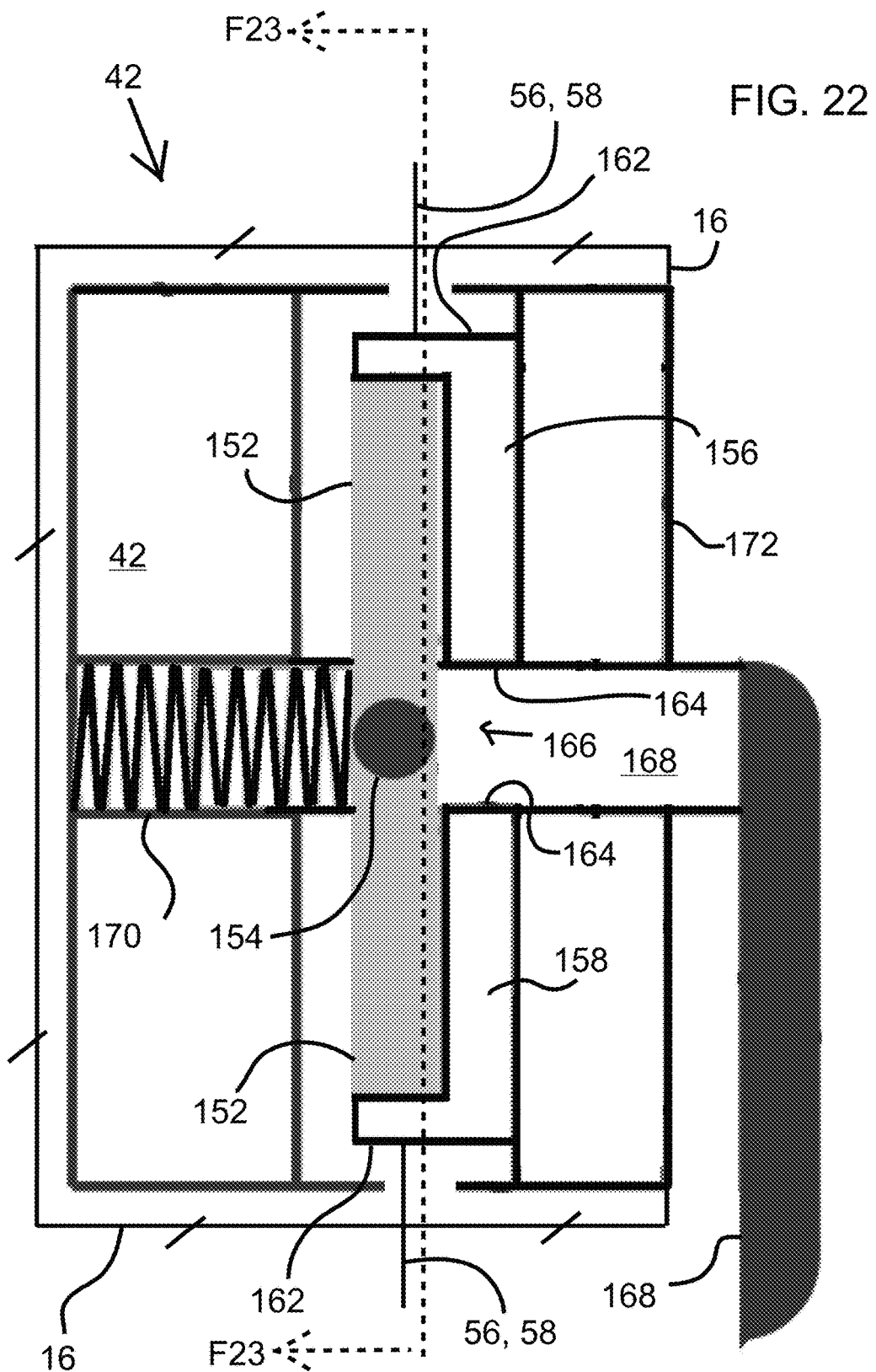
FIG. 22 is a sectional view of the circuit interrupter of FIG. 21 along the sectional line F22.
Figure 23:
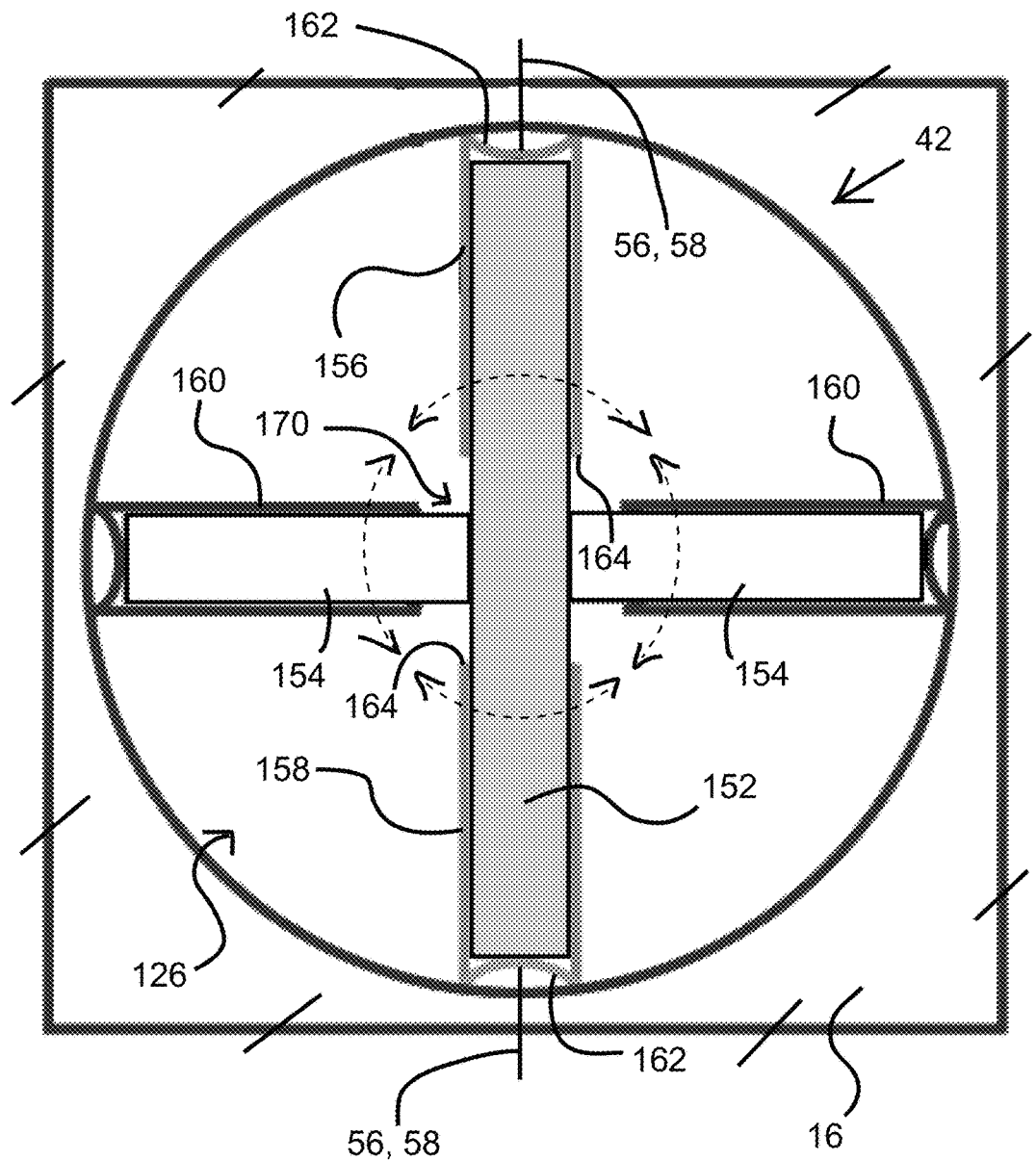
FIG. 23 is a sectional view of the circuit interrupter of FIG. 22 along the sectional line F23.

Turning to FIGS. 21-23, the circuit interrupter 42 contains a conductive pin 152, a non-conductive pin 154, a first conductive seat 156, a second conductive seat 158, and a non-conductive seat 160. The conductive pin 152 and the non-conductive pin 154 are attached to one another substantially orthogonally. The two conductive seats 156, 158 are arranged substantially orthogonally to the non-conductive seat 160. A hot line 56, 58 from a respective branch 128, 130, 132, 134, is connected to a respective first side 162 of each conductive seat 156, 158. If, for example, the circuit interrupter in FIG. 23 was the first circuit interrupter 136 from FIG. 2, then the hot line 58 at the top of the figure connecting to the first conductive 156 seat would be the second hot line 58 of the second intra-box circuit 130, and the hot line 58 at the bottom of the figure connecting to the second conductive seat 158 would be the second hot line 58 of the first intra-box circuit 136. On a respective second side 164 of each conductive seat 156, 158 is a circuit gap 166 separating the two conductive seats 156, 158. When the conductive pin 152 is turned as to sit in the first and second conductive seats 156, 158, a position referred to as a closed circuit position and shown in FIGS. 21-23, the conductive pin 152 completes the circuit from the first conductive seat 156 to the second conductive seat 158, and thus completing the circuit between the two hot lines 56, 58 of the two adjacent intra-box circuit branches 128, 130, 132, 134. When the circuit interrupter 32 is turned so that the non-conductive pin 154 sits in the first and the second conductive seats 156, 158, and the conductive pin 152 sits in the non-conductive seat 160, a position referred to as an open circuit position, electricity cannot pass between the two conductive seats 156, 158, and the circuit between the two adjacent intra-box circuit branches 128, 130, 132, 134 would be inactive.

The circuit interrupter 42 is preferably changed from an open circuit position to a closed circuit position by rotating a preferably non-conductive lever 168 that is preferably accessible from the concavity 24, to allow ease of access after the electrical box 16 has been installed, and continued access after the room wall around the electrical box 16 has been erected. The lever 168 preferably changes the circuit interrupter 42 from an open to a closed position by pushing in on the circuit interrupter 42 lever 168 while turning the lever 168 ninety degrees. The lever 168 preferably connects to the conductive pin 152. The lever 168 preferably at least partially fills the circuit gap 166, electrically shielding the two conductive seats 156, 158 from one another and aids in preventing arcing between the two conductive seats 156, 158. Preferably, when the conductive pin 152 is seated in one of the conductive or non-conductive seats 160, 162, 164, the lever 168 is prevented from rotating to a new position without first pressing the lever 168 in and thus pushing the conductive pin 152 in towards the a tension spring 170 and out of the seat to allow for free rotation. The tension spring 170 inside the circuit interrupter 42 preferably exerts force against and holds pressure on the conductive pin 152 to help the conductive pin 152 to maintain good electrical contact with the conductive seats 156, 158. Preferably a circular interrupter plate 172 covers the conductive pins 152 from the interior of the concavity 24 to prevent accidental short circuit. While the circuit interrupter 42 design disclosed is a preferred design, other variations and designs of circuit interrupters 42 may be used to electrically open and close the intra-box circuitry 20 in the electrical box 16.

CABLE-TO-BOX CONNECTOR: Turning to FIGS. 11 to 18, the cable-to-box connector 4 has an interior 174 preferably comprised of non-conductive material, to prohibit current passing between the exposed wires 6 and to a preferably molded metallic exterior 176. The exterior 176 of the cable-to-box connector 4 preferably interacts with threaded ring(s) 178 and corresponding sleeve(s) 180, both preferably metallic, so as to lend strength, and to preferably comply with NEC requirements.

The cable-to-box connector 4 has slots 182 made to receive 2 or 3 strand cable wires 6 of various gauges. The cable-to-box connector 4 has a head 184 and an engaging face 10, preferably with a shape or engaging geometry that mates or engages with the coupler 18 and prevents improper instillation when connecting the cable-to-box connector 4 to the coupler 18 of the electrical box 16. In the embodiment shown, a cross section of the engaging face 10 is not bilaterally symmetric along both a first and second orthogonal axis 12, 14 in a cross section plane. Thus, the cable-to-box connector 4 will preferably only connect to the coupler 18 in one orientation ensuring that the proper wires 56, 58, 60, 62 of the cable-to-box connector 4 are connected to the conductive sockets 52 corresponding to the proper wires 56, 58, 60, 62 in the electrical box 16.

The cable-to-box connector 4 in the embodiment shown in FIGS. 11, 12, 13A, and 13B is a three piece cable-to-box connector 4 made up of a two part preferably round connector body 186 and a threaded ring 178. The connector body 186 opens up to receive the preferably stripped wires 6 into each color coded slot 182 where it will connect to the coupler 18 which makes the connection to the electrical box 16. Preferably the slot 182 for the first hot line 56 will be red, the slot 182 for the second hot line 58 will be black, the slot 182 for the neutral line 60 will be white, and the slot 184 for the ground line 62 will be green. Additional or alternative forms of line identification may be used, including words, symbols, pictures, and tactile identifications. The connector body 186 is shown in an open position, with a bottom body portion 188 being connected to the head 184 and having wires 6 inserted in slots 182, and being located on the left side of the page. An empty top body portion 190 shown on the right side of the page. After inserting the wires 6 in the appropriate slots 182, the top body portion 190 then matingly connects to the bottom body portion 188, by, for example, a protrusion along an edge of the top half slipping into a lip along an edge of the bottom body portion 188 and into a recess in the head 184. The top body portion 190 being laid over the wires 6 to enclose the wires 6 within the cable-to-box connector 4. The threaded ring 178 would then be threaded over the threads 192 on the connector body 186 to seal the cable-to-box connector 4 over the wires 6 and ensure a tight fit. The wires 6 protrude through the engaging face 10 as conductive prongs 76 that matingly fit into conductive sockets 52 in the couplers 18 of the electrical box 16. Also protruding from the engaging face 10 of the head 184 are non-conductive retaining posts 194 that lend strength to the connection between the cable-to-box connector 4 and the coupler 18. Preferably, the retaining posts 194 have an anchor 196 defined on the retaining post 194 that, with the retaining posts 194 matingly fits within a post socket 198 in the couplers 19 to affix the cable-to-box connector 4 to the coupler 18. In alternative embodiments the retaining posts 194 may be screws or bolts that matingly engage with a threaded post socket 198 to affix and retain the cable-to-box connector 4 to the coupler 18.

To further enhance the flexibility of the cable-to-box connector 4, there are several types of threaded rings 178 with various designs so as to facilitate the cable-to-box connector 4 being used with different standardized materials that are on the market. A first embodiment of the treaded ring 178, shown in FIG. 11, for example, is the treaded ring 178 by itself, which will work with wires 6 that have either been cut to proper length so as to not leave excess wire 6 that doesn't have protective sheathing on it, or where local codes allow for excess cable 8 that does not have protective sheathing.

Figure 15:
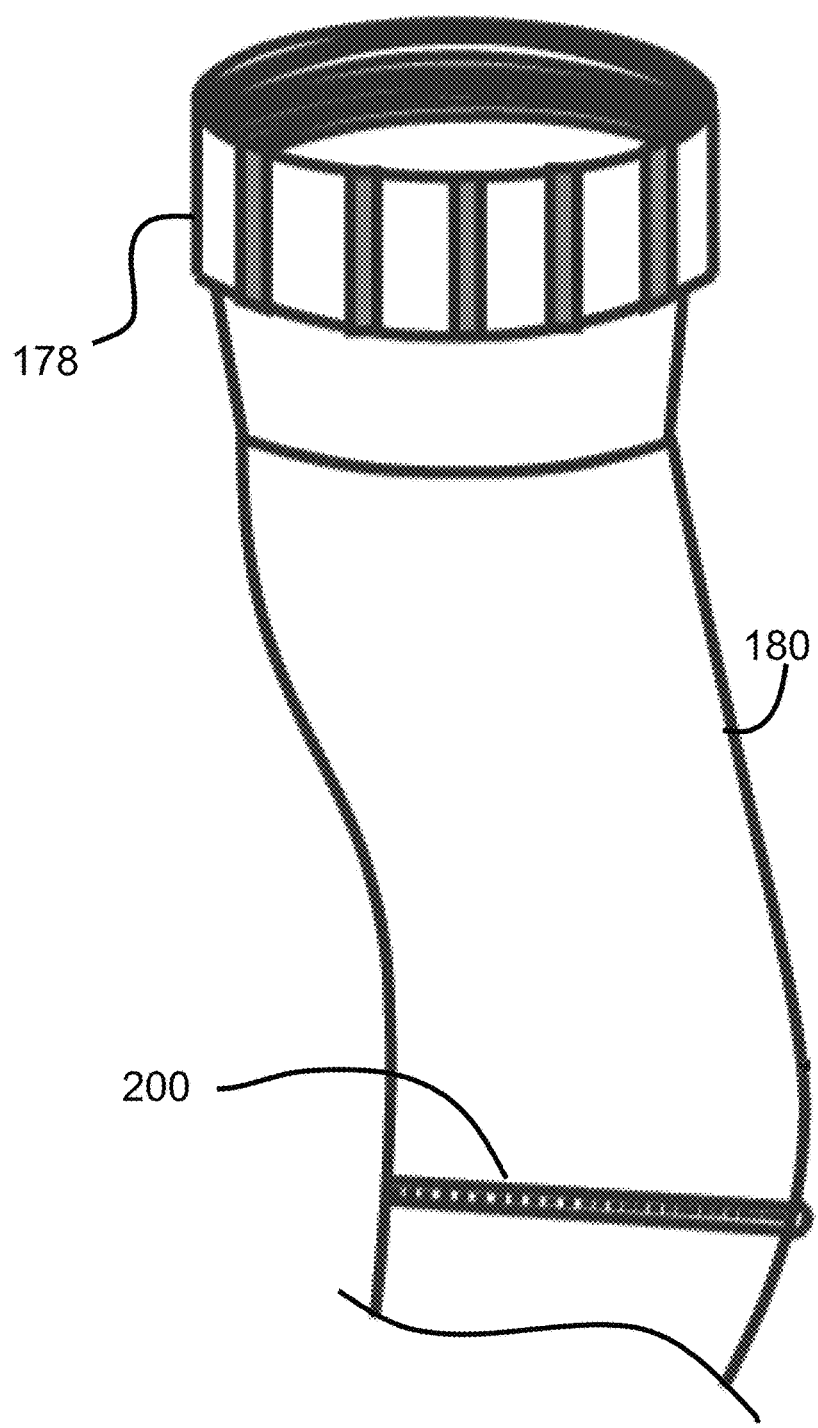
FIG. 15 is a plan view of another additional embodiment of a threaded ring and sleeve.

A second embodiment of the threaded ring 178, shown in FIG. 15, is a threaded ring 178 that has a flexible non-conductive sleeve 180 attached to the threaded ring 178 so that the threaded ring 178 can be threaded onto the cable-to-box connector body 186 and the non-conductive sleeve 180 will cover any excess wire 6 that doesn't have protective sheathing. A zip tie 200 or other mechanical fastener can be placed on the loose end of the non-conductive sleeve 180 to close it around the cable 8.

Figure 14:
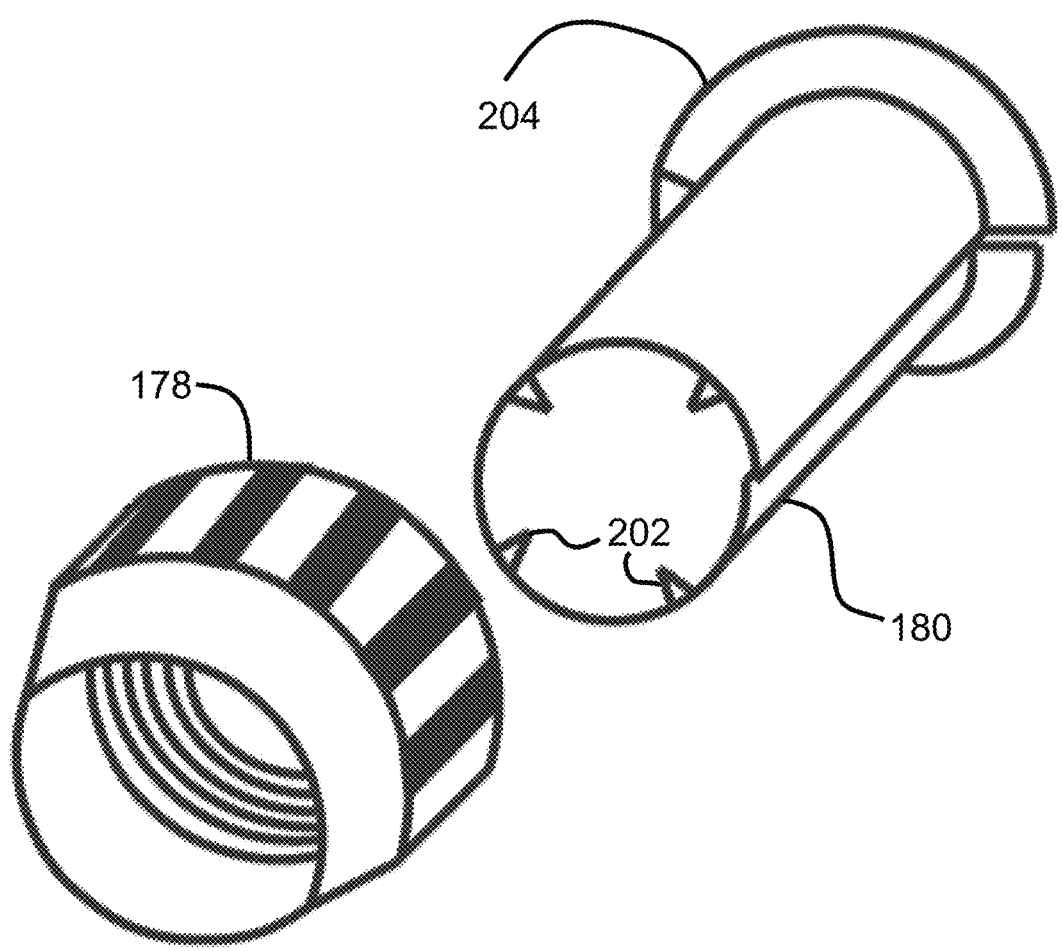
FIG. 14 is a perspective view of an additional embodiment of the threaded ring of FIG. 11 and a sleeve.

A third embodiment of the threaded ring 178, shown in FIG. 14 for example, is comprised of a circular metallic sleeve 180 with inner teeth 202 projecting inwardly from the metallic sleeve 180. The metallic sleeve 180 is preferably open on one lateral side so that it can be slid over the MC cable. The metallic sleeve 180 has a lip 204 that will fit into the threaded ring 178. Once the threaded ring 178 is placed over the metallic sleeve 180 and tightened onto the body 186 of the cable-to-box connector 4, the threaded ring 178 tightens the metallic sleeve 180 around the MC cable 8 and holds the MC cable 8 firmly in place.

Figure 16:
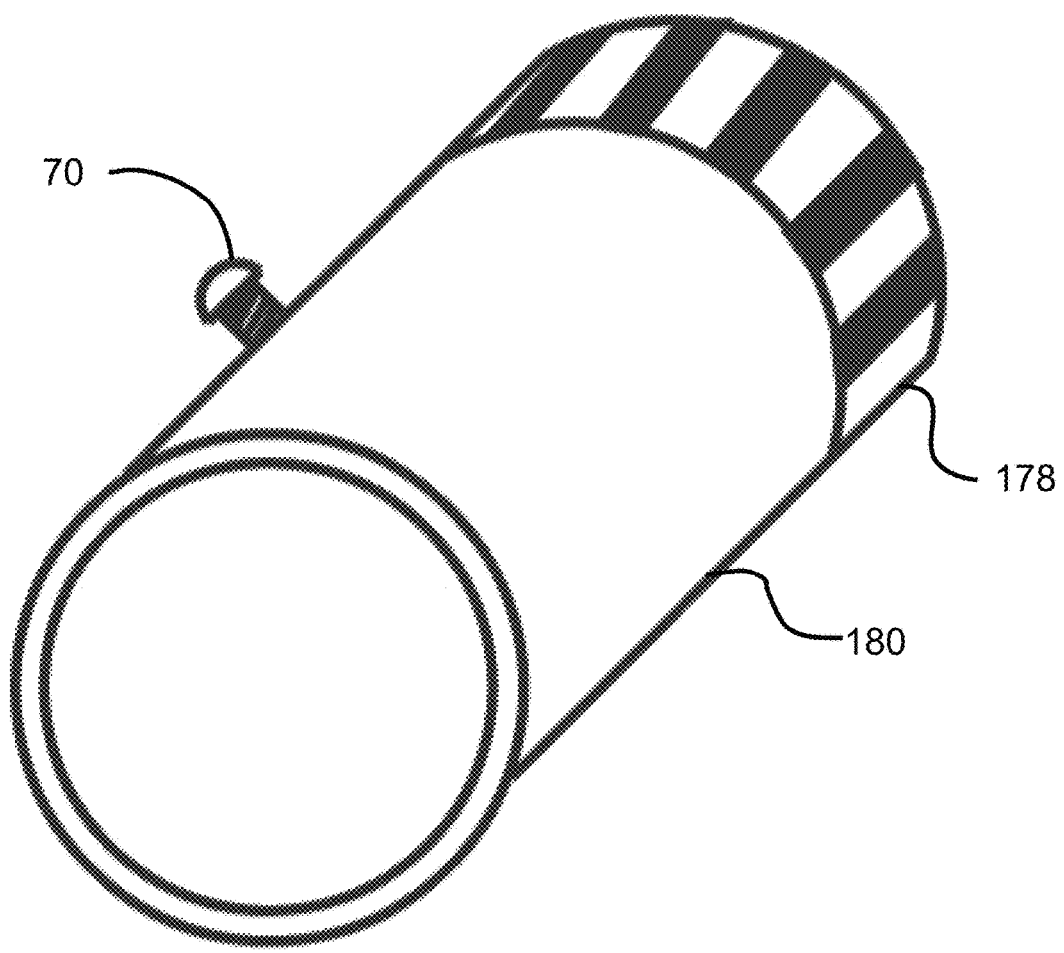
FIG. 16 is a perspective view of a further additional embodiment of a threaded ring and sleeve.

A fourth embodiment of the threaded ring 178, shown in FIG. 16, is a solid metallic piece that is threaded on one end so as to thread onto the barrel, while the other end allows for a rigid conduit to slide into the ring where a set screw 70 will secure the tubing to the ring.

Figure 17:
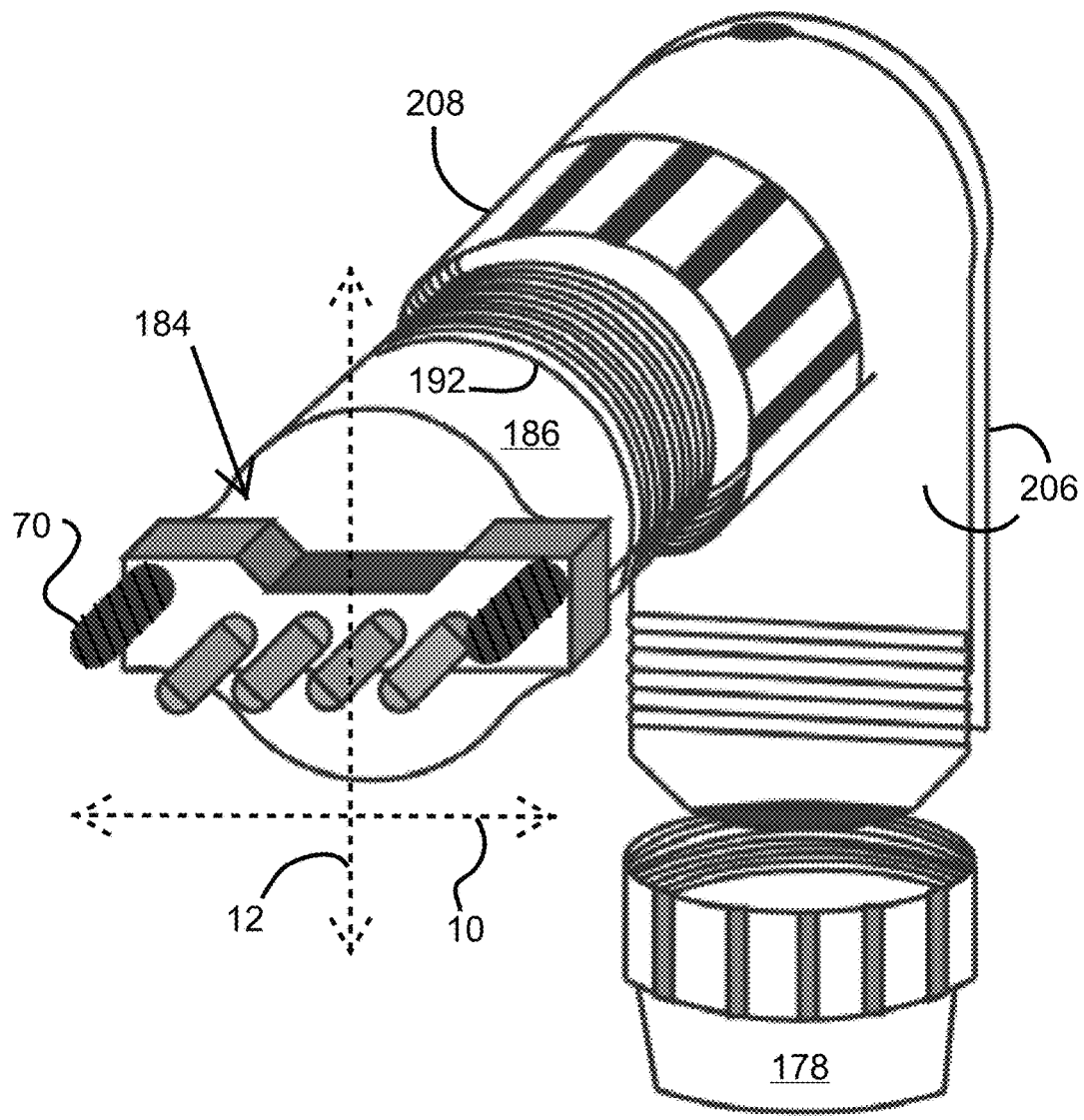
FIG. 17 is a perspective partially exploded view of a cable-to-box connector using a split converter.
Figure 18:
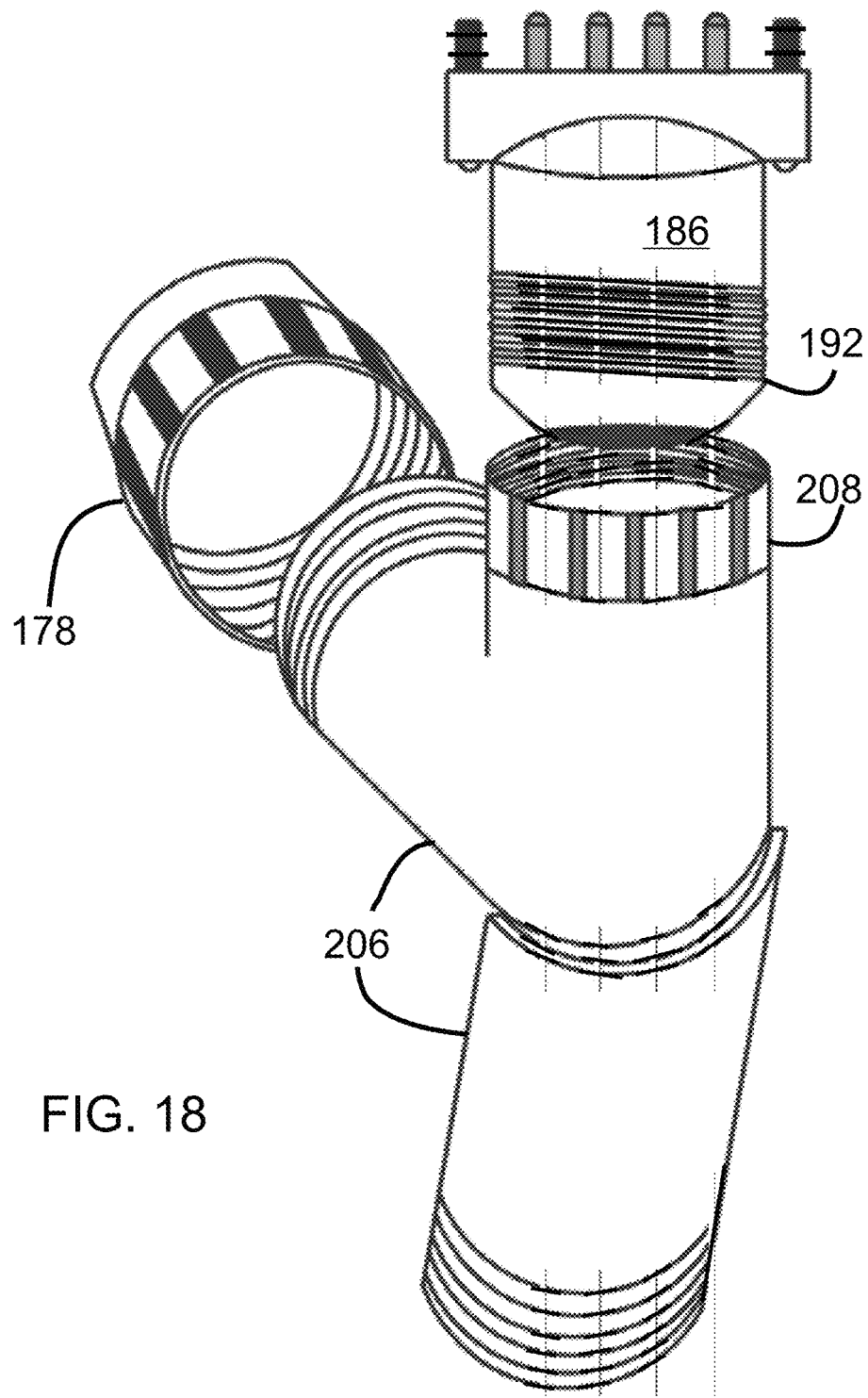
FIG. 18 is a rotated and further exploded perspective view of the cable-to-box connector with the split converter of FIG. 17.

Turning to FIGS. 17 and 18, spilt converters 206 are shown, which may be required in some installations. To use the split converter 206, first the threaded ring 178 slips over the cable 8. Then the spilt converter 206 is opened up and slid over the cable 8. The cable 8 is installed in a standard cable-to-box connector 4, but instead of a typical threaded ring 178 being used to secure the cable-to-box connector 4, a threaded swivel fitting 208 is screwed onto the threads 192 of the body 186 of a standard cable-to-box connector 4. The secure wires 6 can then be bent to conform to the split converter 206. The two parts of the split converter 206 can be put in place and the standard ring 178 used to secure the split converter 206. The split converter 206 can split or bent at a substantially 90 degree angle, or a more acute or obtuse angel as desired, either fixed in a single position or flexibly bent at different angles.

Figure 29:
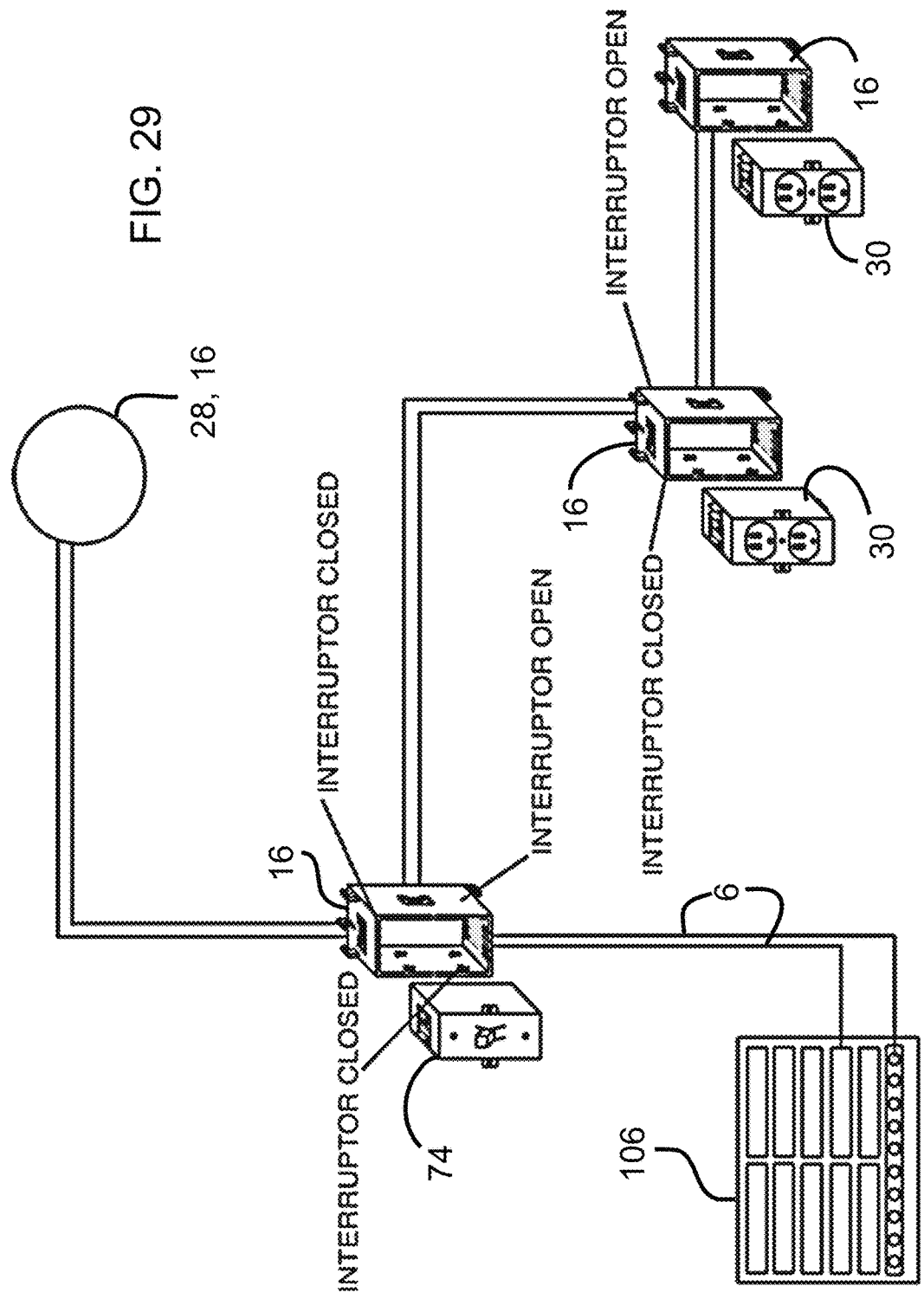
FIG. 29 is a partially exploded schematic view of a first configuration of an electrical distribution system according to the disclosed invention.
Figure 30:
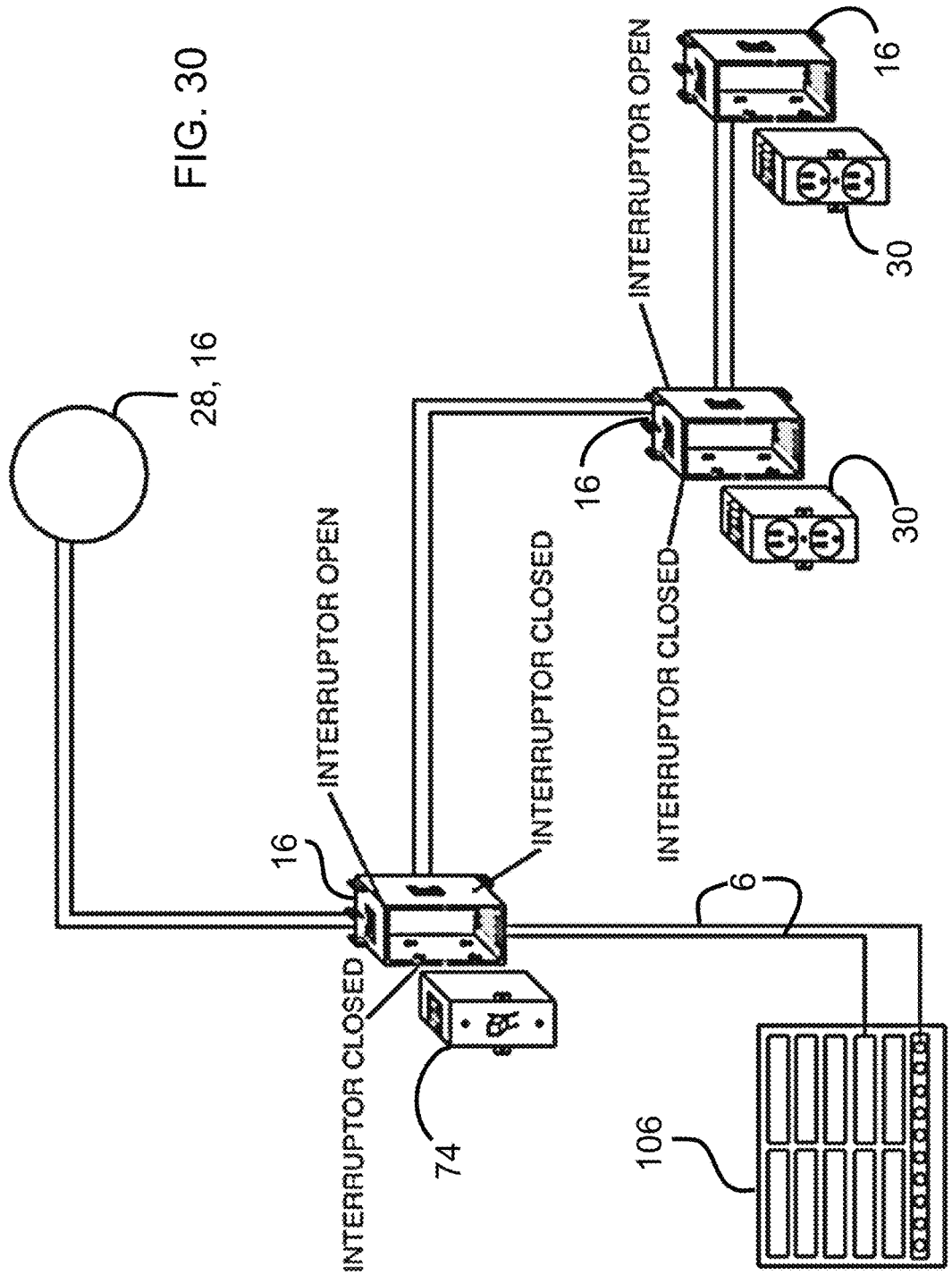
FIG. 30 is a partially exploded schematic view of a second configuration of an electrical distribution system according to the disclosed invention.
Figure 31:
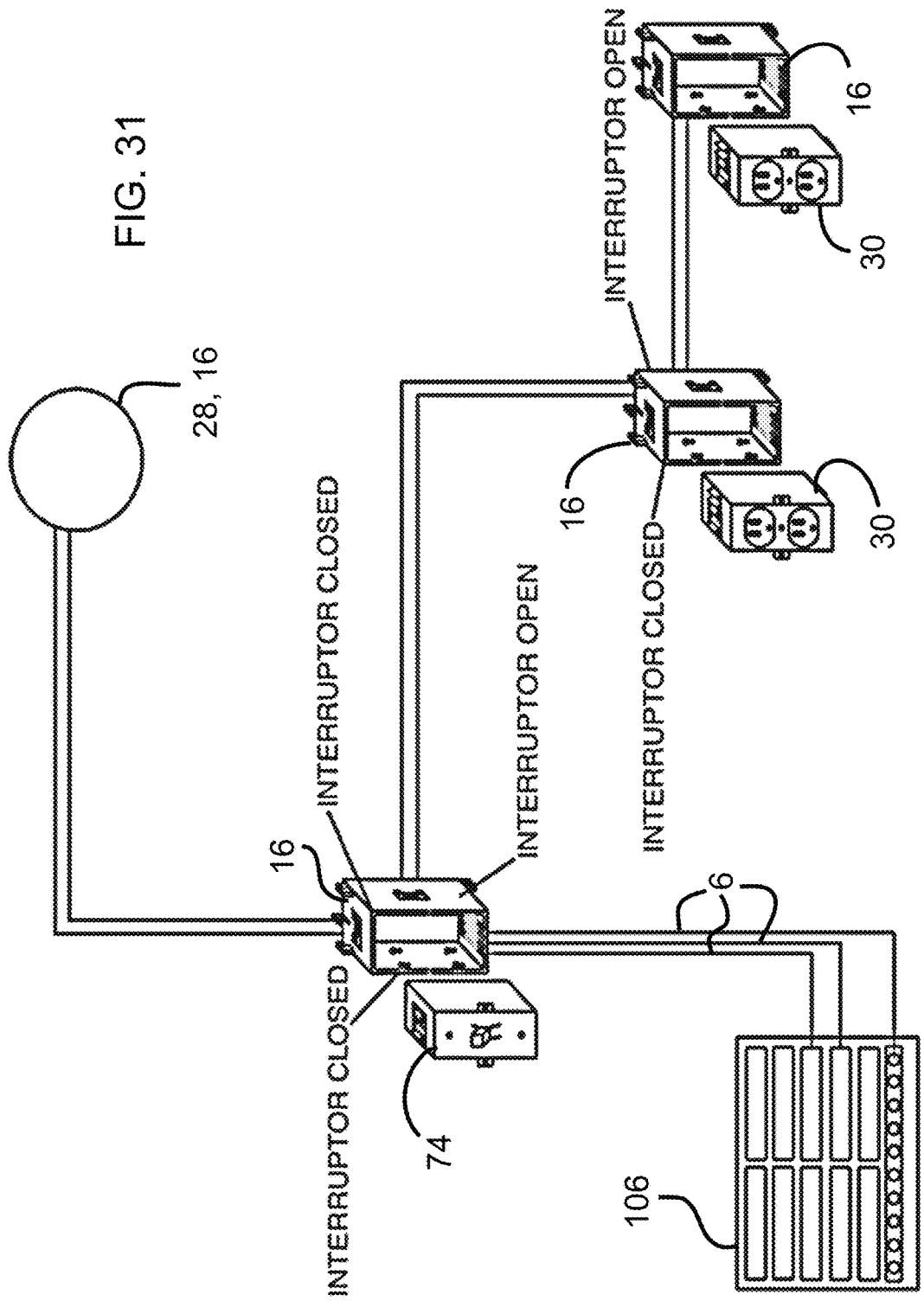
FIG. 31 is a partially exploded schematic view of a third configuration of an electrical distribution system according to the disclosed invention.

EXEMPLARY CONFIGURATIONS: Turning to FIGS. 29 to 31, three exemplary configurations are shown with circuit interrupters in various configurations, which demonstrate the ease of changing the direction of a circuit in order to activate outlet electrical inserts 30 and switch electrical insert 32 in different ways according to needs.

FIG. 29 shows a basic installation where the cable 8 from one circuit of the breaker panel 106 connect to a single switch electrical insert 74 containing electrical box 16 to give current to both the light insert 28 containing electrical box 16 and the outlet insert 30 containing electrical boxes 16 in a room. The circuit interrupters 42 in the single switch electrical insert 74 containing electrical box 16 are set to send the current directly to the outlet electrical insert 30 containing electrical boxes 16 without going through the first switch 86, but the current passes through the first switch 86 in order to activate the light 28.

FIG. 30 shows the same one circuit coming from the breaker panel 106, but with a simple change in the circuit interrupters 42 in the single switch electrical insert 74 containing electrical box 16. With the new circuit interrupter logic, the outlet electrical inserts 30 are also now activated or deactivated by the first switch 86, along with the light 28. This re-routing of the room circuitry would take mere moments, as it only requires turning off or on (opening or closing) certain circuit interrupters 42. For example, if the first hot line 56 were powered, and the cable 8 from the breaker panel 106 connected to the single switch electrical insert 74 containing electrical box 16 at the fourth coupler 50, then to change from the configuration in FIG. 29 to the configuration in FIG. 30 would be a simple two-step process: the seventh circuit interrupter 148 would be moved to from a closed to an open position and the fifth circuit interrupter 144 would be moved to a closed to an open position.

FIG. 31 show two circuits or hot lines 56, 58 from the breaker panel 106, one hot line 56, 58 giving uninterrupted current to two outlet electrical inserts 30 the other hot line 56, 58 giving switch controlled current to a light electrical insert 28. This is a similar the same configuration as in FIG. 29, but using two powered hot lines 56, 58 instead of one. A 3-strand Romex would be used, along with two circuits from the breaker panel.

Figure 32:
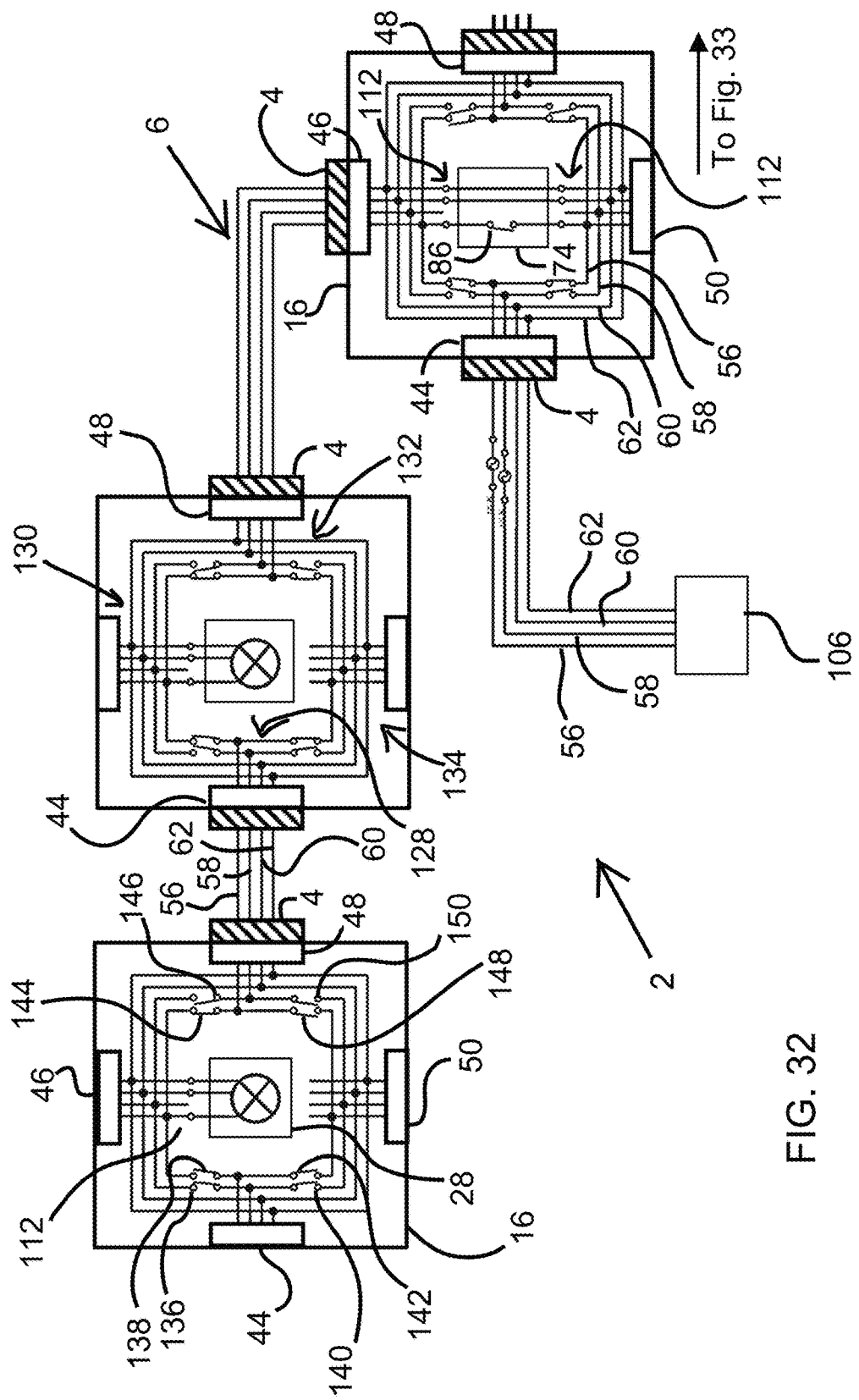
FIGS. 32 and 33 are schematic representations of a first exemplary circuit design including a light switch containing electrical box connected to two light containing electrical boxes and two outlet containing electrical boxes.
Figure 33:
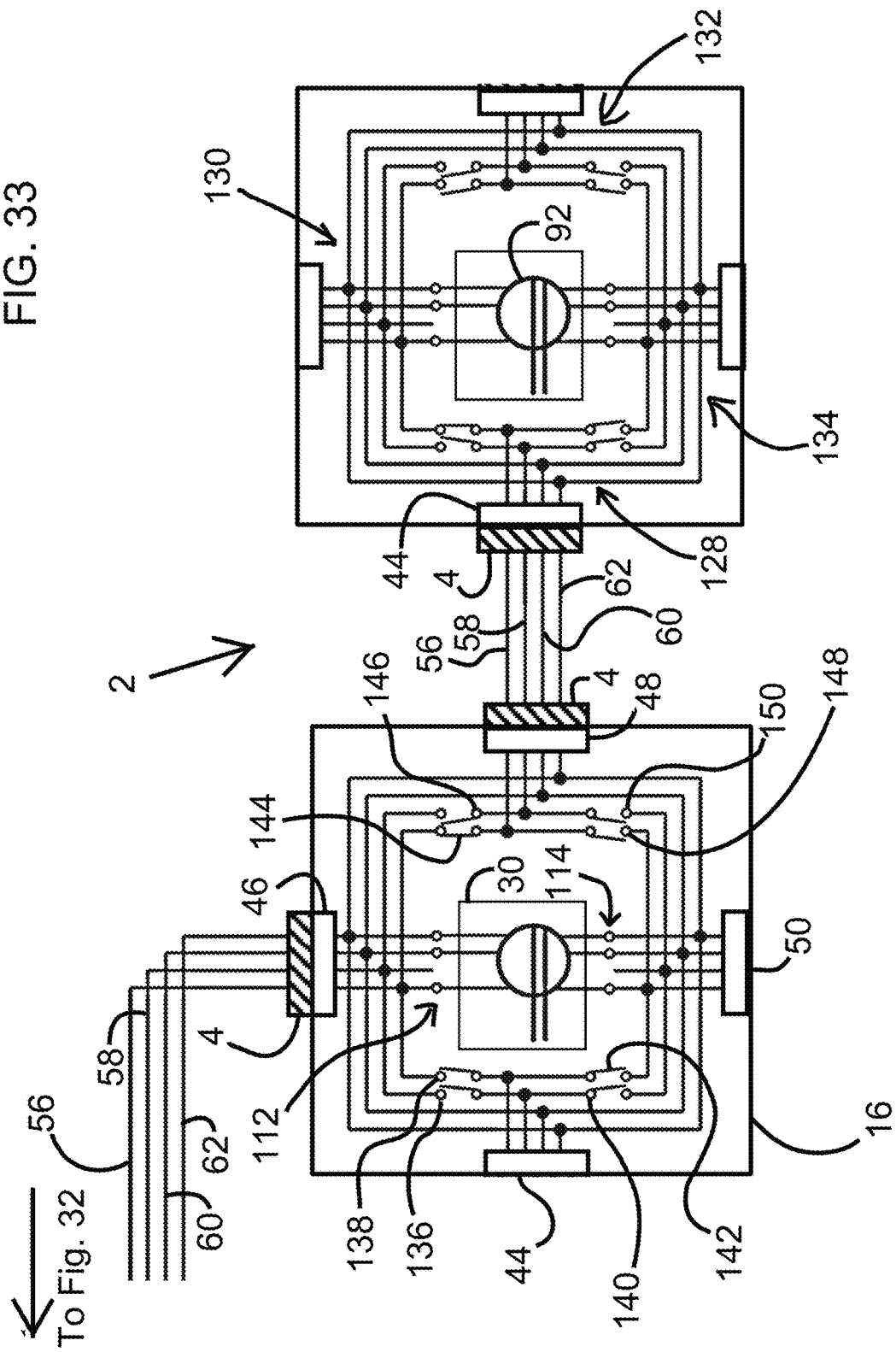

CIRCUIT DESIGNS: Turning to FIGS. 32 and 33, a first exemplary circuit design is shown. In these two figures, collectively part of the same circuit, an electrical box 16 containing a single switch electrical insert 74, with the first switch 86 of the single switch electrical insert 74 in an open position is shown. The single switch electrical box 16 receives current from a power source 106 or the main building circuit breaker through a cable 6 and cable-to-box connector 4 and into the first coupler 44. Due to the circuit interrupter logic at the circuit interrupters 42 adjacent to the first coupler 44, hot voltage from only the first hot line 56 flows through the intra-box circuits 20 of the single switch electrical box 16. The fourth and seventh circuit interrupters 142, 148 in the single switch electrical box 16 are closed and the first-third, fifth, sixth and eighth 136, 138, 148, 144, 146, 150 circuit interrupters are open. The single switch electrical connector 74 connects to the first hot line 56, the neutral line 60, and the ground line 62 of the second and fourth intra-circuit branches 130, 134 of the single switch electrical box 16, though in a further embodiment the single switch electrical insert 74 would not connect to the neutral line 60 or the ground line 62, as an alternative electric pathway is already provided in the intra-box circuits 20 for the ground and neutral circuits 60, 62. A cable 8 and a cable-to-box connector 4 is connected to the second coupler 46 of the single switch electrical box 16 and directs hot current along the first hot line 56 to first and second electrical boxes 16 containing lights 28. The hot current flows on the first hot line 56 from the second coupler 46 of the single switch electrical box 16, through a cable 8, and into the third coupler 48 of the first light fixture insert 28 containing electrical box 16. The first light electrical box 16 has the fourth, fifth, and seventh circuit interrupters 142, 144, 148 closed and the first-third, sixth and eighth circuit interrupters 136, 138, 140, 148, 150 open. The first light 28 connects through a first insert electrical connection 112 to the first hot line 56, the neutral line 60, and the ground line 62 of the second intra-circuit branch 130 of the first light electrical box 28 to receive power. The hot current flows along the first hot line 56 out of the first coupler 44 of the first light electrical box 16, through cable-to-box connector 4, to a cable 8, to another cable-to-box connector, and into the third coupler 48 of the second light containing electrical box 16. The second light containing electrical box 16 has the fifth circuit interrupter 144 closed and the first-fourth and sixth-eighth circuit interrupters 136, 138, 140, 142, 146, 148, 150, open. The second light 28 connects through a first insert electrical connection 112 to the first hot line 56, the neutral line 60, and the ground line 62 of the second intra-circuit branch 130 of the second light electrical box 16 to receive power.

Additionally, a cable 8 and a cable-to-box connector 4 is connected to the third coupler 48 of the single switch electrical box 16 and directs hot current on the first hot line 56 to first and second electrical boxes 16 containing outlet inserts 30. The hot current flows from the third coupler 48 of the single switch electrical box 16, through a cable-to-box connector 4, a cable 8, to another cable-to-box connector 4 and into the second coupler 46 of the first outlet electrical box 16. The first outlet electrical box 16 has the fifth circuit interrupter 144 closed and the first-fourth and sixth-eighth circuit interrupters 136, 138, 140, 142, 146, 148, 150 open. The first outlet electrical insert 30 connects through a first insert electrical connection 112 to the first hot line 56, the neutral line 60, and the ground line 62 of the second intra-circuit branch 130 of the first outlet electrical box 16 to receive power. The first outlet electrical insert 30 also connects through a second insert electrical connection 114 to the first hot line 56, the neutral line 60, and the ground line 62 of the fourth intra-circuit branch 134 of the first outlet electrical box 16, but this intra-circuit branch 134 is not powered in this configuration. The hot current flows along the first hot line 56 out of the third coupler 48 of the first outlet electrical box 16, through a cable and into the first coupler of the second outlet electrical box. The second outlet electrical box 16 has the second circuit interrupter 138 closed and the first and third-eighth circuit interrupters 136, 140, 142, 144, 146, 148, 150 open. The second outlet electrical insert 30 connects through a first insert electrical connection 112 to the first hot line 56, the neutral line 60, and the ground line 62 of the second intra-circuit branch 130 of the second outlet electrical box 16 to receive power. The second outlet electrical insert 30 also connects through a second insert electrical connection 114 to the first hot line 56, the neutral line 60, and the ground line 62 of the fourth intra-circuit branch 134 of the second outlet electrical box 16, but this intra-circuit branch 134 is not powered in this configuration. This circuit logic allows the first switch 86 to selectively control the flow of electricity from the first hot line 56 to the two light fixture electrical inserts 28, while providing constant flow of electricity from the first hot line 56 to the two outlet electrical inserts 30, regardless of the position of the first switch 86.

Figure 34:
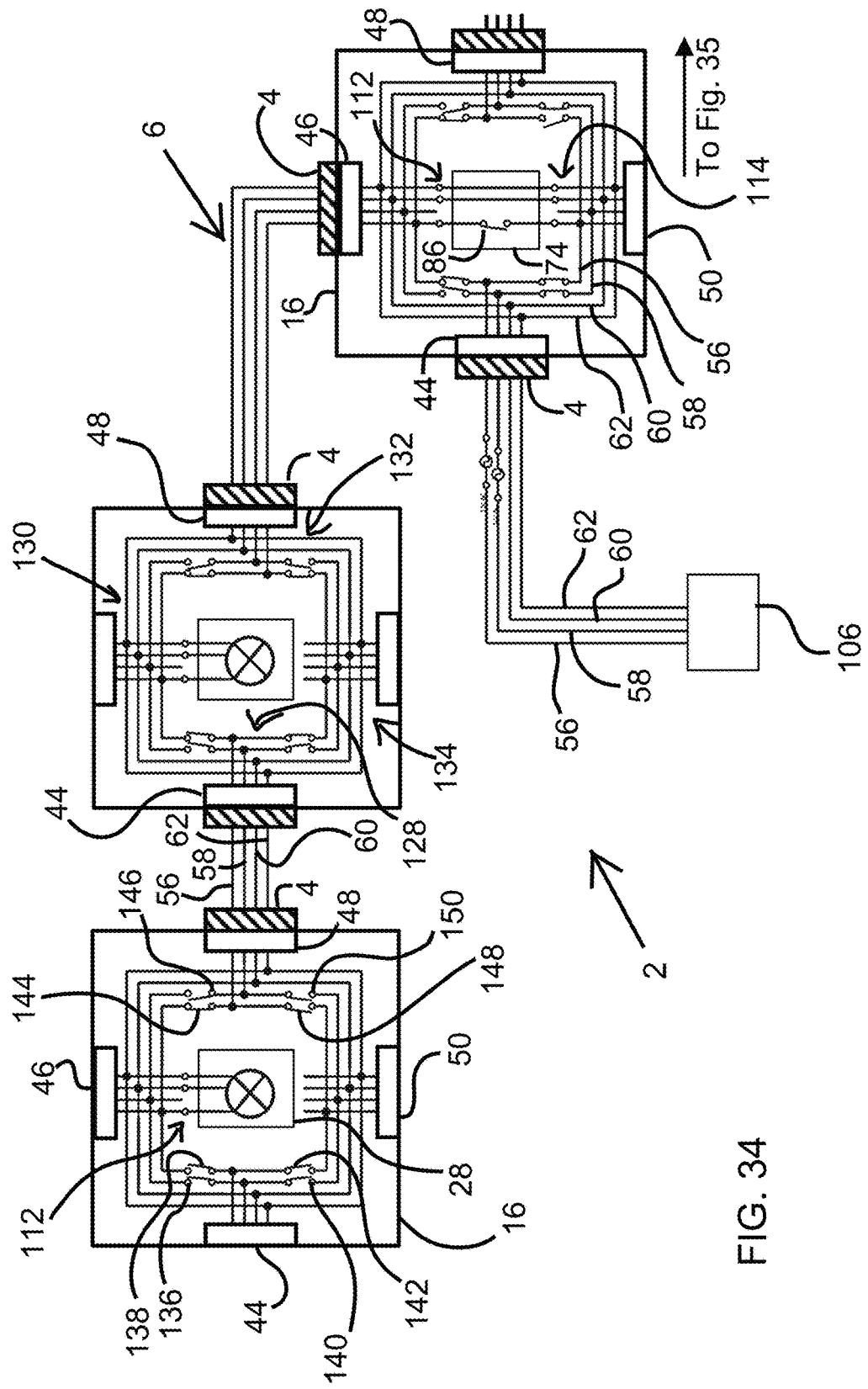
FIGS. 34 and 35 are schematic representations of a second exemplary circuit design including a light switch containing electrical box connected to two light containing electrical boxes and two outlet containing electrical boxes.
Figure 35:
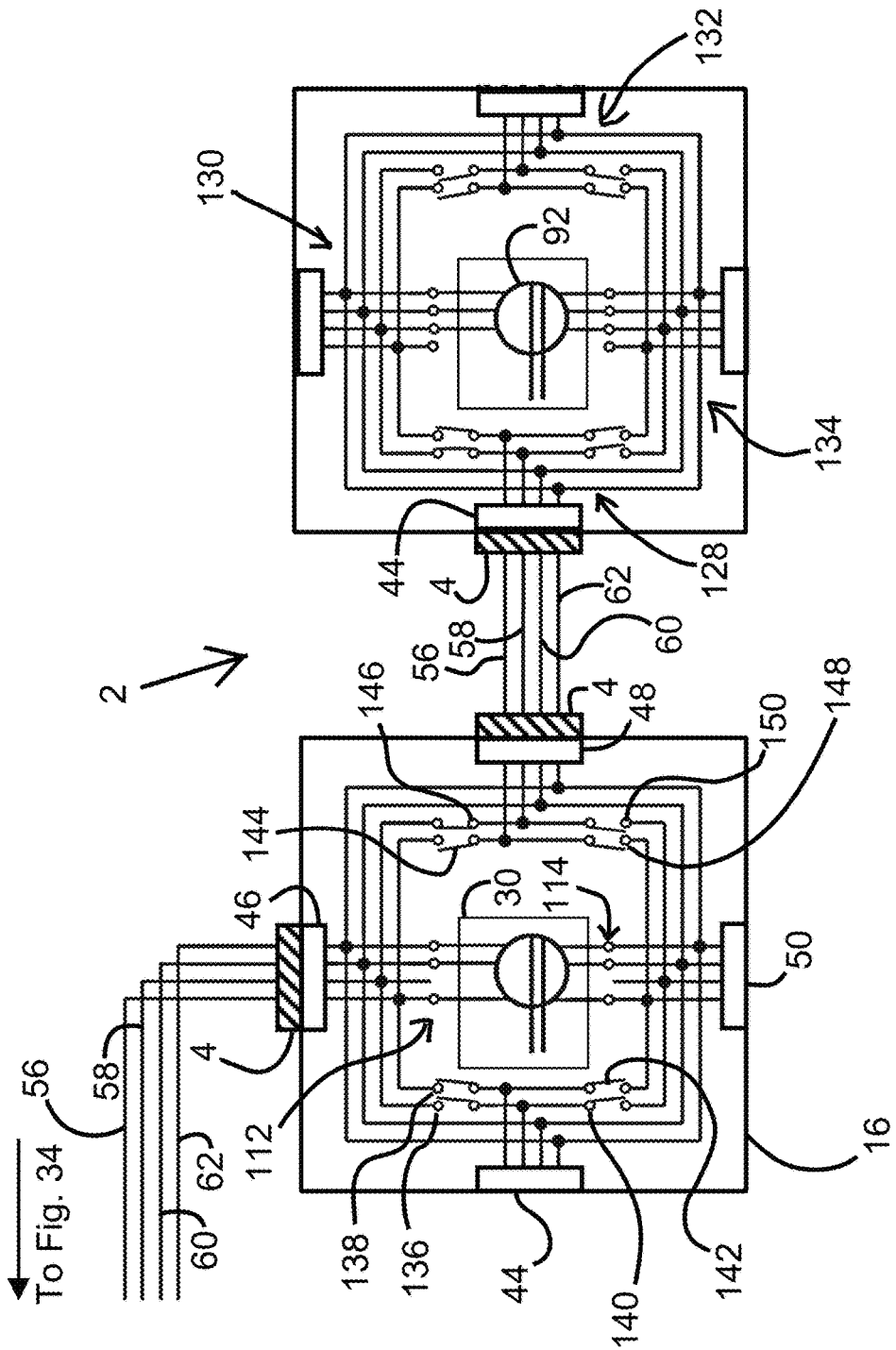

Turning to FIGS. 34 and 35, a second exemplary circuit design is shown. In these two figures, collectively part of the same circuit, an electrical box 16 containing a single switch electrical insert 74, with a first switch 86 of the single switch electrical insert 74 shown in an open position. The single switch electrical box 16 receives current from a power source 106 or the main building circuit breaker through a cable 6 to a cable-to-box connector 4 into the first coupler 44. Due to the circuit interrupter logic at the circuit interrupters 42 adjacent to the first coupler 44, hot voltage from both the first hot line 56 and the second hot line 58 flows through the single switch electrical box 16. The third-fifth and eighth circuit interrupters 140, 144, 150 in the single switch electrical box 16 are closed and the first, second, sixth and seventh circuit interrupters 136, 138, 146, 148 are open. The single switch electrical insert 74 is shown connecting to the first hot line 56, the neutral line 60, and the ground line 62 of the second and fourth intra-electrical branches 130, 134 of the single switch electrical box 16, though a further embodiment, the single switch electrical insert 74 would not connect to the neutral line 60 or the ground line 62, as an alternative electric pathway is already provided in the intra-box circuits 20. A cable 6 and a cable-to-box connector 4 is connected to the second coupler 46 of the single switch electrical box 16 and directs hot current from the first hot line 56 to first and second electrical boxes 16 containing lights 28. The first and the second light electrical boxes 16 and the first and second lights 28 are configured the same as in FIG. 32.

Additionally, a cable 8 and a cable-to-box connector 4 is connected to the third coupler 48 of the single switch electrical box 16 and directs hot current to first and second electrical boxes 16 containing outlet electrical inserts 30 through both the first and the second hot lines 56, 58. In the single switch electrical box 16, the current from the first hot line 56 flows from the first coupler 44, to the first intra-circuit branch 128, across the fourth circuit interrupter 142, to the fourth intra-circuit branch 134 and, if the first switch 86 is closed, across the first switch 86 circuit to the second intra-circuit branch 130, across the fifth circuit interrupter 144, across the third intra-circuit branch 132, and to the third coupler 48. The current from the second hot line 58 flows uninterrupted from the first coupler to the first intra-circuit branch 128, across the third circuit interrupter 140 through the fourth intra-circuit branch 134 across the eighth circuit interrupter 150, across the third intra-circuit branch 132 and to the third coupler 48. The hot current from the first and the second hot lines 56, 58 flow from the third coupler 48 of the single switch electrical box 16, through a cable-to-box connector 4, to a cable 8, to another cable-to-box connector 4 and into the second coupler 46 of the first outlet electrical box 16. The first outlet electrical box has the sixth circuit interrupter 146 closed and the first-fifth, seventh, and eighth circuit interrupters 136, 138, 140, 142, 144, 148, 150 open. The first outlet electrical insert 30 connects through a first insert electrical connection 112 to the first hot line 56, the neutral line 60, and the ground line 62 of the second intra-circuit branch 130 of the first outlet electrical box 16 to receive power. The first outlet electrical insert 30 also connects through a second insert electrical connection 114 to the first hot line 56, the neutral line 60, and the ground line 62 of the fourth intra-circuit branch 134 of the first outlet electrical box 16, but this intra-circuit branch 134 is not powered in this configuration. The hot current from the second hot line 58 flows in the first outlet electrical box 16 from the second coupler 46 to the second intra-circuit branch 130 across the sixth circuit interrupter 146 to the third intra-circuit branch 132 and out of the third coupler 48 of the first outlet electrical box 16, then to a cable-to-box connector 4, through a cable 8, to another cable to box connector 4 and into the first coupler 44 of the second outlet electrical box 16. The second outlet electrical box 16 has the second circuit interrupter 138 closed and the first and third-eighth circuit interrupters 136, 140, 142, 144, 146, 148, 150 open. The second outlet electrical insert 30 connects through a first insert electrical connection 112 to the second hot line 58, the neutral line 60, and the ground line 62 of the second intra-circuit branch 130 of the second outlet electrical box 16 to receive power. The second outlet electrical insert 30 also connects through a second insert electrical connection 114 to the second hot line 58, the neutral line 60, and the ground line 62 of the fourth intra-circuit branch 134 of the second outlet electrical box 16, but this intra-circuit branch 134 is not powered in this configuration. This circuit logic allows the first switch 86 to selectively control the flow of electricity from the first hot line 56 to the two light fixture electrical inserts 28 and the first outlet electrical insert 30, while providing constant flow of electricity from the second hot line 58 to the second outlet electrical insert, regardless of the position of the first switch 84.

Figure 36:
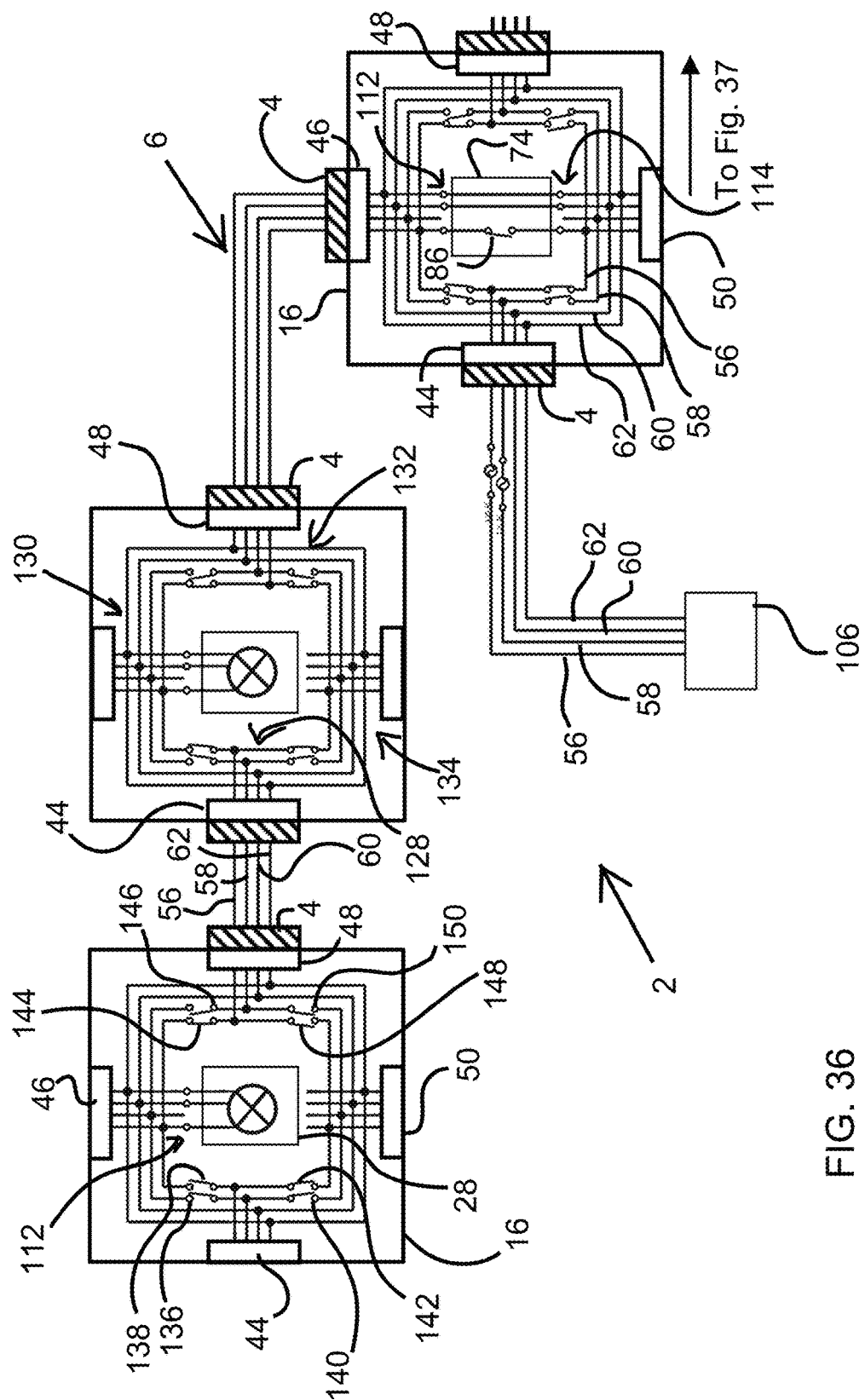
FIGS. 36 and 37 are schematic representations of a third exemplary circuit design including a light switch containing electrical box connected to two light containing electrical boxes and two outlet containing electrical boxes.
Figure 37:
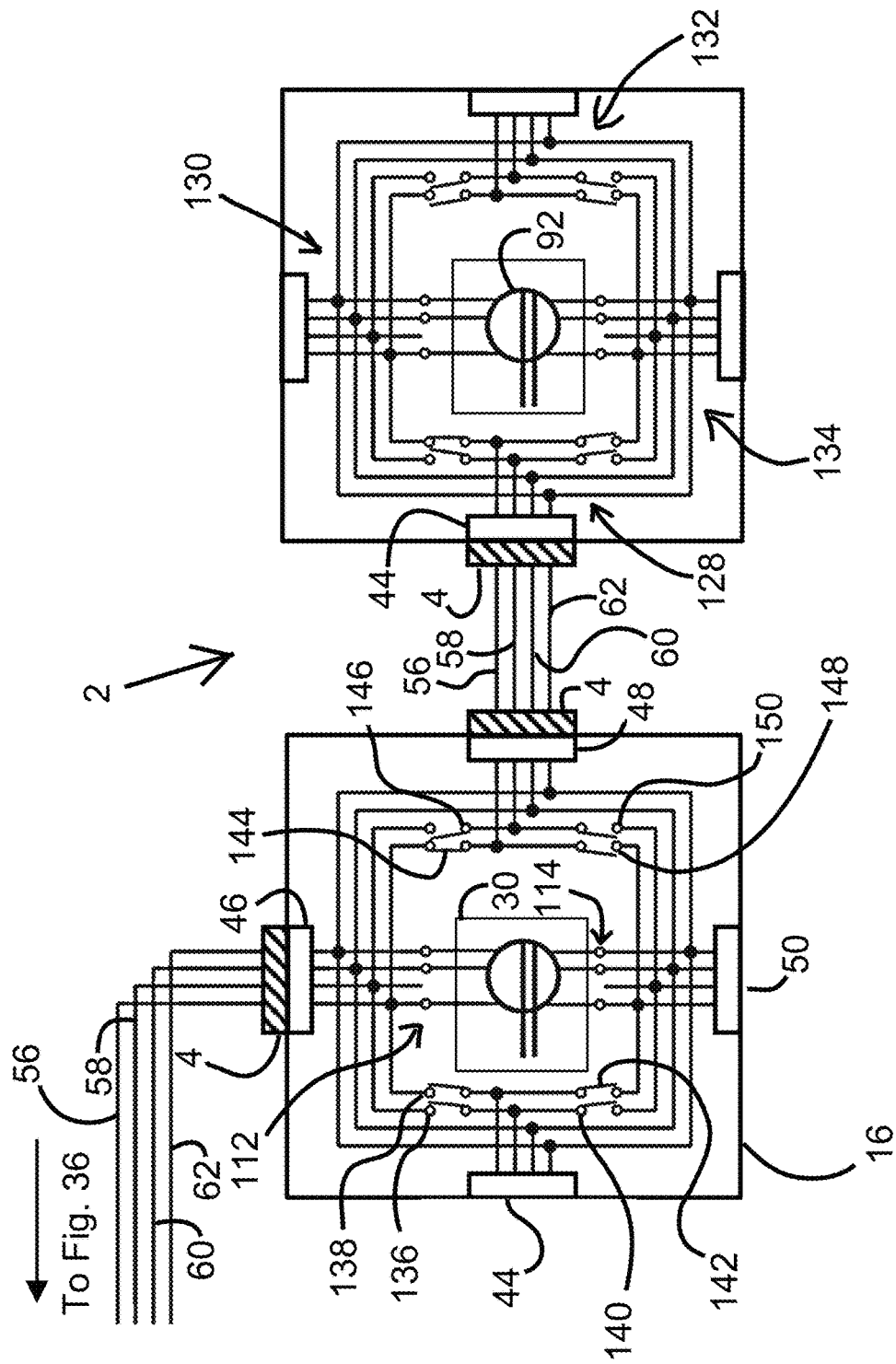

Turning to FIGS. 36 and 37, a third exemplary circuit design is shown. In these two figures, collectively part of the same circuit, an electrical box 16 containing a single switch electrical insert 74 with a first switch 84 shown in an open position. The single switch electrical box 16 receives current from a power source 106 or the main building circuit breaker through a cable 6 and a cable-to-box connector 4 into the first coupler 44. Due to the circuit interrupter 42 logic at the circuit interrupters 42 adjacent to the first coupler 44, hot voltage from only the first hot line 56 flows through the single switch electrical box 16. The fourth and fifth circuit interrupters 142, 144 in the single switch electrical box 16 are closed and the first-third and sixth-eighth circuit interrupters 136, 138, 140, 146, 148, 150 are open. The single switch electrical insert 74 connects to the first hot line 56, the neutral line 60, and the ground line 62 of the second and fourth intra-electrical branches 130, 134 of the single switch electrical box 16, though in a further embodiment, the single switch electrical insert 74 would not connect to the neutral line 60 or the ground line 62, as an alternative electric pathway is already provided in the intra-box circuits 20. A cable 8 and a cable-to-box connector 4 is connected to the second coupler 46 of the single switch electrical box 16 and directs hot current along the first hot line 56 to first and second electrical boxes 16 containing lights 28. The first and the second light electrical boxes 16 and the first and second lights 28 are configured the same as in FIG. 32.

Additionally, a cable 8 and a cable-to-box connector 4 is connected to the third coupler 48 of the single switch electrical box 16 and directs hot current along the first hot line 56 to first and second electrical boxes 16 containing outlet electrical inserts 30. In the single switch electrical box 16, the current from the first hot line 56 flows from the first coupler 44, through the first intra-circuit branch 128, across the fourth circuit interrupter 142 to the fourth intra-circuit branch 134 and, if the first switch 86 is closed, across the first switch 84 circuit to the second intra-circuit branch 130, across the fifth circuit interrupter 144, through the third intra-circuit branch 134 and to the third coupler 48. The hot current from the first hot line 56 flows from the third coupler 48 of the single switch electrical box 16, to a cable-to-box connector 4 through a cable 8, to another cable-to-box connector 4, and into the second coupler 46 of the first outlet electrical box 16. The first and the second outlet electrical boxes 16 and the first and second outlet electrical inserts are configured the same as in FIG. 32. This circuit logic allows the first switch to selectively control the flow of electricity from the first hot line to the two light electrical inserts 28 and the two outlet electrical inserts 30.

Figure 38:
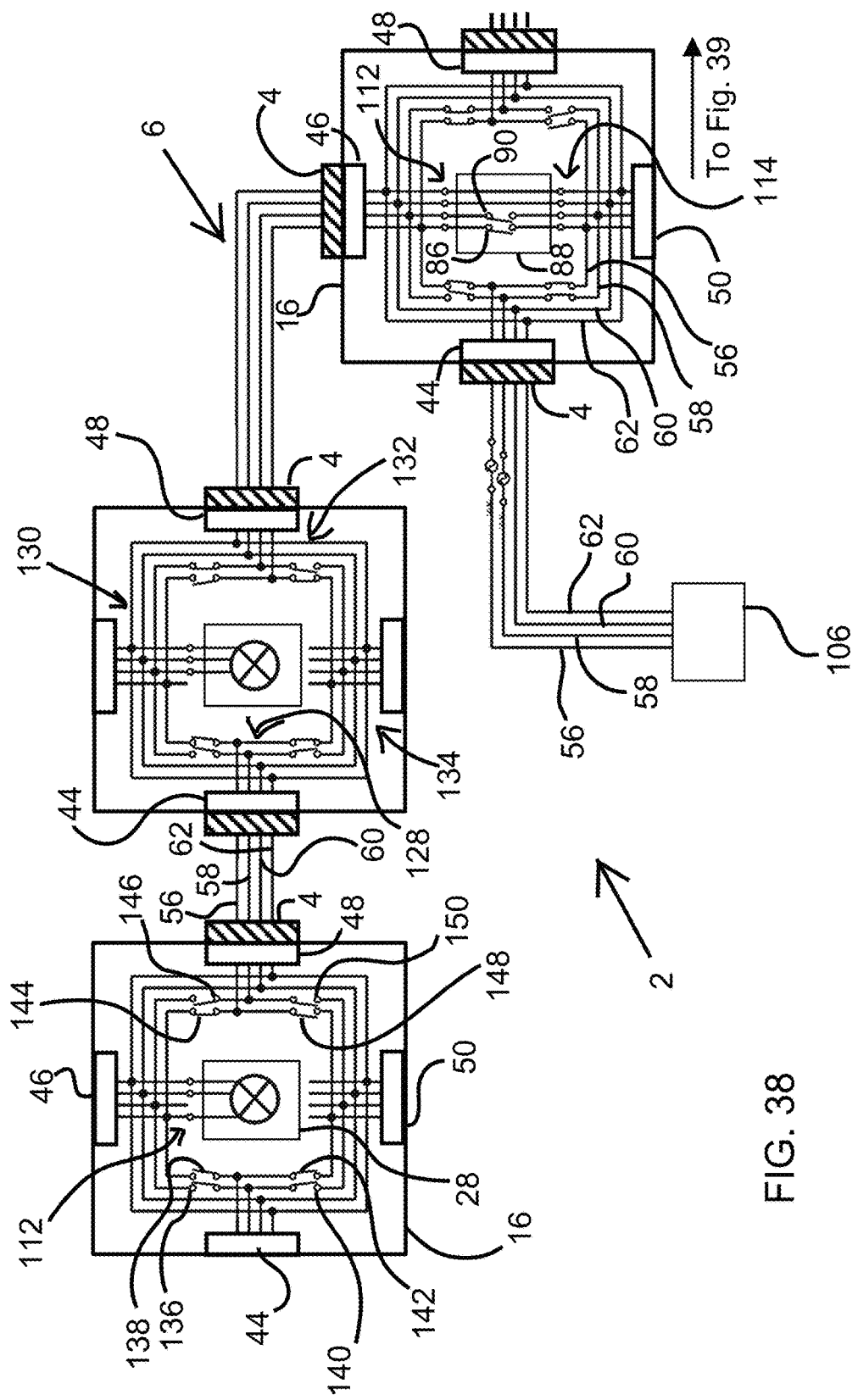
FIGS. 38 and 39 are schematic representations of a fourth exemplary circuit design including a double light switch containing electrical box connected to two light containing electrical boxes and two outlet containing electrical boxes.
Figure 39:
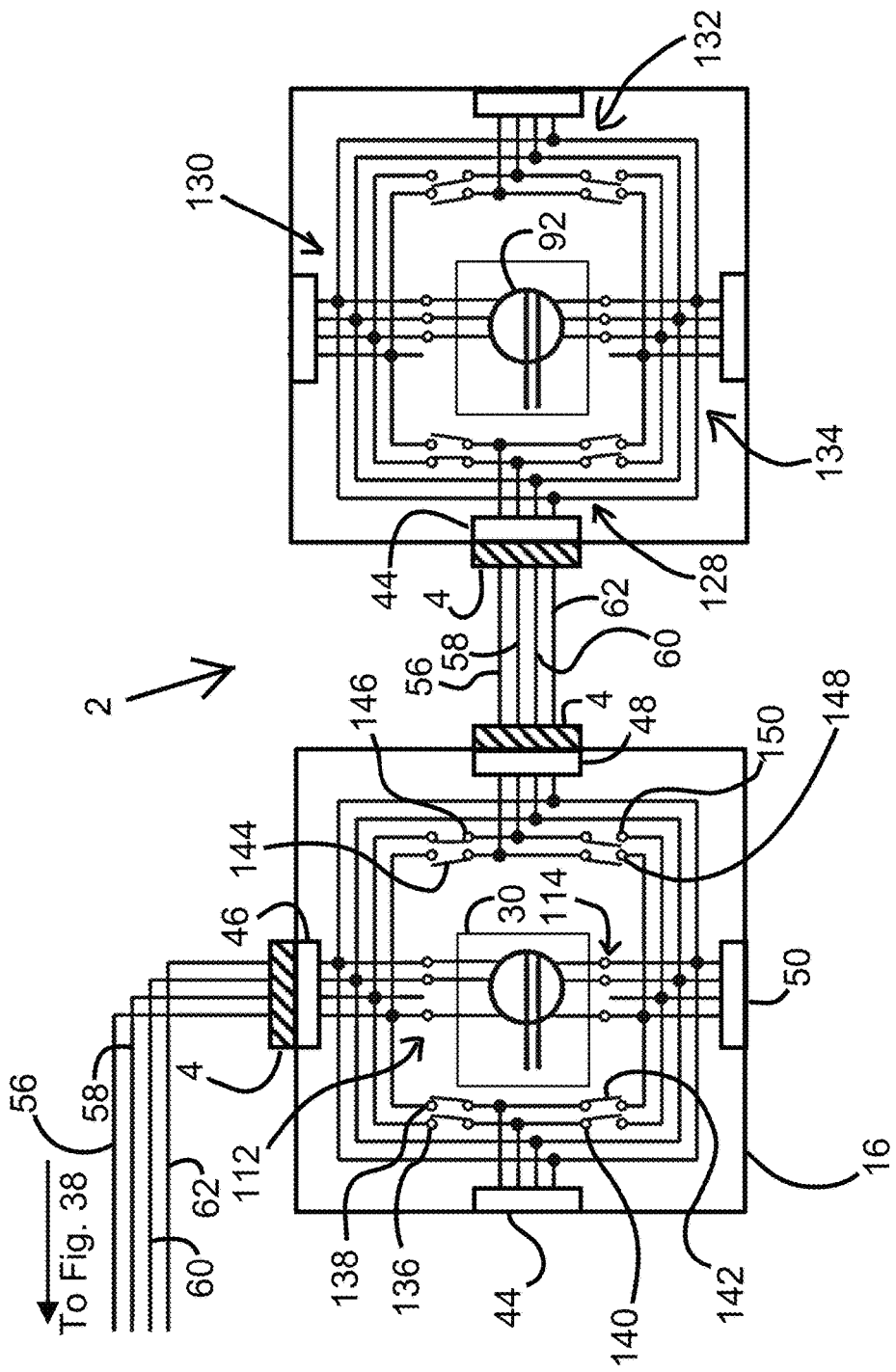

Turning to FIGS. 38 and 39, a fourth exemplary circuit design is shown. In these two figures, collectively part of the same circuit, an electrical box containing a double switch electrical insert 88, with both first and second switches 86, 90 in an open position, is shown. The double switch electrical box 16 receives current from a power source 106 or the main building circuit breaker through a cable 8 and a cable-to-box connector 4 into the first coupler 44. Due to the circuit interrupter 42 logic at the circuit interrupters 42 adjacent to the first coupler 44, hot voltage from both the first and the second hot lines 56, 58 flows through the double switch electrical box 16. The third-sixth circuit interrupters 140, 142, 144, 146 in the double switch electrical box 16 are closed and the first, second, seventh and eighth circuit interrupters 136, 138, 148, 150 are open. The double switch electrical insert 88 connects to the first hot line 56, the second hot line 58, the neutral line 60, and the ground line 62 of the second and fourth intra-circuit branches 130, 134 of the double switch electrical box 16, though in a further embodiment, the double switch electrical insert 88 would not connect to the neutral line 60 or the ground line 62, as an alternative electric pathway is already provided in the intra-box circuits 20. A cable 8 and a cable-to-box connector 4 is connected to the second coupler 46 of the double switch electrical box 16 and directs hot current from the first and the second hot lines 56, 58 to first and second electrical boxes 16 containing lights 28. Hot current from the first hot line 56 flows in the double switch electrical box 16 from the first coupler 44 to the first intra-circuit branch 128 across fourth circuit interrupter 142, to the fourth intra-circuit branch 134, across the first switch 86, when the first switch 86 is in the closed position, to the second intra-circuit branch 130, and the second coupler 46. Hot current from the second hot line 58 flows in the double switch electrical box 16 from the first coupler 44 to the first intra-circuit branch 128, across third circuit interrupter 140, to the fourth intra-circuit branch 134, across the second switch 90, when the second switch 90 is in the closed position, to the second intra-circuit branch 130, and the second coupler 46. The hot current from the first and the second hot lines 56, 58 flows from the second coupler 46 of the double switch electrical box 16, through a cable-to-box connector 4, to a cable 8, to another cable-to-box connector 4, and into the third coupler 48 of the first light electrical box 16. The first light electrical box 16 has the fourth, sixth, and seventh circuit interrupters 142, 146, 148 closed and the first-third, fifth and eighth circuit interrupters 136, 138, 140, 144, 150 open. The hot current from the second hot line 58 flows from the third coupler 48 of the first light electrical box 16 across the sixth circuit interrupter 146 to the second intra-box circuit branch 130. The first light 28 connects through a first insert electrical connection 112 to the second hot line 58, the neutral line 60, and the ground line 62 of the second intra-circuit branch 130 to receive power. The hot current from the first hot line 56 flows from the third coupler 48 of the first light electrical box 16 across the seventh circuit interrupter 148 to the fourth intra-circuit branch 134 across the fourth circuit interrupter 142, to the first coupler 44 and out of the first light electrical box 16. The hot current from the first hot line 56 then flows through a cable-to-box connection 4 to a cable to another cable-to-box connection 4 and into the third coupler 48 of the second light containing electrical box 16. The second light electrical box 16 has the fifth circuit interrupter 144 closed and the first-fourth and sixth-eighth circuit interrupters 136, 138, 140, 142, 146, 148, 150 open. The second light 28 connects through a first insert electrical connection 112 to the first hot line 56, the neutral line 60, and the ground line 62 of the second intra-circuit branch 130 of the second light electrical box 16 to receive power.

Additionally, a cable 8 and a cable-to-box connector 4 is connected to the third coupler 48 of the double switch electrical box 16 and directs hot current to first and second electrical boxes 16 containing outlet electrical inserts 30 through both the first and the second hot lines 56, 58. In the double switch electrical box 16, hot current from the first hot line 56 flows in the first coupler 44, to the first intra-circuit branch 128, across fourth circuit interrupter 142, to the fourth intra-circuit branch 134, across the first switch 86, when the first switch 86 is in the closed position, to the second intra-circuit branch 130, across the fifth circuit interrupter 144, to the third intra-circuit branch 132 and to the third coupler 48. Hot current from the second hot line 58 flows in the double switch electrical box 16 from the first coupler 44 to the first intra-circuit branch 128, across third circuit interrupter 140, to the fourth intra-circuit branch 134, across the second switch 90, when the second switch 90 is in the closed position, to the second intra-circuit branch 130, across the sixth circuit interrupter 146, to the third intra-circuit branch 132 and to the third coupler 48. The hot current from the first and the second hot lines 56, 58 flow from the third coupler 132 of the double switch electrical box 16, through a cable-to-box connector 4, to a cable 8, through another cable-to-box connector 4, and into the second coupler 46 of the first outlet electrical box 16. The first and the second outlet electrical boxes 16 and the first and second outlet electrical inserts 30 are configured the same as in FIG. 34. This circuit logic allows the first switch 86 of the double light switch electrical insert 88 to selectively control the flow of electricity from the first hot line 56 to the second light 28 and the first outlet electrical insert 30, and the second switch 90 of the double light switch electrical insert 88 to selectively control the flow of electricity from the second hot line 58 to the first light 28 and the second outlet electrical insert 30.

Figure 40:
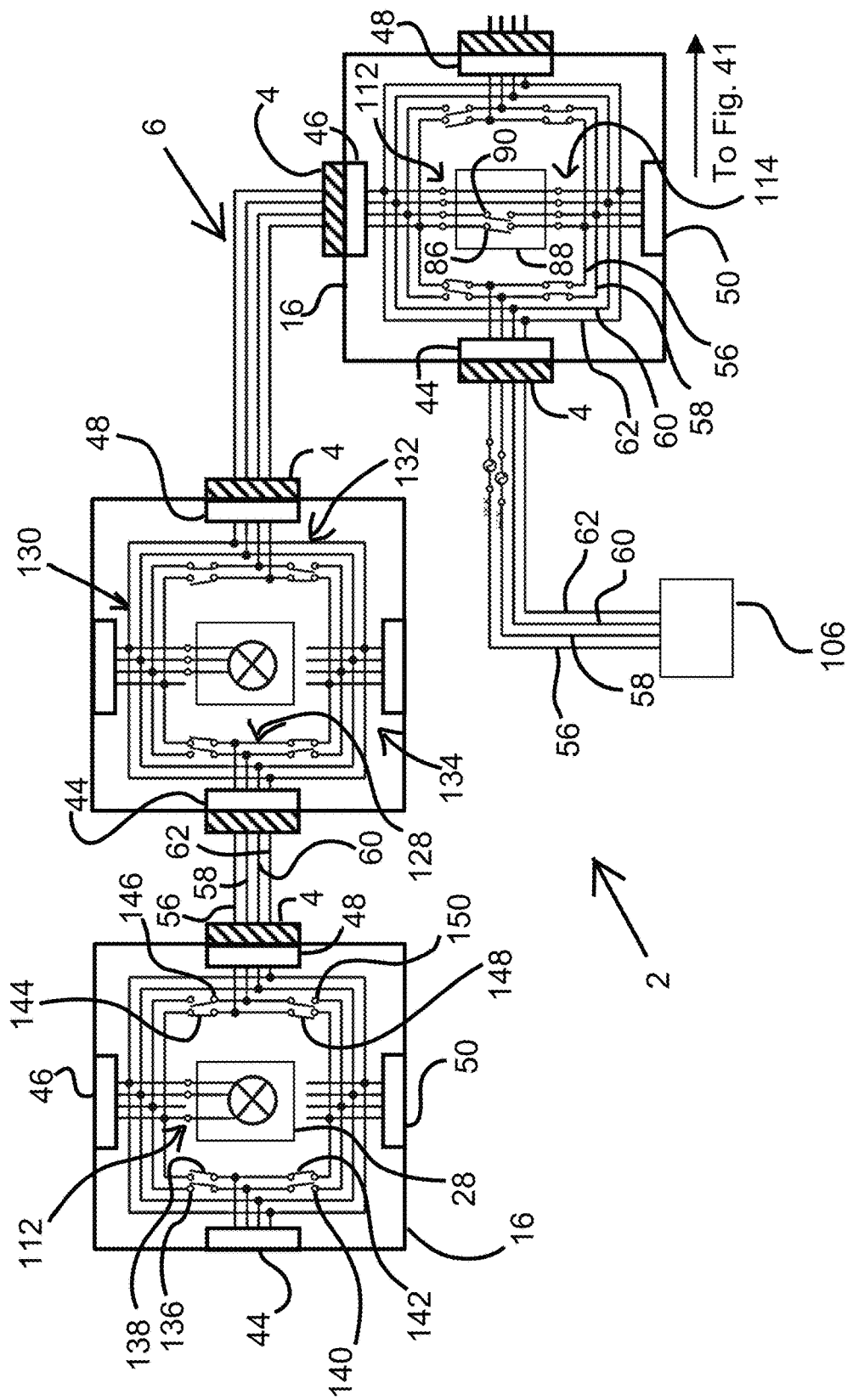
FIGS. 40 and 41 are schematic representations of a fifth exemplary circuit design including a double light switch containing electrical box connected to two light containing electrical boxes and two outlet containing electrical boxes.
Figure 41:
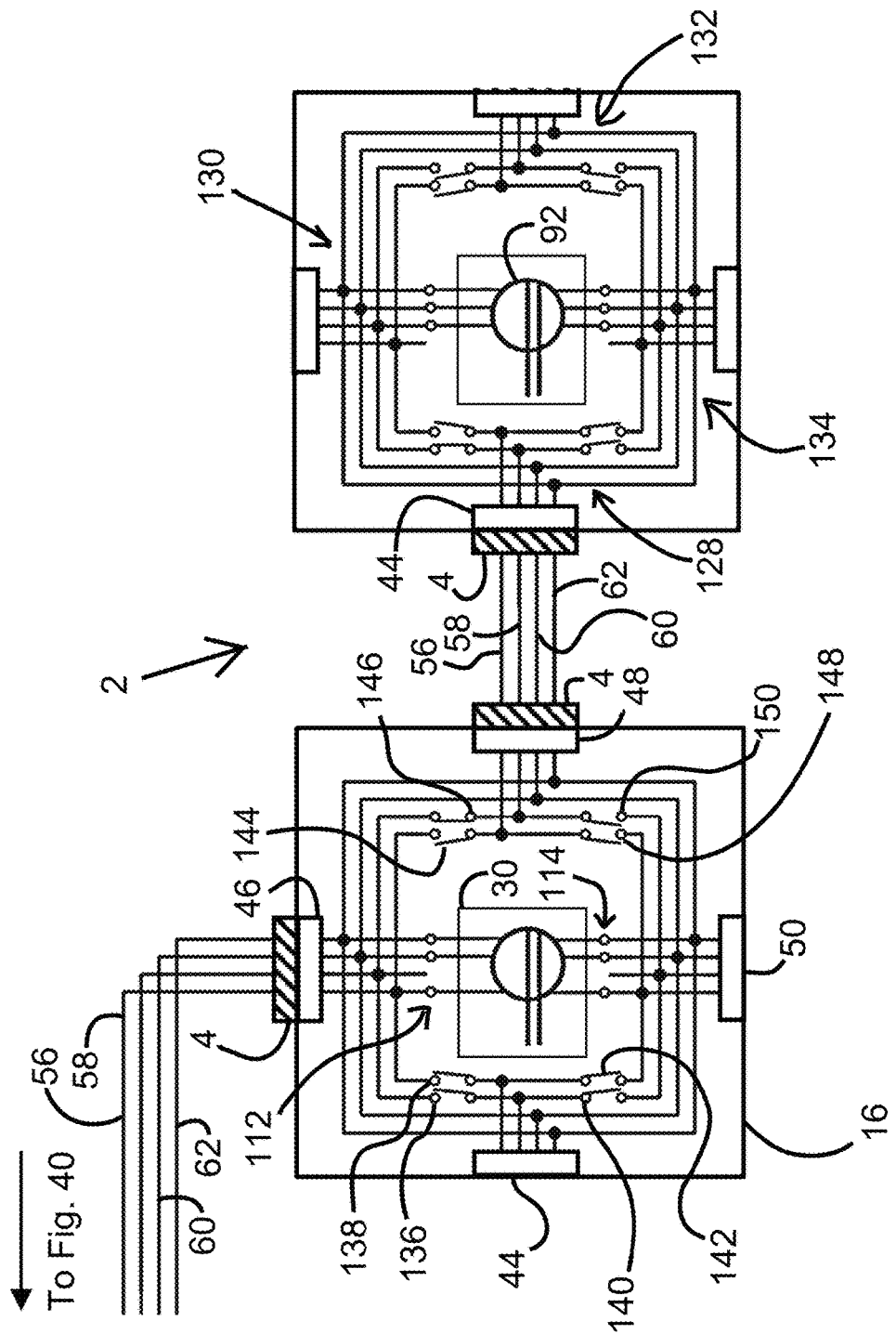

Turning to FIGS. 40 and 41, a fifth exemplary circuit design is shown. In these two figures, collectively part of the same circuit, an electrical box 16 containing a double light switch electrical insert 88, with both first and second switches 86, 90 in an open position, is shown. The components, connections, and circuit logic in FIGS. 40 and 41 are identical to that shown in FIGS. 38 and 39, with the exception of the circuit interrupter 42 positions of the double switch electrical box 16. In FIGS. 40 and 41, the third, fourth, seventh, and eighth circuit interrupters 140, 142, 148, 150 in the light switch electrical box are closed and the first, second, fifth, and sixth circuit interrupters 136, 138, 144, 146 are open. This circuit logic allows the first switch 86 of the double light switch electrical insert 88 to selectively control the flow of electricity from the first hot line 86 to the second light 28 and the second switch 90 of the double light switch electrical insert 88 to selectively control the flow of electricity from the second hot line 58 to the first light 28, while providing constant flow of electricity from the first hot line 56 to the first outlet electrical insert 30, regardless of the position of either the first or the second switch 86, 90, and providing constant flow of electricity from the second hot line 58 to the second outlet electrical insert 30, regardless of the position of either the first or the second switch 86, 90.

Figure 42:
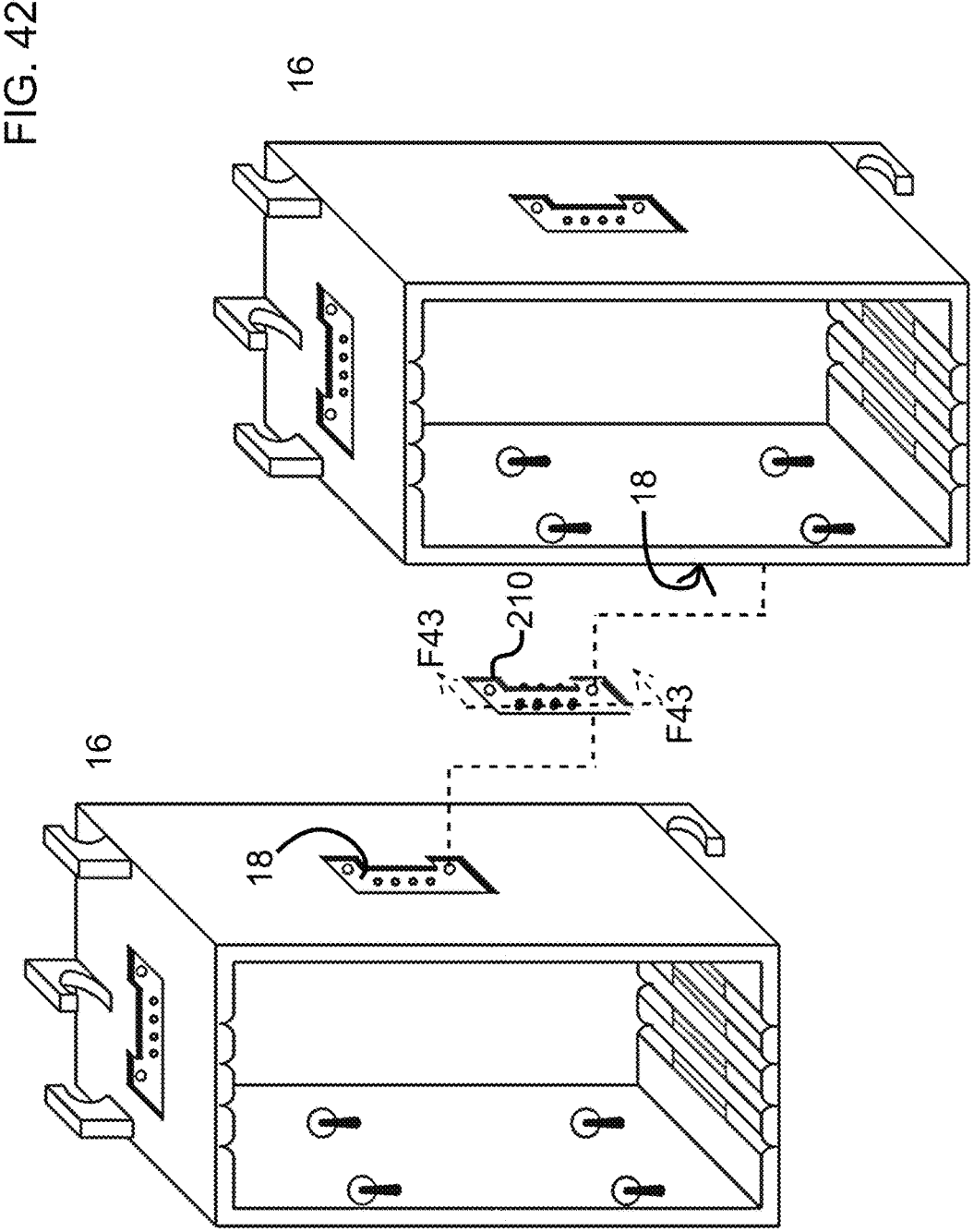
FIG. 42 is a perspective view of two electrical boxes and a box-to-box connector.
Figure 43:
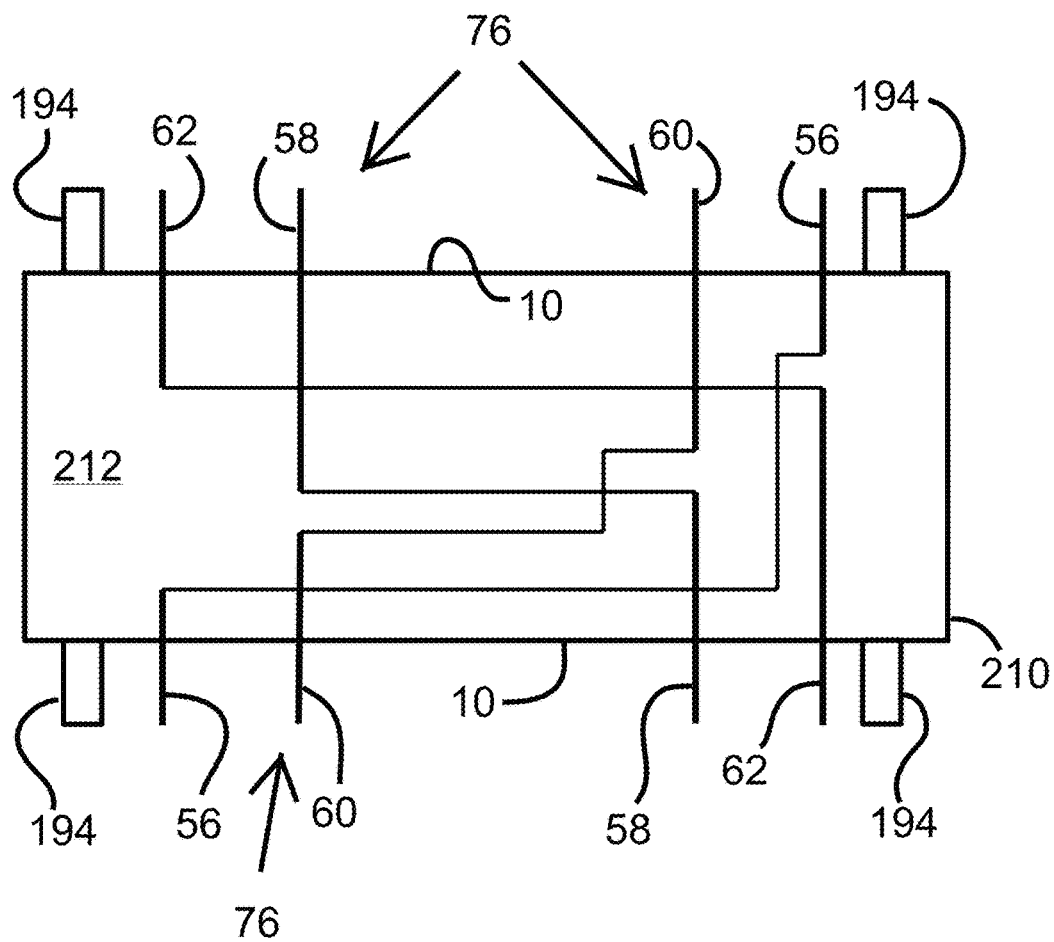
FIG. 43 is a sectional view of the box-to-box connector of FIG. 42 along the sectional line F43.

BOX-TO-BOX CONNECTOR: Turning to FIGS. 42 and 43, for situations when two electrical boxes 16 are desired to be placed flush against one another, side by side or one on top of the other, for combined switch and outlet electrical inserts 32, 30 under a single cover plate for instance, a box-to-box connector 210 is preferably utilized. The box-to-box connector 210 has a non-conductive body 212 shaped to fit into couplers 18 on either opposing sides. Four conductive prongs 76, one for each wire 56, 58, 60, 62, extend through the opposing sides of the non-conductive body 212 to provide electrical connection between respective conductive sockets 52 for the two couplers 18 of two adjacent electrical boxes 16. Two retaining posts 194 also extend from each opposing side of the non-conductive body 212 to secure the box-to-box connector 210 into the respective couplers 18. As shown in FIG. 43, according to an additional embodiment, the electrical pathway for the wires 56, 58, 60, 62 in the box-to-box connector 210 may cross to a different position from the engaging face 10 on one side of the box-to-box connector 210 to the engaging face 10 on the other side of the box-to-box connector 210. This may aid in aligning the conductive socket 52 of a specific intra-box circuit 20 wire 56, 58, 60, 62 of a first electrical box 16 with the conductive socket 52 of the specific intra-box circuit 20 wire 56, 58, 60, 62 of a second electrical box 16.

Figure 44A:
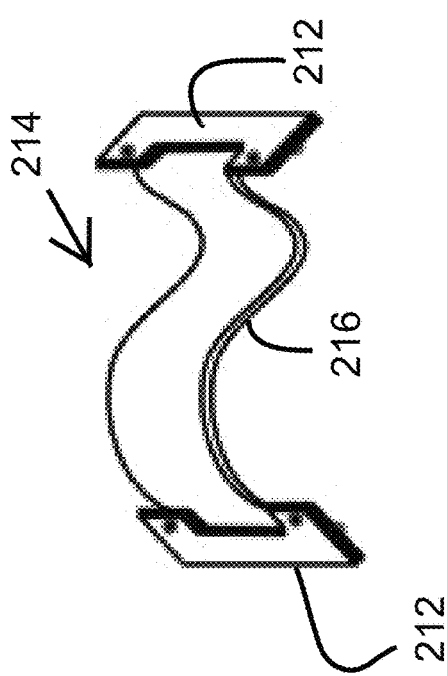
FIGS. 44A and 44B are perspective views of two strap connectors.
Figure 44B:
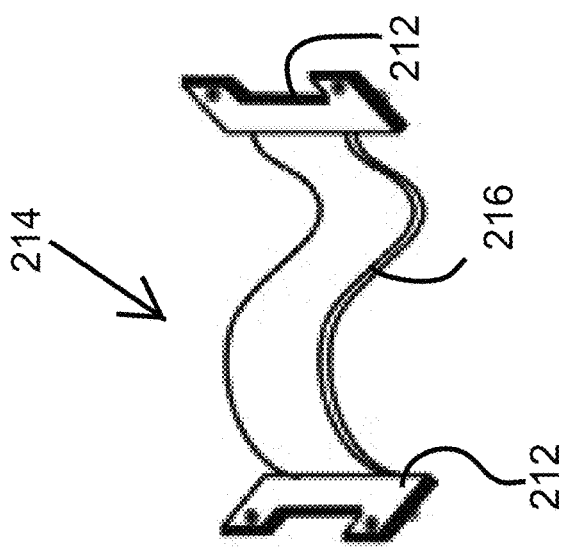

A variation on the box-to-box connector 210, shown in FIGS. 44A and 44B, is a strap connecter 214. The strap connector 214 preferably has the four wires 56, 58, 60, 62 built into a strap 216, which physically and electrically connects two non-conductive bodies 212, one on each end. Similar to the box-to-box connector 210 in FIGS. 42 and 43, the non-conductive bodies 212 of the strap connector 214 are shaped to fit into a coupler 18 on a first side with an engaging face 10, and have four conductive prongs 76, one for each wire 56, 58, 60, 62, electrically connected to the wires 56, 58, 60, 62 in the strap 216. The four conductive prongs 76 extend from the engaging face 10 on the first side of the non-conductive body 212 to fit into and electrically connect with respective conductive sockets 52 in a coupler 18. Two retaining posts 194 also extend from the first side. As a variation of the strap connector 214, each or either of the non-conductive bodies 212 at one or both ends of the strap 216 may have two engaging faces 10 on a first side and a second side of the non-conductive body 212—in essence a wired strap 216 electrically connecting two box-to-box connectors 210—which would allow for three or four electrical boxes 16 respectively to be electrically connected with a single strap connector 214. A further variation of the strap connector 214 could have branched straps 216 with more than two non-conductive bodies 212 physically and electrically connected with a single strap 216.

USB Adapter

Figure 45A:
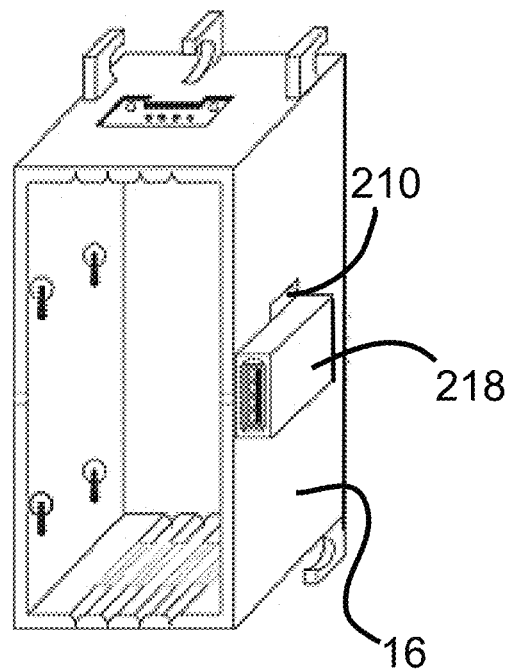
FIGS. 45A and 45 B are respectively a perspective a and exploded perspective view of a USB adaptor mounted on an electrical box via a box-to-box connector.
Figure 45B:
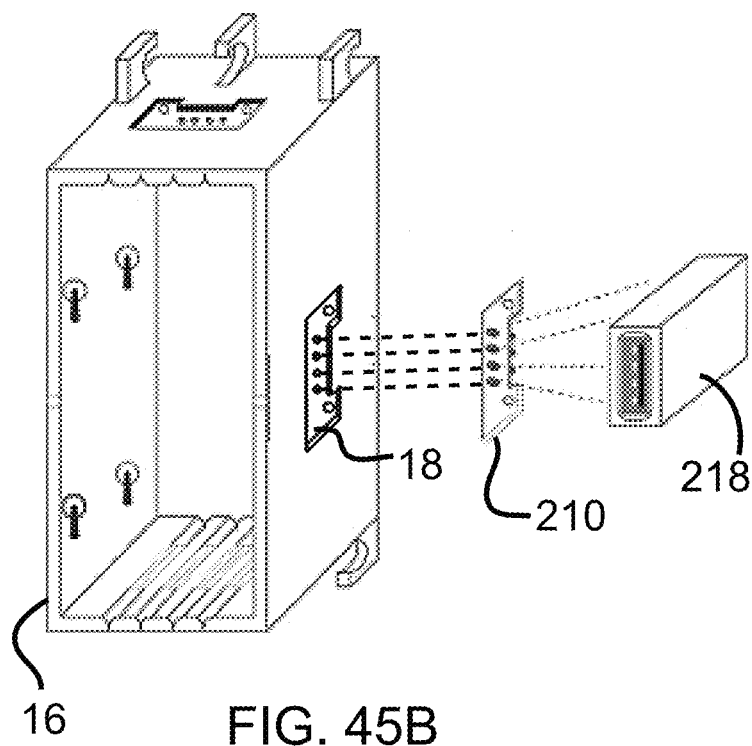

Turning finally to FIGS. 45A and 45B, a USB adaptor 218 for the electrical distribution system 2 is shown. The USB adaptor 218 is an independent device that can be attached to any of the electrical boxes 16. The USB adaptor 218 is made up of a non-conductive material with four holes on the underside, which allow for the USB adaptor to be mated with a box-to-box connector 210. The two center holes on the USB adaptor are preferably conductive sockets 52. This allows the two center conductive prongs 76 of the box-to-box connector 210, one preferably being hot 58 and the other preferably being neutral 60, to give power to the USB adaptor 218. Since the two center conductive prongs 76 of the box-to-box connector 210 are involved in the transfer of current, the USB adaptor 218 can be placed on either side of the electrical box since preferably all of the center/middle two conductive prongs 76 are preferably the same pairing of one hot and one neutral line 58, 60. The other outer two holes on the USB adaptor 218 are preferably non-conductive, but allow for stability for the USB adaptor 218 and also cover the other two conductive prongs 76 of the box-to-box connector 210 so that the other two conductive prongs, preferably one hot and one ground line 56, 62 do not remain exposed.

The invention illustratively disclosed herein suitably may explicitly be practiced in the absence of any element which is not specifically disclosed herein. While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

I claim:

1. A circuit interrupter comprising:
   a conductive pin;
   a first conductive seat;

a second conductive seat; and
a non-conductive seat;
whereby the conductive pin is moved so that the conductive pin is moved from the first and the second conductive seat to the non-conductive seat to open a circuit and the first and the second conductive seats are axially aligned and spaced apart from one another.

2. The circuit interrupter of claim 1, further comprising a non-conductive pin connected orthogonally to the conductive pin.

3. The circuit interrupter of claim 1, further comprising a lever attached to the conductive pin.

4. The circuit interrupter of claim 3, wherein the non-conductive seat is arranged orthogonally and coplanar to the first and the second conductive seats.

5. The circuit interrupter of claim 4, further comprising a non-conductive pin connected orthogonally to the conductive pin.

6. The circuit interrupter of claim 3, further comprising a tension spring arranged to bias the conductive pin toward the conductive seat when the circuit is closed.

7. The circuit interrupter of claim 1, further comprising an interrupter plate.

8. The circuit interrupter of claim 7, wherein the interrupter plate is arranged between the conductive pin and a portion of the lever that is manipulated to change the circuit from open to closed.

9. The circuit interrupter of claim 7, wherein the interrupter plate is substantially circular in shape.

10. A circuit interrupter comprising:
a conductive pin;
a first conducive seat;
a second conductive seat;
a non-conductive seat; and
a lever attached to the conductive pin;
wherein the conductive pin is moved so that the conductive pin is moved from the first and the second conductive seat to the non-conductive seat to open a circuit;
a tension spring arranged to bias the conductive pin toward the conductive seat when the circuit is closed; and
the circuit is changed from an open to a closed position by pushing the lever in a direction against the tension spring bias and rotating the lever ninety degrees.

11. The circuit interrupter of claim 10, wherein the first and the second conductive seats are axially aligned and spaced apart from one another.

12. The circuit interrupter of claim 10, wherein the lever is locked from rotating unless the lever is pushed sufficiently far in a direction against the tension spring bias.

13. The circuit interrupter of claim 10, wherein the circuit is changed from the closed to another open position by pushing the lever in a direction against the tension spring bias and rotating the lever an additional ninety degrees.

14. A circuit interrupter comprising:
a conductive pin;
a non-conductive pin connected orthogonally to the conductive pin;
a first conductive seat;
a second conductive seat arranged coaxially to and spaced from the first conductive seat;
a non-conductive seat arranged orthogonally and coplanar to the first and the second conductive seats;
a lever attached to the conductive pin;
a tension spring arranged to bias the conductive pin toward the conductive seat when the circuit is closed; and
a circular interrupter plate arranged between the conductive pin and a portion of the level that is manipulated to change the circuit from open to closed;
wherein
the circuit is changed from an open to a closed position by pushing the lever in a direction against the tension spring bias and rotating the lever ninety degrees;
the circuit is changed from the closed to another open position by pushing the lever in a direction against the tension spring bias and rotating the lever an additional ninety degrees; and
lever is automatically locked from rotating unless the lever is pushed sufficiently far in a direction against the tension spring bias.

* * * * *